(12) United States Patent
Park et al.

(10) Patent No.: US 12,073,751 B2
(45) Date of Patent: Aug. 27, 2024

(54) ELECTRONIC DEVICE CAPABLE OF FOLDING AND SLIDING OPERATIONS

(71) Applicant: Samsung Electronics Co., Ltd., Suwon-si (KR)

(72) Inventors: Gyeongtae Park, Suwon-si (KR); Sungho Ahn, Suwon-si (KR); Youngseong Kim, Suwon-si (KR); Sungmin Hong, Suwon-si (KR); Jooyoung Kang, Suwon-si (KR); Yangwook Kim, Suwon-si (KR); Seungjoon Lee, Suwon-si (KR); Hyunju Hong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/077,441

(22) Filed: Dec. 8, 2022

(65) Prior Publication Data

US 2023/0095528 A1    Mar. 30, 2023

Related U.S. Application Data

(63) Continuation of application No. PCT/KR2021/007292, filed on Jun. 10, 2021.

(30) Foreign Application Priority Data

Jun. 10, 2020  (KR) .................. 10-2020-0070411
May 10, 2021  (KR) .................. 10-2021-0059953

(51) Int. Cl.
*G09G 3/00* (2006.01)
*G06F 1/16* (2006.01)
(Continued)

(52) U.S. Cl.
CPC .......... *G09G 3/035* (2020.08); *G06F 1/1624* (2013.01); *G06F 1/1652* (2013.01);
(Continued)

(58) Field of Classification Search
CPC .. G09G 3/035; G09G 2354/00; G06F 1/1624; G06F 1/1652; G06F 1/1616;
(Continued)

(56) References Cited

U.S. PATENT DOCUMENTS 8,385,055 B2  2/2013  Kao et al.
8,502,788 B2  8/2013  Cho
(Continued)

FOREIGN PATENT DOCUMENTS

CN   110806829 A       2/2020
KR   10-2010-0052227 A  5/2010
(Continued)

OTHER PUBLICATIONS

International Search Report dated Oct. 8, 2021, issued in International Application No. PCT/KR2021/007293.
(Continued)

*Primary Examiner* — Douglas M Wilson
(74) *Attorney, Agent, or Firm* — Jefferson IP Law, LLP

(57) ABSTRACT

An electronic device is provided. The electronic device includes a base housing, a sliding housing and that is coupled to the base housing so as to slide, a folding housing that at least partially overlaps the base housing and that is connected to the sliding housing, a display disposed on the folding housing and the sliding housing, a rolling module that is coupled to a rear surface of the display, and a hinge module connected to the folding housing and the sliding housing. The electronic device is configured to be capable of a sliding operation in which the folding housing and the sliding housing move in a sliding direction to extend or (Continued)

retract a display region of the electronic device and a folding operation in which the folding housing is folded or unfolded relative to the sliding housing to fold or unfold a portion of the display region.

20 Claims, 47 Drawing Sheets

(51) Int. Cl.
  *G06F 3/0488* (2022.01)
  *G06F 3/04886* (2022.01)
  *G09F 9/30* (2006.01)
  *H04M 1/02* (2006.01)
(52) U.S. Cl.
  CPC .......... *G06F 1/1616* (2013.01); *G06F 1/1681* (2013.01); *G06F 3/0488* (2013.01); *G06F 3/04886* (2013.01); *G09F 9/301* (2013.01); *G09G 2354/00* (2013.01); *H04M 1/0216* (2013.01); *H04M 1/0237* (2013.01); *H04M 1/0268* (2013.01)
(58) Field of Classification Search
  CPC .. G06F 1/1681; G06F 3/0488; G06F 3/04886; G09F 9/301; H04M 1/0216; H04M 1/0237; H04M 1/0268
  See application file for complete search history.

(56) References Cited

U.S. PATENT DOCUMENTS

| | | | |
|---|---|---|---|
| 8,711,566 B2 | 4/2014 | O'Brien | |
| 8,787,016 B2 | 7/2014 | Rothkopf et al. | |
| 9,183,770 B2 | 11/2015 | Lee et al. | |
| 9,195,272 B2 | 11/2015 | O'Brien | |
| 9,483,081 B2 | 11/2016 | Lee et al. | |
| 9,489,078 B2 | 11/2016 | Seo et al. | |
| 9,504,170 B2 | 11/2016 | Rothkopf et al. | |
| 9,514,573 B2 | 12/2016 | Grimaud | |
| 9,747,868 B2 | 8/2017 | Lee et al. | |
| 9,971,712 B2 | 5/2018 | Oh et al. | |
| 10,104,787 B2 | 10/2018 | Rothkopf et al. | |
| 10,133,310 B2 | 11/2018 | Kim et al. | |
| 10,423,019 B1 | 9/2019 | Song | |
| 10,459,625 B2 | 10/2019 | Seo et al. | |
| 10,481,638 B2 | 11/2019 | Yoshizumi | |
| 10,534,531 B2 | 1/2020 | Seo et al. | |
| 10,542,128 B2 | 1/2020 | Kang et al. | |
| 10,642,485 B1 | 5/2020 | Seo et al. | |
| 10,694,624 B2 | 6/2020 | Rothkopf et al. | |
| 10,742,784 B1 | 8/2020 | Jo et al. | |
| 10,747,269 B1 | 8/2020 | Choi et al. | |
| 10,809,767 B2 | 10/2020 | Ou et al. | |
| 10,820,433 B2 | 10/2020 | Cha | |
| 10,868,264 B2 | 12/2020 | Shin et al. | |
| 10,878,728 B2 | 12/2020 | Yoon | |
| 10,880,417 B1 | 12/2020 | Song et al. | |
| 10,938,970 B1 | 3/2021 | Lee et al. | |
| 11,003,217 B2 | 5/2021 | Cha | |
| 11,003,222 B2 | 5/2021 | Moon et al. | |
| 11,281,256 B2 | 3/2022 | Yoshizumi | |
| 11,304,316 B2 | 4/2022 | Rothkopf et al. | |
| 11,360,525 B2 | 6/2022 | Moon et al. | |
| 11,775,025 B2 | 10/2023 | Chen et al. | |
| 2010/0117975 A1 | 5/2010 | Cho | |
| 2010/0164837 A1 | 7/2010 | Kao et al. | |
| 2012/0314399 A1 | 12/2012 | Bohn et al. | |
| 2013/0010405 A1 | 1/2013 | Rothkopf et al. | |
| 2014/0282059 A1 | 9/2014 | Oh et al. | |
| 2015/0187136 A1 | 7/2015 | Grimaud | |
| 2016/0026219 A1 | 1/2016 | Kim et al. | |
| 2016/0070303 A1 | 3/2016 | Lee et al. | |
| 2016/0132074 A1 | 5/2016 | Kim et al. | |
| 2016/0366772 A1* | 12/2016 | Choi | G06F 1/1675 |
| 2017/0139442 A1 | 5/2017 | Yoshizumi | |
| 2018/0039408 A1* | 2/2018 | Cheong | G06F 3/0481 |
| 2018/0198896 A1 | 7/2018 | Kang et al. | |
| 2018/0260346 A1 | 9/2018 | Oh et al. | |
| 2019/0163241 A1 | 5/2019 | Moon et al. | |
| 2019/0305237 A1 | 10/2019 | Shin et al. | |
| 2020/0020255 A1 | 1/2020 | Yoon | |
| 2020/0133340 A1 | 4/2020 | Ou et al. | |
| 2020/0249722 A1* | 8/2020 | Cha | G06F 1/1681 |
| 2020/0253069 A1 | 8/2020 | Cha | |
| 2021/0098723 A1 | 4/2021 | Shin et al. | |
| 2022/0179454 A1 | 6/2022 | Yoshizumi | |
| 2022/0269314 A1 | 8/2022 | Chen et al. | |

FOREIGN PATENT DOCUMENTS

| | | | |
|---|---|---|---|
| KR | 10-2012-0092034 A | 8/2012 | |
| KR | 10-2014-0059274 A | 5/2014 | |
| KR | 10-2014-0147253 A | 12/2014 | |
| KR | 10-2015-0076119 A | 7/2015 | |
| KR | 10-2015-0094484 A | 8/2015 | |
| KR | 10-2016-0028839 A | 3/2016 | |
| KR | 10-2016-0038510 A | 4/2016 | |
| KR | 10-2016-0055646 A | 5/2016 | |
| KR | 10-2017-0006055 A | 1/2017 | |
| KR | 10-1784880 B1 | 10/2017 | |
| KR | 10-2019-0018361 A | 2/2019 | |
| KR | 10-2019-0113128 A | 10/2019 | |
| KR | 10-2019-0135159 A | 12/2019 | |
| KR | 10-2020-0007366 A | 1/2020 | |
| WO | 2016/052814 A1 | 4/2016 | |
| WO | WO-2018186631 A1 * | 10/2018 | G06F 1/1641 |

OTHER PUBLICATIONS

U.S. Office Action dated Sep. 1, 2023; U.S. Appl. No. 17/373,218.
European Search Report dated Oct. 11, 2023; European Appln. No. 21822720.5-1224 / 4152122 PCT/KR2021007292.
U.S. Office Action dated Mar. 15, 2024; U.S. Appl. No. 17/373,218.
U.S. Notice of Allowance dated Jun. 12, 2024; U.S. Appl. No. 17/373,218.

* cited by examiner

ELECTRONIC DEVICE CAPABLE OF FOLDING AND SLIDING OPERATIONS

CROSS-REFERENCE TO RELATED APPLICATION(S)

This application is a continuation application, claiming priority under § 365(c), of an International application No. PCT/KR2021/007292, filed on Jun. 10, 2021, which is based on and claims the benefit of a Korean patent application number 10-2020-0070411, filed on Jun. 10, 2020, in the Korean Intellectual Property Office, and of a Korean patent application number 10-2021-0059953, filed on May 10, 2021, in the Korean Intellectual Property Office, the disclosure of each of which is incorporated by reference herein in its entirety.

BACKGROUND

1. Field

The disclosure relates to an electronic device capable of a folding operation and a sliding operation.

2. Description of Related Art

With the development of display technology, an electronic device may include a flexible display that can be folded or unfolded. The electronic device may include a mechanical structure that supports deformation of the flexible display. Accordingly, the electronic device may provide a wider screen and/or a screen folded or unfolded at various angles.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a flexible display and capable of a sliding operation and a folding operation. In addition, embodiments of the disclosure provide an electronic device for providing various states by a sliding operation and a folding operation.

Additional aspects will be set forth in part in the description which follows and, in part, will be apparent from the description, or may be learned by practice of the presented embodiments.

In accordance with an aspect of the disclosure, an electronic device is provided. The electronic device includes a base structure, a sliding structure that at least partially overlaps the base structure and that is coupled to the base structure so as to slide, a folding structure that at least partially overlaps the base housing and that is connected to the sliding structure, a display disposed on the folding housing and the sliding structure, at least a portion of the display being located inside the base structure, at least one sensor; and a processor electrically connected with the at least one sensor, wherein the electronic device includes a default state, an extended state in which a display region on which content is displayed is extended by sliding of the sliding structure and the folding structure, and a folded state in which a first region of the display region is folded with a predetermined angle with respect to a second region by rotation of the folding structure, and wherein the processor is configured to determine a state of the electronic device, based on a value obtained from the at least one sensor, display first content on the display region in the extended state, and display second content on the first region and third content different from the second content on the second region in the folded state.

The electronic device according to the embodiments of the disclosure may independently perform the sliding operation and the folding operation. Furthermore, the electronic device may detect a state of the electronic device through the sensor disposed on at least a part of the base housing, the sliding housing, and the folding housing and may provide a user interface and user experience that are appropriate for the detected state.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
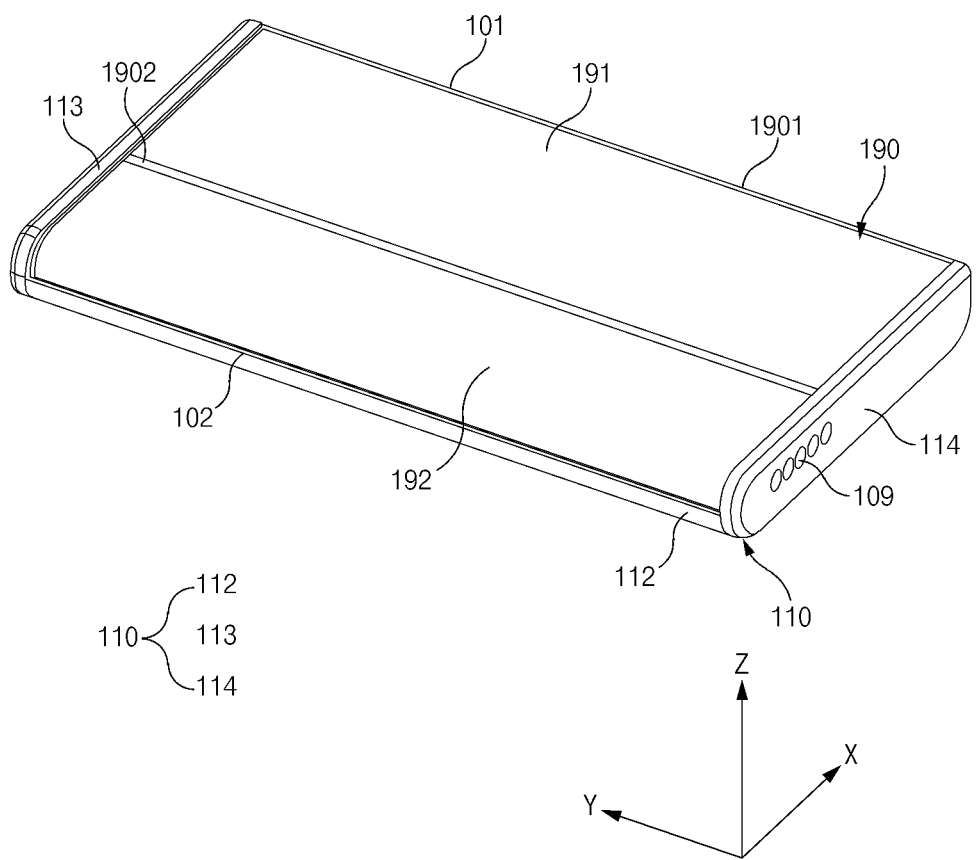
FIG. 1 is a view illustrating a first state of an electronic device according to an embodiment of the disclosure.

FIG. 1 is a view illustrating a first state of an electronic device according to an embodiment of the disclosure.

Figure 2:
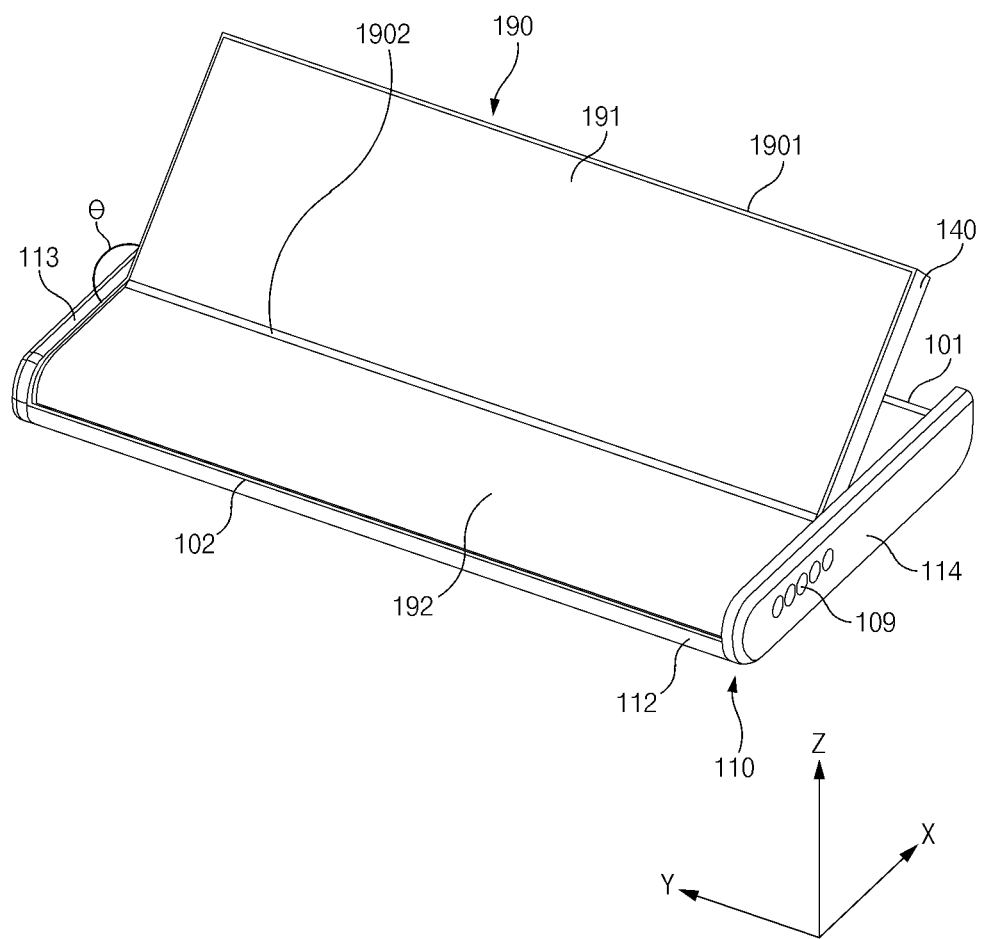
FIG. 2 is a view illustrating a second state of the electronic device according to an embodiment of the disclosure.

FIG. 2 is a view illustrating a second state of the electronic device according to an embodiment of the disclosure.

Figure 3:
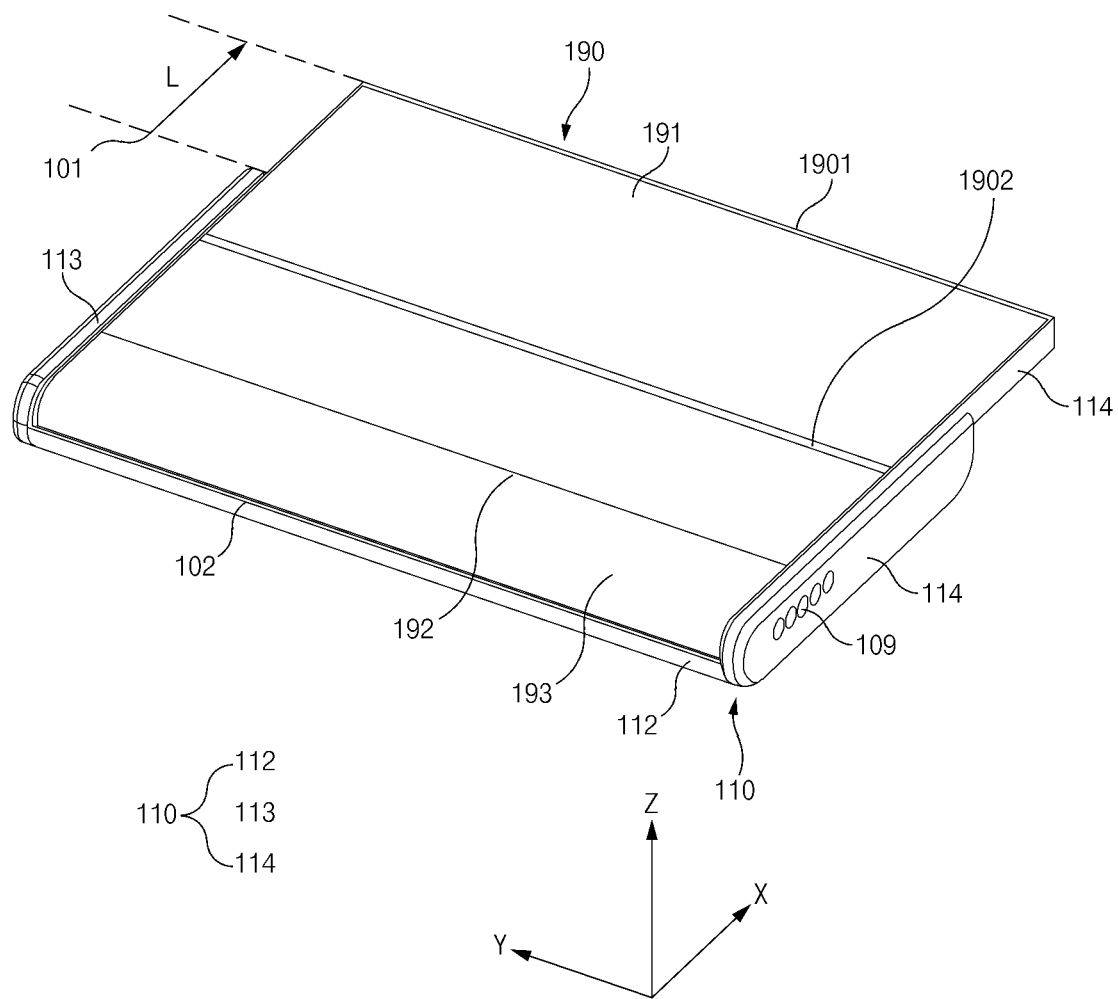
FIG. 3 is a view illustrating a third state of the electronic device according to an embodiment of the disclosure.

FIG. 3 is a view illustrating a third state of the electronic device according to an embodiment of the disclosure.

Figure 4:
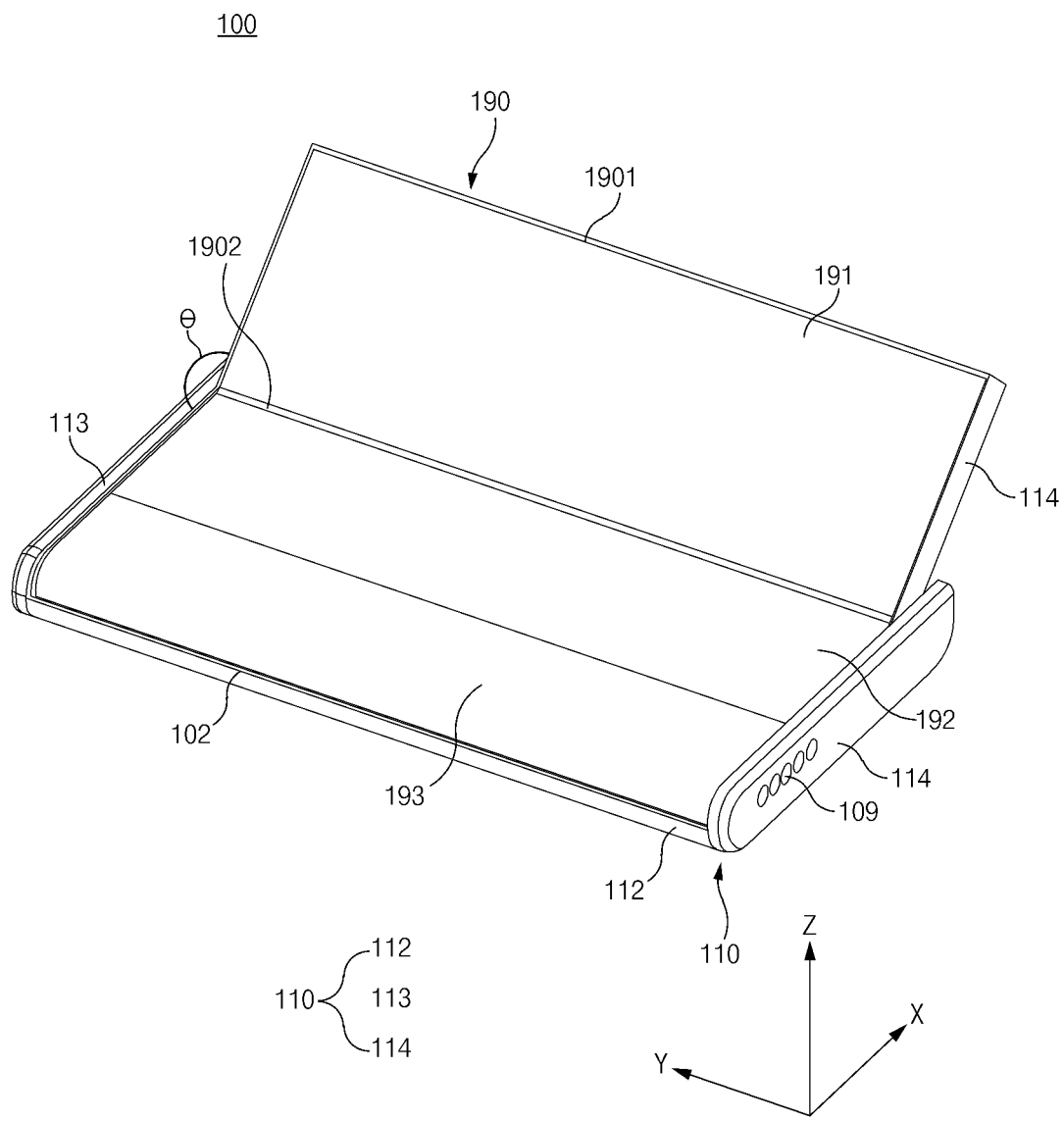
FIG. 4 is a view illustrating a fourth state of the electronic device according to an embodiment of the disclosure.

FIG. 4 is a view illustrating a fourth state of the electronic device according to an embodiment of the disclosure.

Referring to FIGS. 1 and 2, the electronic device 100 according to an embodiment may include a base housing 110, a sliding housing 130, a folding housing 140, and a display 190.

Hereinafter, a front surface of the electronic device 100 may refer to a surface that is visible when the electronic device 100 is viewed in the +z-axis direction. For example, the front surface of the electronic device 100 may include a flat portion of the display 190 and a curved portion at an edge of the flat portion.

In an embodiment, the electronic device 100 may be configured to be capable of a folding operation and a sliding operation. For example, the folding operation may include a folding operation and an unfolding operation, and the sliding operation may include a sliding-in operation and a sliding-out operation. For example, the electronic device 100 may include the base housing 110, the sliding housing (not illustrated) coupled to the base housing 110 so as to slide, and the folding housing 140 coupled to the sliding housing so as to be folded or unfolded relative to the sliding housing.

In an embodiment, the electronic device 100 may include the first state (e.g., FIG. 1), the second state (e.g., FIG. 2), the third state (e.g., FIG. 3), and the fourth state (e.g., FIG. 4). The electronic device 100 may be changed (or, switched) between the first state, the second state, the third state, and the fourth state by a user operation or a mechanical operation.

In an embodiment, the display 190 may include a first region 191, a second region 192, and a third region 193. The shape of at least a partial region of the display 190 may be deformed depending on a state of the electronic device 100. For example, a portion of each of the first region 191 and the second region 192 of the display 190 may include a bending region 1902 that can be bent to be flat or curved.

In an embodiment, the first state may include a state in which the unfolding operation is performed in the second state or a state in which the sliding-in operation is performed in the third state. In an embodiment, in the first state, the first region 191 and at least a portion of the second region 192 of the display 190 may form the front surface of the electronic device 100. The first region 191 of the display 190 may form a first edge 1901 of the display 190.

In various embodiments, in the first state, the first region 191 (e.g., the first edge 1901) may form a first edge 101 of the electronic device 100. For example, the first edge portion 1901 of the first region 191 may include a curved surface to form a portion (e.g., the first edge 101) of a side surface of the electronic device 100. In various embodiments, in the first state, the second region 192 of the display 190 may form a second edge 102 of the electronic device 100. For example, an edge portion of the second region 192 of the display 190 may be formed to be a curved surface. In an embodiment, in the first state, the portion where the first region 191 and the second region 192 are connected may be formed to be a substantially flat surface.

In an embodiment, the second state may include a state in which the folding operation is performed in the first state. For example, the second state may include a state in which the folding housing 140 is folded with a predetermined angle relative to the sliding housing 130 in the first state. In an embodiment, in the second state, the first region 191 and the second region 192 of the display 190 may be folded or bent to form a predetermined angle θ. For example, a portion of each of the first region 191 and the second region 192 may include the bending region 1902 that can be bent to be flat or curved. For example, the second region 192 may be parallel to an x-y plane on which the electronic device is placed, and the first region 191 may form the predetermined angle with respect to the x-y plane. In an embodiment, in the first state and the second state, the third region 193 may be located inside the electronic device 100 (e.g., inside the base housing 110).

In an embodiment, the third state may include a state in which the sliding-out operation is performed in the first state. For example, the third state may include a state in which the sliding housing 130 and the folding housing 140 are slid in the x-axis direction by a predetermined distance L relative to the base housing 110 in the first state. In an embodiment, in the third state, the first region 191, the second region 192, and the third region 193 of the display 190 may form at least a portion of the front surface of the electronic device 100. In the third state, the first region 191 may further extend outside the base housing 110 of the electronic device 100 (e.g., in the +x-axis direction) than in the first state and the second state. The second region 192 may be formed between the first region 191 and the third region 193 and may be formed to be a substantially flat surface. In an embodiment, the first region 191 and the second region 192 may form substantially the same plane. A portion of the third region 193 may move from inside the electronic device 100 to the front side of the electronic device 100 when the electronic device 100 is changed to the third state. In the third state, at least another portion of the third region 193 may be located inside the electronic device 100.

In an embodiment, the fourth state may include a state in which the folding operation is performed in the third state. For example, the fourth state may include a state in which the sliding housing 130 and the folding housing 140 are slid in the x-axis direction by the predetermined distance relative to the base housing 110 in the first state and the folding housing 140 is folded with the predetermined angle relative to the sliding housing 130. In the fourth state, the first region 191 of the display 190 may extend from the second region 192 at the predetermined angle. For example, the bending region 1902 between the first region 191 and the second region 192 may be formed to be a curved surface. For example, the second region 192 may be parallel to the x-y plane on which the electronic device 100 is placed, and the first region 191 may form the predetermined angle with respect to the x-y plane. In an embodiment, in the first state and the second state, the third region 193 may be located inside the electronic device 100 (e.g., inside the base housing 110).

In various embodiments, the sliding operation and the folding operation of the electronic device 100 may be independently performed. For example, the sliding operation and the folding operation may be simultaneously or sequentially performed. For example, the electronic device 100 may be changed from the first state to the fourth state by performing the sliding-out operation after the folding operation, performing the folding operation after the sliding-out operation, or simultaneously performing the folding operation and the sliding-out operation.

In various embodiments, a speaker hole 109 may be formed in a first side cover 113 and/or a second side cover 114 of the base housing 110. The speaker hole 109 may be connected with a speaker module (e.g., a first speaker module 178 or a second speaker module 179 of FIG. 15) disposed in the sliding housing (e.g., the sliding housing 130 of FIG. 15).

Figure 5:
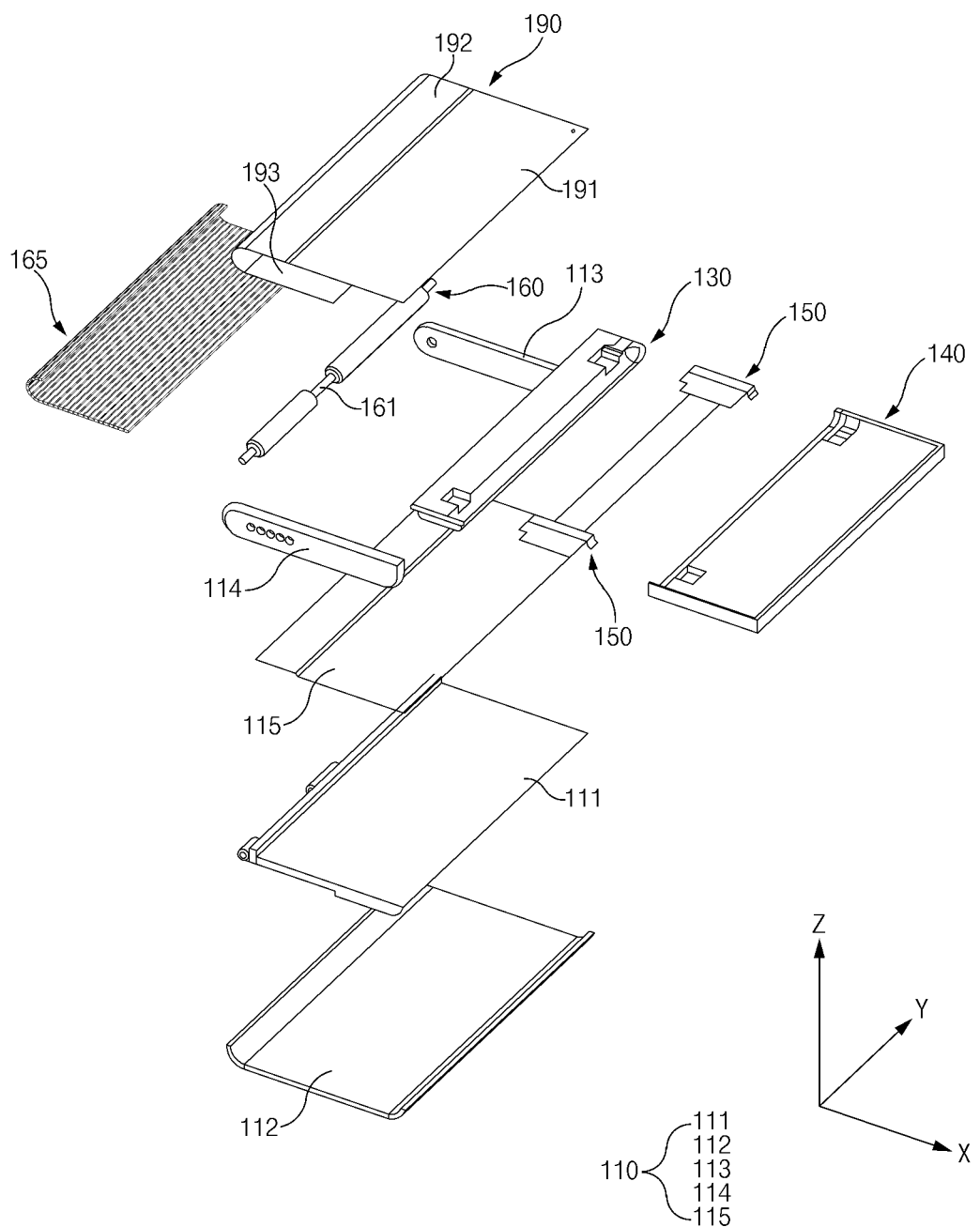
FIG. 5 is an exploded perspective view of the electronic device according to an embodiment of the disclosure.
Figure 6A:
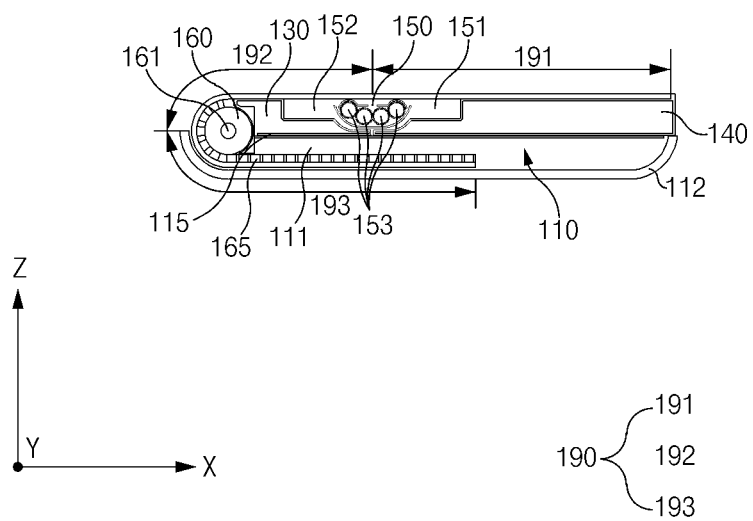
FIGS. 6A, 6B, 6C, and 6D are views illustrating the first state, the second state, the third state, and the fourth state of the electronic device according to various embodiments of the disclosure.
Figure 6B:
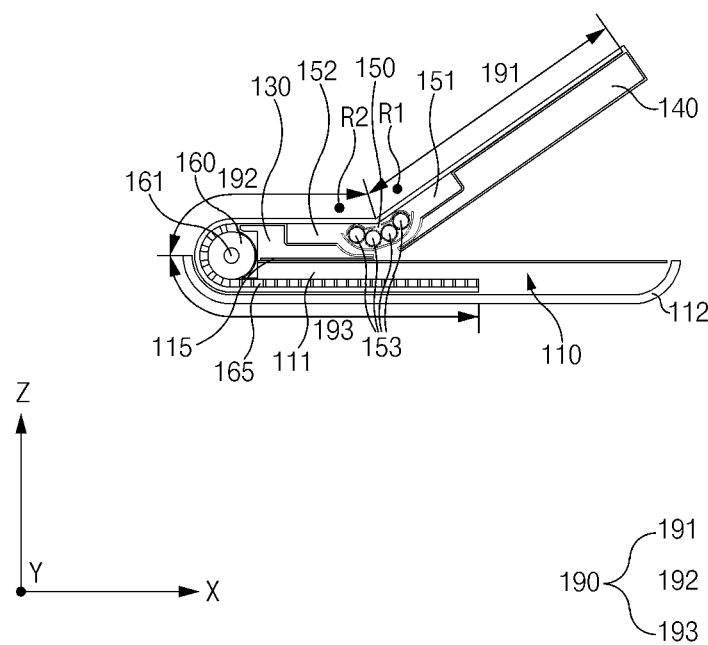
Figure 6C:
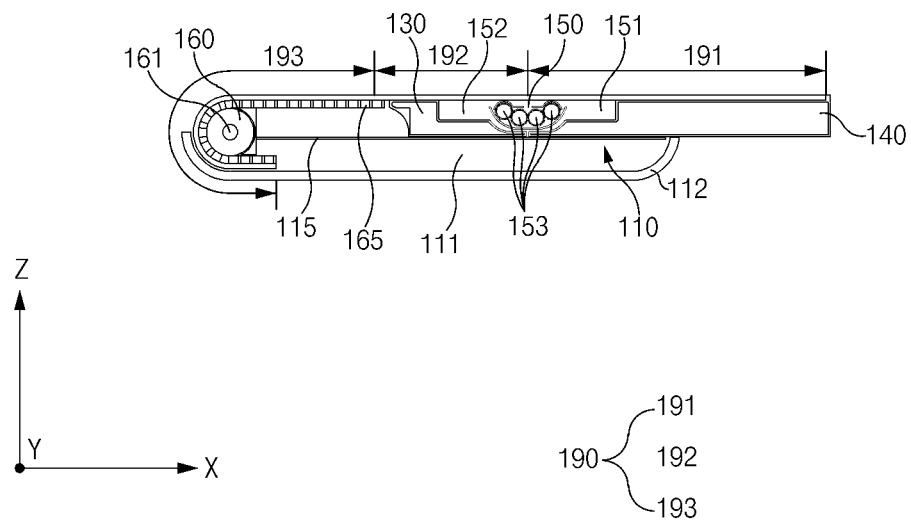
Figure 6D:
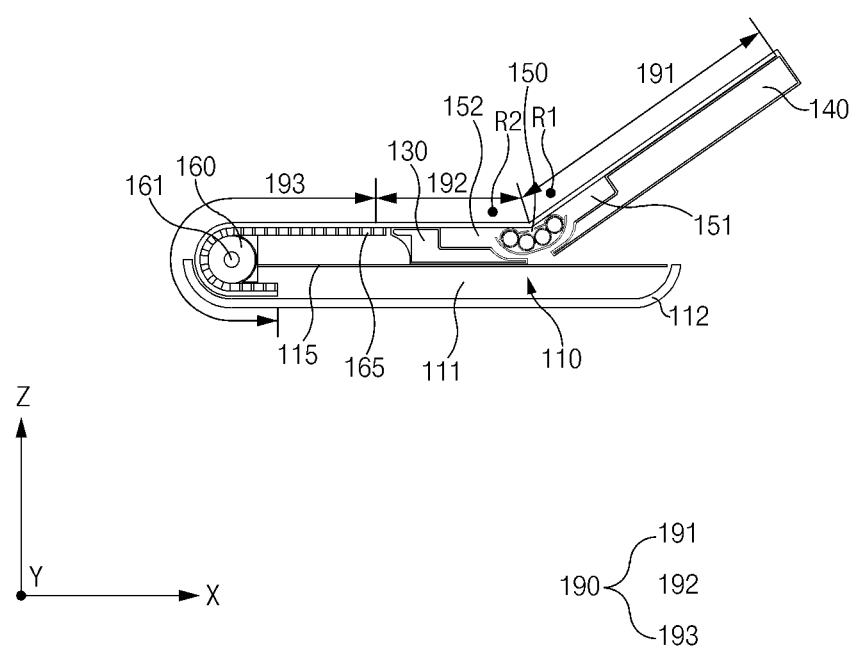

FIG. 5 is an exploded perspective view of the electronic device according to an embodiment of the disclosure. FIGS. 6A, 6B, 6C, and 6D are views illustrating the first state, the second state, the third state, and the fourth state of the electronic device according to various embodiments of the disclosure.

Referring to FIGS. 5, 6A, 6B, 6C and 6D, the electronic device 100 may include the base housing 110, the sliding housing 130, the folding housing 140, the display 190, a rolling module 165, a roller 160, and a hinge module 150.

In an embodiment, the base housing 110 may include a base plate 111, a first cover 112, a second cover 115, the first side cover 113, and the second side cover 114.

In an embodiment, the base housing 110 may contain fixed structures of the electronic device 100. For example, the base housing 110 may be fixed in a specified position irrespective of a change in the state of the electronic device 100. In an embodiment, the base plate 111 may be located between the first cover 112 and the second cover 115. The base plate 111 may at least partially overlap the first cover 112 and the second cover 115 in the z-axis direction. In an embodiment, the roller 160 may be coupled to the base plate 111. For example, a shaft 161 of the roller 160 may be coupled to an edge of the base plate 111 so as to be rotatable.

In an embodiment, the base plate 111 may be located between regions (e.g., the second region 192 and the third region 193) of the display 190 that face each other. In an embodiment, the base plate 111 may at least partially overlap the display 190 in the +z-axis and −z-axis directions. For example, in the first state, the base plate 111 may at least partially overlap the first region 191, the second region 192, and the third region 193 of the display 190 in the z-axis direction. For example, in the third state, the base plate 111 may at least partially overlap the second region 192 and the third region 193 of the display 190 in the z-axis direction.

In an embodiment, the first cover 112 may form a rear surface of the electronic device 100. The first cover 112 may include a portion substantially parallel to the base plate 111 and a curved portion formed at an edge of the parallel portion. The curved portion may be formed to surround at least a portion of the display 190. In an embodiment, at least a portion of the third region 193 of the display 190 and at least a portion of the rolling module 165 may be located between the base plate 111 and the first cover 112. For example, when the sliding-out operation is performed, a portion of the display 190 and a portion of the rolling module 165 may be pulled from a space between the base plate 111 and the first cover 112 and may move to the front side of the electronic device 100.

In an embodiment, the first side cover 113 and the second side cover 114 may be coupled with the first cover 112 and the second cover 115 to surround a predetermined space. A space in which the base plate 111, at least a portion of the rolling module 165, and at least a portion of the display 190 are disposed may be formed in the predetermined space.

In an embodiment, the first side cover 113 and the second side cover 114 may form opposite side surfaces (e.g., a surface facing the +y-axis direction and a surface facing the −y-axis direction) of the electronic device 100. In an embodiment, the sliding housing 130 may be coupled to the first side cover 113 and the second side cover 114. For example, a first guide rail (e.g., a first guide rail 117 of FIGS. 9A and 9B) for guiding a sliding path of the sliding housing 130 and a second guide rail (e.g., a second guide rail of FIGS. 8A and 8B) for guiding a path of the rolling module 165 may be formed on the first side cover 113 and the second side cover 114.

In an embodiment, the second cover 115 may be spaced apart from the base plate 111 by a predetermined gap.

In an embodiment, the sliding housing 130 may at least partially overlap the base plate 111 of the base housing 110 in the z-axis direction. One side of the sliding housing 130 may be connected to the rolling module 165, and an opposite side of the sliding housing 130 may be connected to the hinge module 150. As the sliding housing 130 is connected to the rolling module 165, the rolling module 165 may be pressed or pulled in the x-axis direction when the sliding housing moves. As the sliding housing 130 is connected to the hinge module 150, the sliding housing 130 may slide together with the folding housing 140 when the sliding operation is performed. In an embodiment, in response to movement of the folding housing 140, the sliding housing 130 may form the same plane with the folding housing 140, or may form the predetermined angle with the folding housing 140.

In an embodiment, the sliding housing 130 may slide in the +x-axis direction away from the roller 160 or in the −x-axis direction toward the roller 160. In an embodiment, the sliding direction of the sliding housing 130 may be guided by the first guide rail (e.g., the first guide rail 117 of FIG. 9A) formed on the first side cover 113 and the second side cover 114. For example, referring to FIG. 9A, the sliding housing 130 may have, on a side surface thereof, a guide portion (e.g., a guide portion 138 of FIG. 9A) that is at least partially accommodated in the first guide rail 117.

In an embodiment, the folding housing 140 may be connected to the sliding housing 130 through the hinge module 150. The folding housing 140 may be folded or unfolded relative to the sliding housing 130. For example, the folding housing 140 may form the same plane with the sliding housing 130, or may form an inclined surface having the predetermined angle with respect to the sliding housing 130. The folding housing 140 may at least partially overlap the base plate 111 of the base housing 110 in the z-axis direction. In an embodiment, when the sliding housing 130 slides, the folding housing 140 may slide together with the sliding housing 130 in the +x-axis or −x-axis direction.

In an embodiment, the rolling module 165 may be configured to support a rear surface of the display 190. The rolling module 165 may include a plurality of bars that extend in the y-axis direction and that are connected together so as to be bendable. In an embodiment, the rolling module 165 may be disposed such that at least a portion thereof surrounds the roller 160. One portion of the rolling module 165 may be located inside the base housing 110, and another portion of the rolling module 165 may extend to one side of the sliding housing 130 along an outer surface of the roller 160.

In an embodiment, the roller 160 may be coupled to the base plate 111. The shaft 161 of the roller 160 may be coupled to an edge of the base plate 111 so as to be rotatable. The shaft 161 of the roller 161 may extend in a direction perpendicular to the sliding direction. The roller 160 may be at least partially surrounded by the rolling module 165. The roller 160 may guide the rolling module 165 to allow the rolling module 165 and the display 190 to smoothly move when the sliding housing 130 and the folding housing 140 slide.

In an embodiment, referring to FIGS. 6A to 6D, the hinge module 150 may include a second rotary member 152 coupled to the sliding housing 130 and a first rotary member 151 coupled to the folding housing 140. The first rotary member 151 may be configured to rotate about a first rotational axis R1, and the second rotary member 152 may be configured to rotate about a second rotational axis R2. The first rotational axis R1 and the second rotational axis R2 may be parallel to each other. In various embodiments, the first rotational axis R1 and the second rotational axis R2 may be perpendicular to the sliding direction. The first rotational axis R1 and the second rotational axis R2 may be parallel to the extension direction of the shaft 161 of the roller 160. In various embodiments, the first rotary member 151 and the second rotary member 152 of the hinge module 150 may operate in conjunction with each other so as to rotate through the same angle in opposite directions. For example, the hinge module 150 may include a gear structure 153.

In an embodiment, the hinge module 150 may slide together with the sliding housing and the folding housing during the sliding operation. The hinge module 150 may be configured such that during the folding operation, the first rotary member 151 and the second rotary member 152 rotate to allow the sliding housing 130 and the folding housing 140 to be folded or unfolded.

Hereinafter, arrangements of the structures and the display depending on the states of the electronic device 100 will be described with reference to FIGS. 6A to 6D.

In the first state, the first region 191 and the second region 192 of the display may form the front surface of the electronic device 100. The first region 191 of the display 190 may be disposed on the folding housing 140, and the second region 192 of the display 190 may be disposed on the sliding housing 130. At least a portion of the third region 193 of the display 190 may be located inside the base housing 110. For example, the third region 193 of the display 190 may be disposed between the base plate 111 and the first cover 112. The rolling module 165 may support a rear surface of the third region 193 and a rear surface of a portion of the second region 192 of the display 190. At least a portion of the rolling module 165, together with the third region of the display 190, may be located between the base plate 111 and the first cover 112. The rolling module 165 may extend from the sliding housing 130 into the space between the base plate 111 and the first cover 112. At least a portion of the rolling module 165 may surround the roller 160. In the first state, the base housing 110 may overlap the sliding housing 130 and the folding housing 140 when viewed in the z-axis direction. The sliding housing 130 may at least partially make contact with the second cover 115 of the base housing 110.

In the second state, the first region 191 of the display 190 may obliquely extend from the second region 192. The folding housing 140 on which the first region 191 is disposed and the sliding housing 130 on which the second region 192 is disposed may be disposed to form the predetermined angle through the hinge module 150. At least a portion of the third region 193 of the display 190 may be located inside the base housing 110. For example, the third region 193 of the display may be disposed between the base plate 111 and the first cover 112. The rolling module 165 may support the rear surface of the third region 193 and the rear surface of the portion of the second region 192 of the display 190. At least a portion of the rolling module 165, together with the third region 193 of the display 190, may be located between the base plate 111 and the first cover 112. The rolling module 165 may extend from the sliding housing 130 into the space between the base plate 111 and the first cover 112. At least a portion of the rolling module 165 may surround the roller 160. In the second state, the base housing 110 may overlap the sliding housing 130 when viewed in the z-axis direction. The sliding housing 130 may at least partially make contact with the second cover 115 of the base housing 110. In the second state, the folding housing 140 and the first region 191 of the display 190 may be inclined with respect to the base plate 111 of the base housing 110.

When the electronic device 100 is changed from the first state to the second state, the folding housing 140 and the sliding housing 130 may rotate about the rotational axes R1 and R2, respectively. For example, the folding housing 140 and the sliding housing 130 may operate in conjunction with each other so as to rotate through the same angle in opposite directions.

In the third state, at least a portion of the third region 193 of the display 190 may form the front surface of the electronic device 100. For example, one portion of the third region 193, together with a portion of the rolling module 165 that supports the portion of the third region 193, may be located in the +z-axis direction of the base plate 111. Another portion of the third region 193 of the display 190 may be located inside the base housing 110. For example, the other portion of the third region 193, together with a portion of the rolling module 165, may be disposed between the base plate 111 and the first cover 112. The third region 193 of the display 190, together with the first region 191 and the second region 192, may form the front surface of the electronic device 100 and may form substantially the same plane. In an embodiment, the base housing 110 may overlap the sliding housing 130 and/or the folding housing 140 when viewed in the z-axis direction.

When the electronic device 100 is changed from the first state to the third state, the sliding housing 130 may slide (e.g., slide out) in the x-axis direction. The rolling module 165 connected to the sliding housing 130 may be pulled into the inner space of the base housing 110. As the rolling module 165 moves, the third region 193 may move to the front side of the electronic device 100. For example, one portion of the rolling module 165 may move in the +x-axis direction together with the sliding housing 130, another portion of the rolling module 165 may move in the −x-axis direction inside the base housing 110, and the other portion of the rolling module 165 may rotate while making contact with the roller. At this time, the roller 160 may rotate in the clockwise direction based on the drawing. In various embodiments, the rolling module 165 may move along the second guide rail formed on the first side cover 113 and/or the second side cover 114. The second guide rail 119 may include a straight section and a curved section surrounding the roller 160. The second guide rail 119, together with the roller 160, may guide movement of the rolling module 165.

In the fourth state, the first region 191 of the display 190 may obliquely extend from the second region 192. The folding housing 140 on which the first region 191 is disposed and the sliding housing 130 on which the second region 192 is disposed may be disposed to form the predetermined angle through the hinge module 150. One portion of the third region 193 of the display 190 may be located inside the base housing 110, and another portion of the third region 193 may be disposed to form the front surface of the electronic device 100 together with the first region 191 and the second region 192. For example, the first region 191 of the display 190 may be folded with the predetermined angle relative to the second region 192 and a portion of the third region 193. In the third state, the base housing 110 may overlap the sliding housing 130 when viewed in the z-axis direction. The sliding housing 130 may at least partially make contact with the second cover 115 of the base housing 110. In the third state, the folding housing 140 and the first region 191 of the display 190 may be inclined with respect to the base plate 111 of the base housing 110.

When the electronic device 100 is changed from the second state to the fourth state, the sliding housing 130 may move in the x-axis direction, and the rolling module 165 connected to the sliding housing 130 may be pulled in the x-axis direction. As the rolling module 165 moves, the third region 193 may move to the front side of the electronic device 100. For example, one portion of the rolling module 165 may move in the x-axis direction together with the sliding housing 130, another portion of the rolling module 165 may move in the −x-axis direction inside the base housing 110, and the other portion of the rolling module 165 may rotate while making contact with the roller 160. At least a portion of the rolling module 165 may surround the roller 160, and the roller 160 may rotate in the clockwise direction based on the drawing. In various embodiments, the rolling module 165 may move along the second guide rail 119 formed on the first side cover 113 and/or the second side cover 114. The second guide rail may include the straight section and the curved section surrounding the roller. The second guide rail 119, together with the roller 160, may guide movement of the rolling module 165.

When the electronic device 100 is changed from the third state to the fourth state, the folding housing 140 and the sliding housing 130 may rotate about the rotational axes R1 and R2, respectively. For example, the folding housing 140 and the sliding housing 130 may operate in conjunction with each other so as to rotate through the same angle in opposite directions.

Figure 7A:
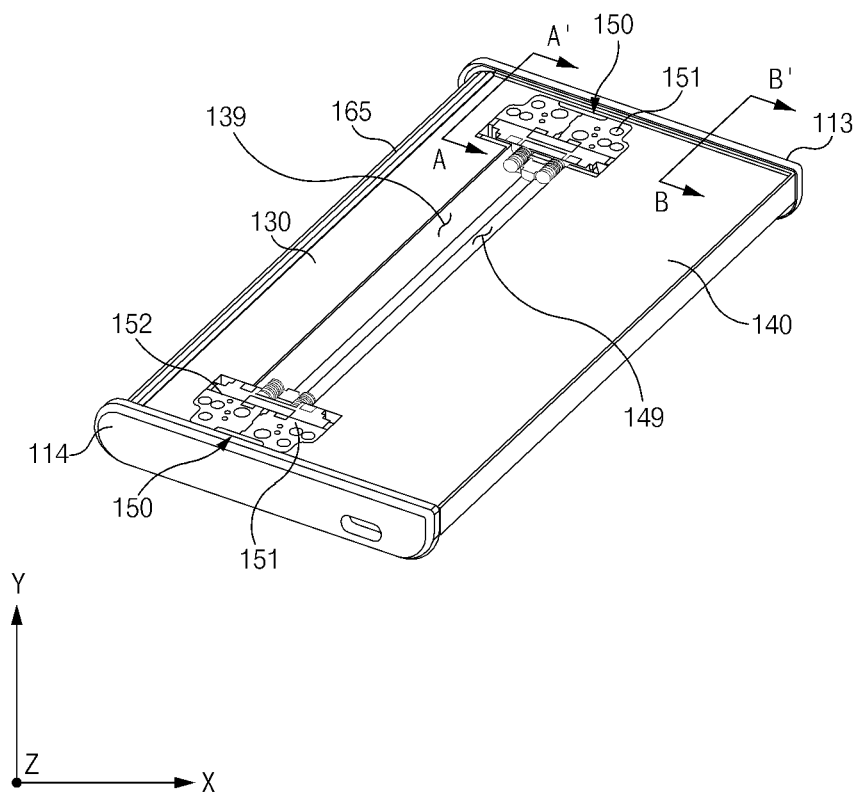
FIGS. 7A and 7B are views illustrating an internal structure of the electronic device in the first state according to various embodiments of the disclosure.
Figure 7B:
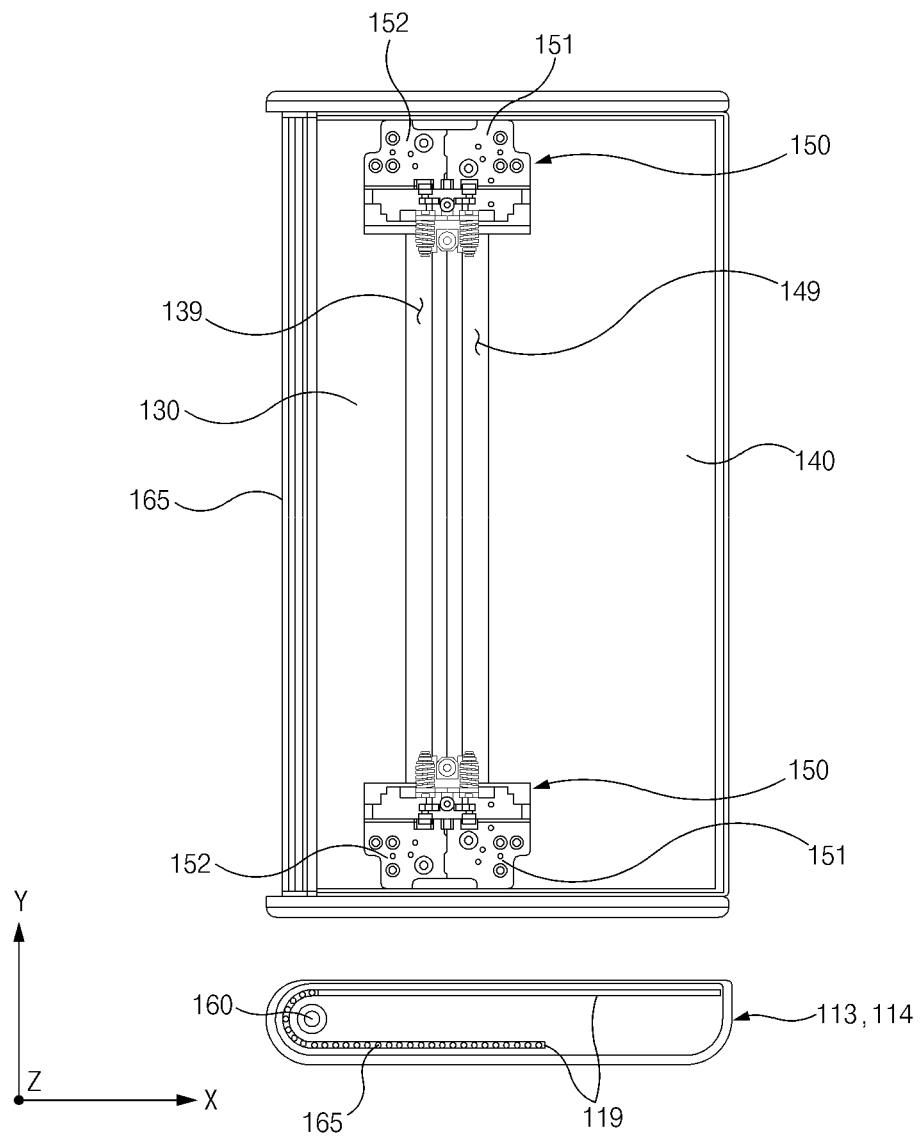
Figure 8A:
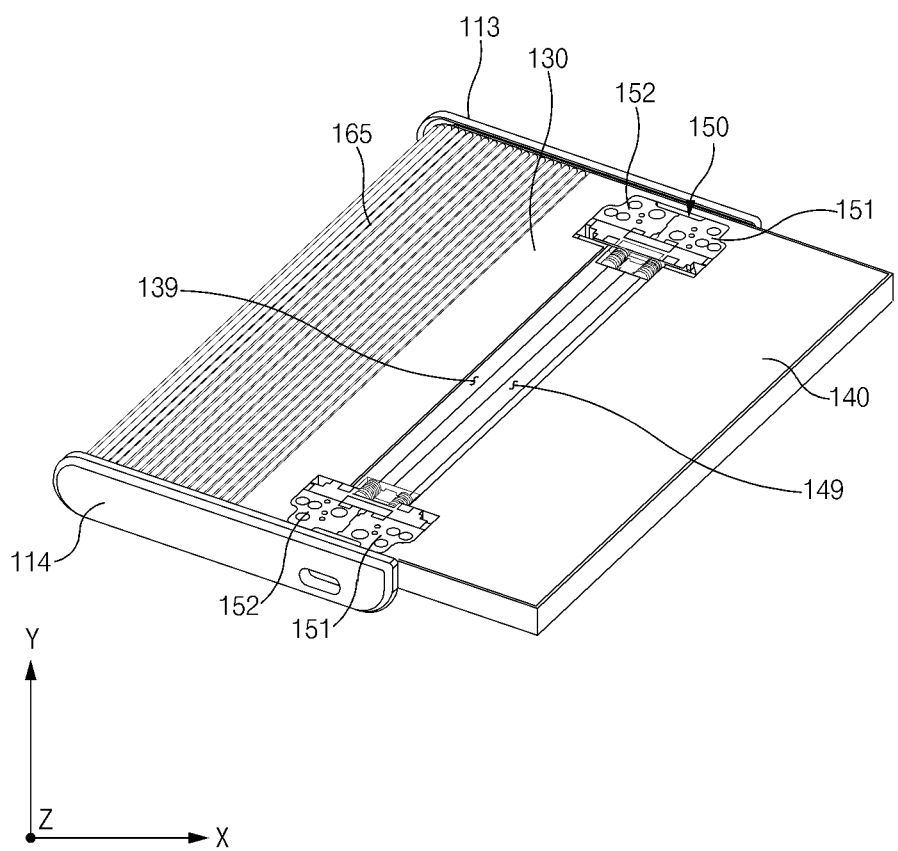
FIGS. 8A and 8B are views illustrating an internal structure of the electronic device in the third state according to various embodiments of the disclosure.
Figure 8B:
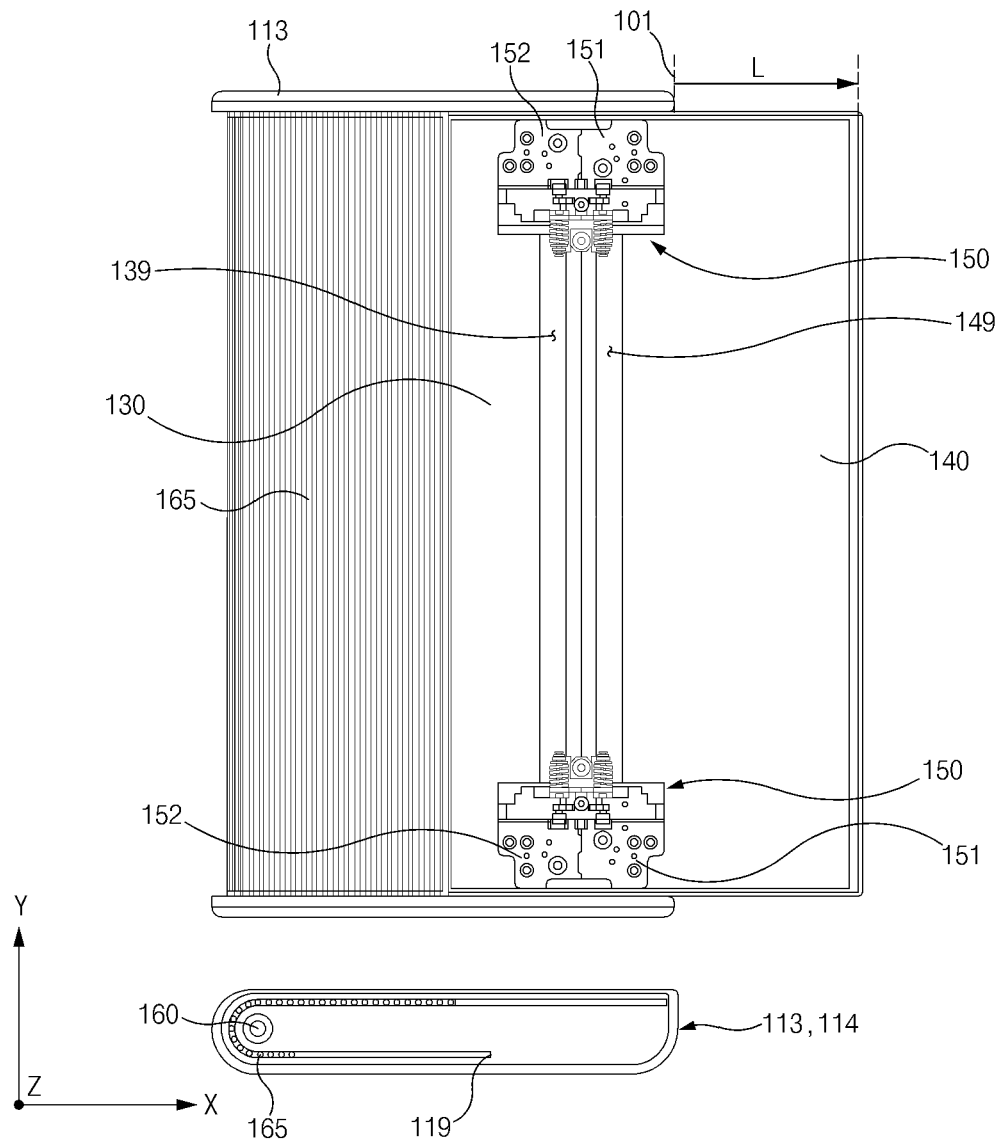

FIGS. 7A and 7B are views illustrating an internal structure of the electronic device in the first state according to various embodiments of the disclosure. FIGS. 8A and 8B are views illustrating an internal structure of the electronic device in the third state according to various embodiments of the disclosure.

Referring to FIGS. 7A, 7B, 8A, and 8B, the sliding housing 130 and the folding housing 140 may be connected by the hinge module 150. The hinge module 150 may include the first rotary member 151 connected to the folding housing 140 and the second rotary member 152 connected to the sliding housing 130.

In an embodiment, the first rotary member 151 may rotate about the first rotational axis R1, and the second rotary member 152 may rotate about the second rotational axis R2. The first rotational axis R1 and the second rotational axis R2 may be parallel to the y-axis. The first rotational axis R1 and the second rotational axis R2 may be formed in positions spaced apart from the display (e.g., the display 190 of FIGS. 6A to 6D) in the z-axis direction.

In an embodiment, the sliding housing 130 may include a first recess 139 formed on a portion thereof that is adjacent to the folding housing 140. The first recess 139 may extend in the y-axis direction. At least a portion of the hinge module 150 may be disposed in the first recess 139. The folding housing 140 may include a second recess 149 formed on a portion thereof that is adjacent to the sliding housing 130. The second recess 149 may extend in the y-axis direction. At least a portion of the hinge module 150 may be disposed in the second recess 149. The first recess 139 and the second recess 149 may form substantially one space. A portion of the display (e.g., the display 190 of FIGS. 6A to 6D) may be accommodated in the space. For example, the bending region of the display (e.g., the bending region 1902 of FIGS. 6A to 6D) may be accommodated in the space.

When the electronic device 100 is changed from the first state illustrated in FIGS. 7A and 7B to the third state illustrated in FIGS. 8A and 8B, the sliding housing 130 may slide in the x-axis direction. The rolling module 165 may be pulled by the sliding housing 130. Accordingly, one portion of the rolling module 165 may be pulled in the x-axis direction, and another portion of the rolling module 165 located inside the base housing 110 may be pulled in the −x-axis direction.

When the electronic device 100 is changed from the third state illustrated in FIGS. 8A and 8B to the first state illustrated in FIGS. 7A and 7B, the sliding housing 130 may slide in the −x-axis direction. The sliding housing 130 may press the rolling module 165 in the −x-axis direction. Accordingly, the one portion of the rolling module 165 may move in the −x-axis direction, and the other portion of the rolling module 165 located inside the base housing 110 may move in the x-axis direction.

Figure 9A:
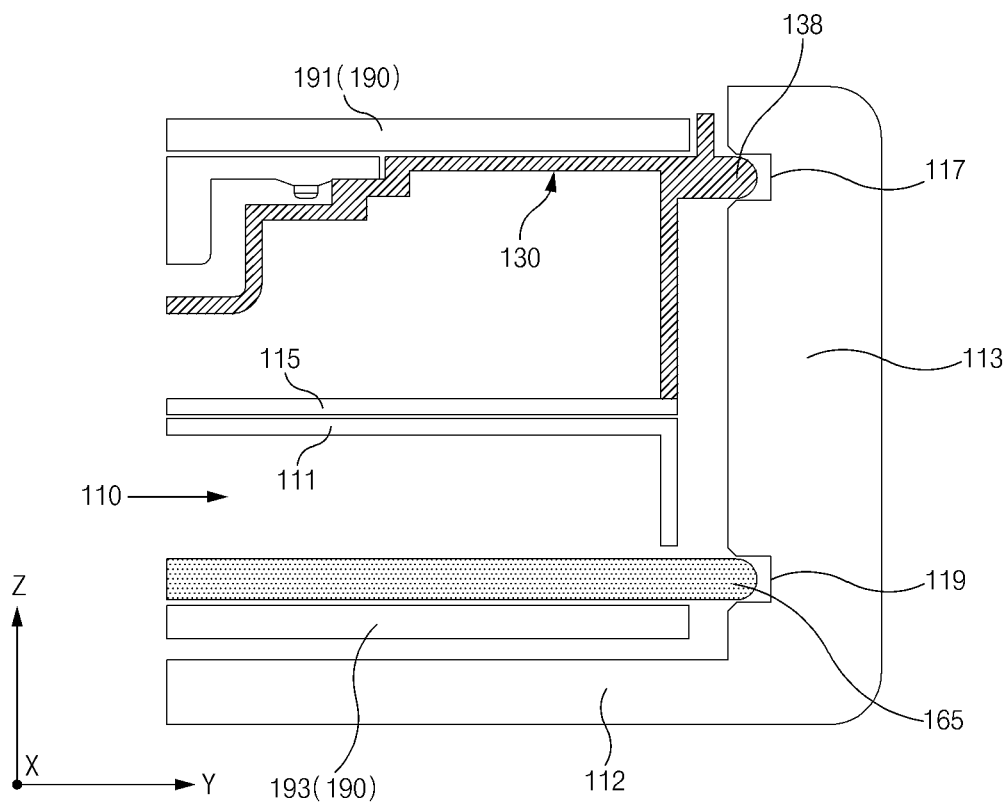
FIGS. 9A and 9B are views illustrating a sliding housing, a folding housing, and a base housing of the electronic device according to various embodiments of the disclosure.
Figure 9B:
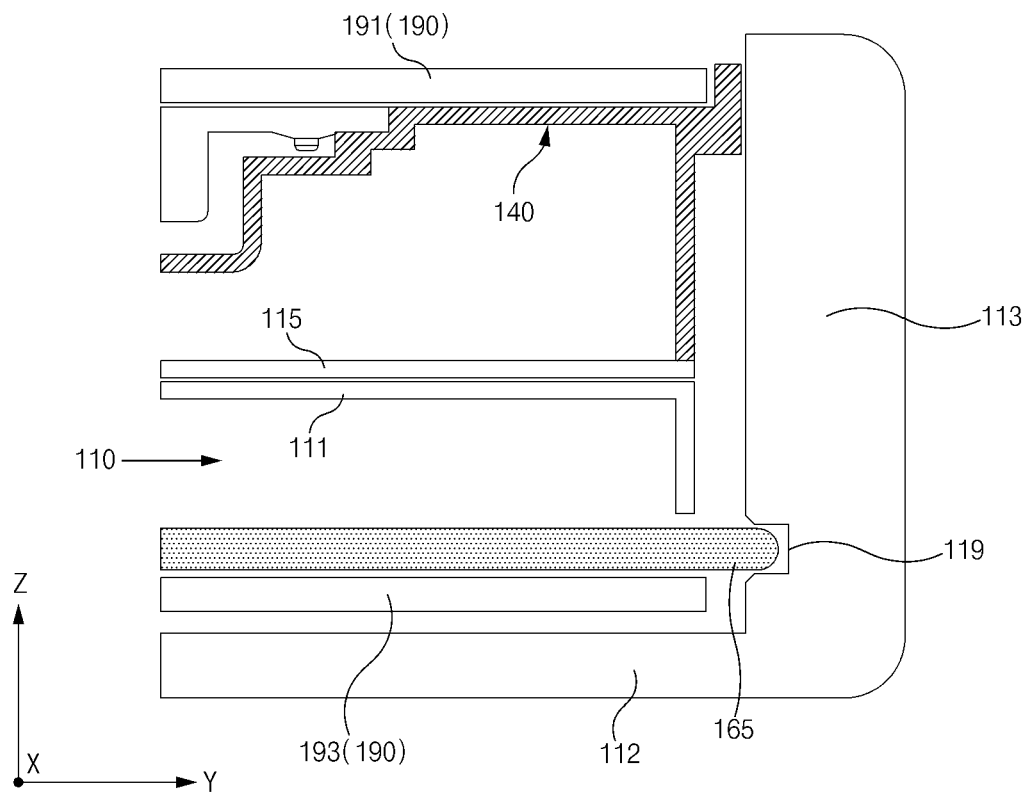

FIGS. 9A and 9B are views illustrating the sliding housing, the folding housing, and the base housing of the electronic device according to various embodiments of the disclosure. For example, FIG. 9A is a sectional view taken along line A-A of FIG. 7A, and FIG. 9B is a sectional view taken along line B-B of FIG. 7B.

Referring to FIG. 9A, the side covers 113 and 114 of the base housing 110 may include the second guide rail 119 for guiding the rolling module 165 and the first guide rail 117 for guiding the sliding housing 130.

In an embodiment, the guide portion 138 of the sliding housing 130 may be accommodated in the first guide rail 117. For example, the guide portion 138 of the sliding housing 130 may include a portion protruding in the y-axis direction.

In an embodiment, the sliding housing 130 may move in the x-axis direction as a user pushes the display 190 or the folding housing 140 in the x-axis direction or pulls the folding housing 140 in the x-axis direction. At this time, the sliding housing 130 may move in the state in which the guide portion 138 is accommodated in the first guide rail 117.

In an embodiment, the first guide rail 117 may extend in the x-axis direction to guide the sliding direction of the sliding housing 130. In various embodiments, the first guide rail 117 may extend within a range in which the sliding housing 130 is able to slide. For example, referring to FIG. 9A, the first guide rail 117 may not be formed in a position corresponding to the folding housing 140. In another embodiment, the first guide rail 117 may extend from a region with which the sliding housing 130 makes contact to a region with which the folding housing 140 makes contact. However, the folding housing 140 may not include a portion accommodated in the first guide rail 117.

Referring to FIG. 9B, the side covers 113 and 114 of the base housing 110 may include the second guide rail 119 for guiding the rolling module 165.

In an embodiment, the second guide rail 119 may extend within a range in which the rolling module is able to move. For example, the second guide rail 119 may extend from a region of the side covers 113 and 114 with which the sliding housing 130 makes contact to a region of the side covers 113 and 114 with which the folding housing 140 makes contact. In an embodiment, the second guide rail 119 may be formed in a shape corresponding to the path of the rolling module 165. For example, the second guide rail 119 may include a straight section and a curved section.

In an embodiment, at least some of the plurality of bars included in the rolling module 165 may be accommodated in the second guide rail 119. For example, the plurality of bars may extend in the y-axis direction, and end portions of the plurality of bars may be at least partially accommodated in the second guide rail 119.

Referring to FIG. 9B, the first guide rail 117 may not be coupled with the folding housing 140. For example, the first guide rail 117 may not be formed in the region with which the folding housing 140 makes contact and may extend only to the region with which the sliding housing 130 makes contact. Alternatively, even in a case in which the first guide rail 117 extends to the region with which the folding housing 140 makes contact, the folding housing 140 may not include a protruding portion accommodated in the first guide rail 117.

In an embodiment, when the electronic device 100 is changed from the first state to the third state or the fourth state, the folding housing 140 may slide together with the sliding housing 130. In this case, the sliding of the folding housing 140 may be guided by the sliding housing 130. For example, when the electronic device 100 is changed from the first state to the third state, the folding housing 140 may move in the x-axis direction as the guide portion 138 of the sliding housing 130 is accommodated in the first guide rail 117. For example, when the electronic device 100 is changed from the first state to the fourth state, the folding housing 140 may move in the x-axis direction in the state of being folded with the predetermined angle relative to the sliding housing 130.

In various embodiments, a guide structure for guiding the sliding housing 130 and/or the rolling module 165 is not limited to that illustrated in the drawing. For example, the guide structure may include a first guide rail formed on the sliding housing 130 and a guide portion formed on the side covers 113 and 114.

Figure 10A:
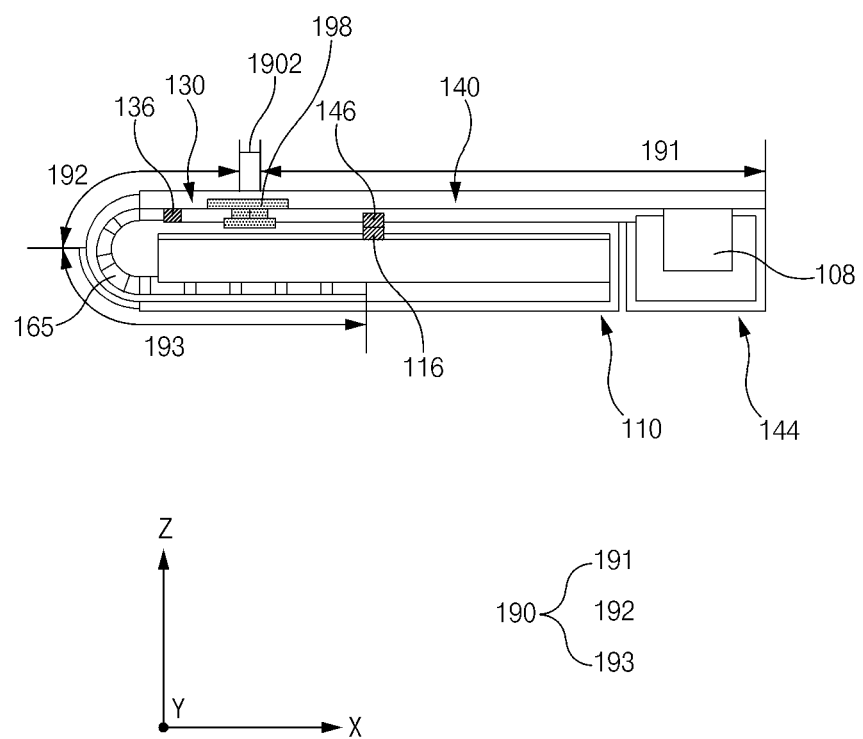
FIGS. 10A and 10B are views illustrating a sensor structure for detecting a state of the electronic device according to various embodiments of the disclosure.
Figure 10B:
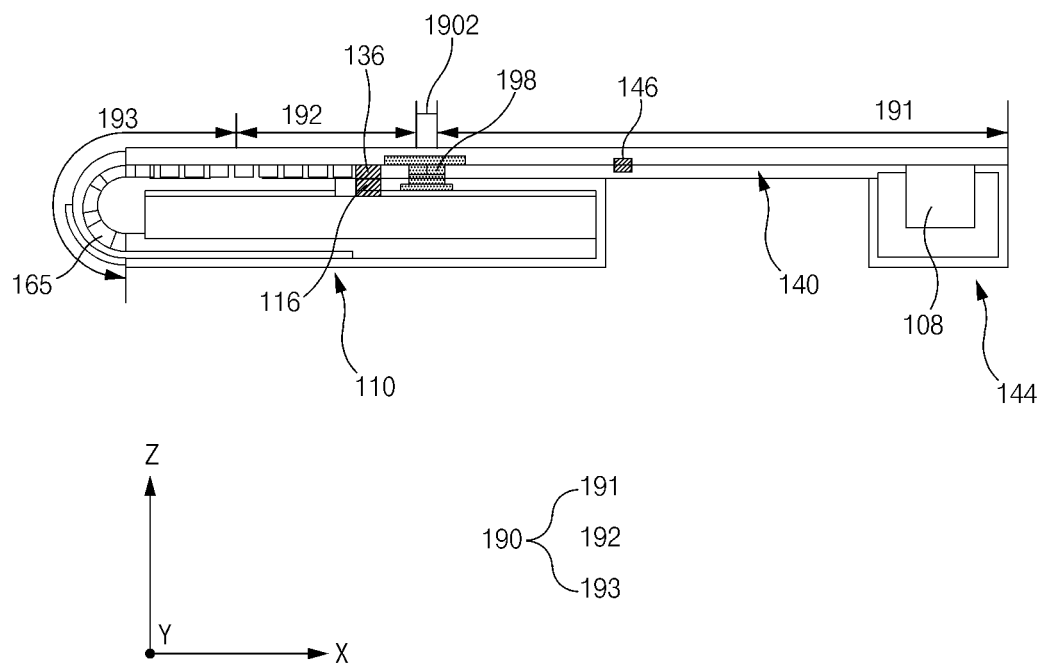
Figure 11A:
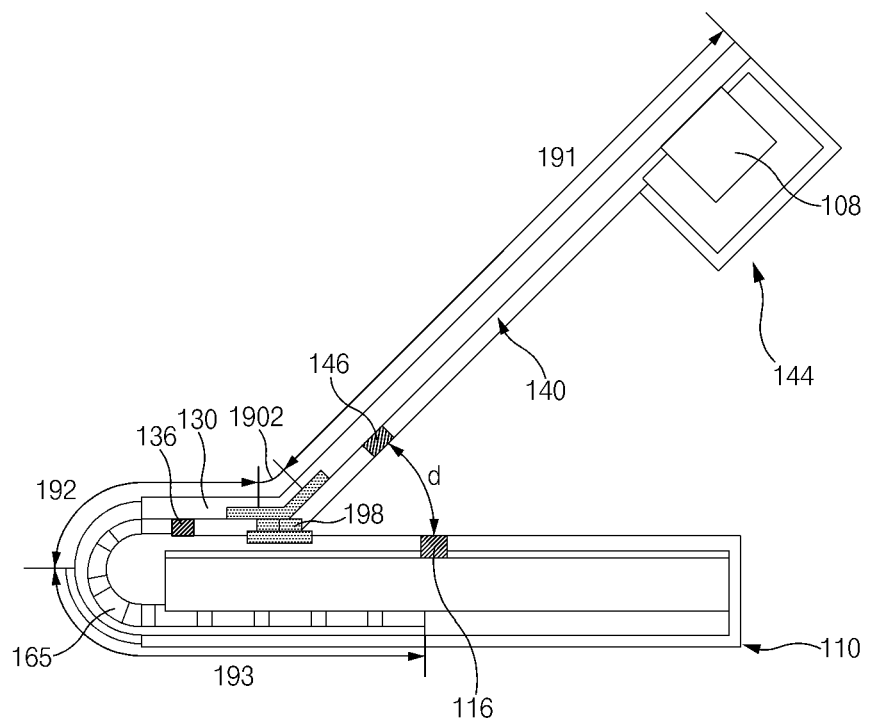
FIGS. 11A and 11B are views illustrating a sensor structure for detecting a state of the electronic device according to various embodiments of the disclosure.
Figure 11B:
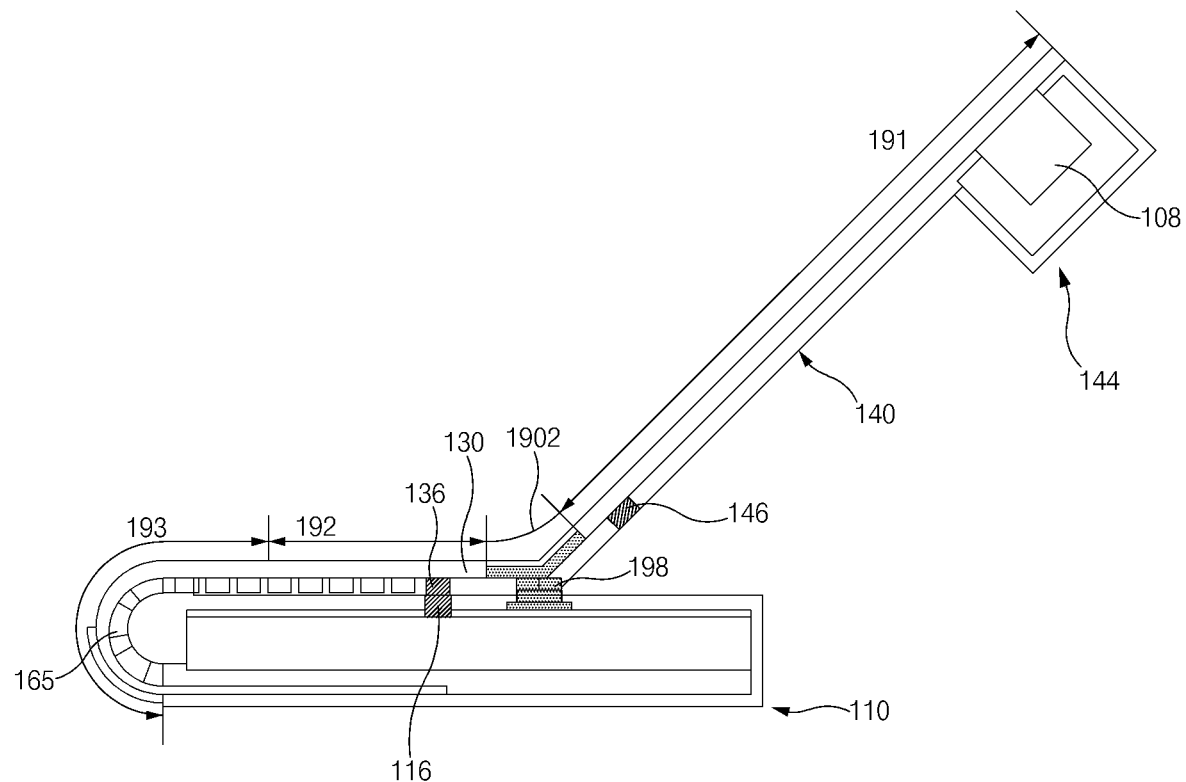

FIGS. 10A and 10B are views illustrating a sensor structure for detecting a state of the electronic device according to various embodiments of the disclosure. FIGS. 11A and 11B are views illustrating a sensor structure for detecting a state of the electronic device according to various embodiments of the disclosure.

FIG. 10A is a view illustrating the first state of the electronic device 100. FIG. 10B is a view illustrating the third state of the electronic device 100. FIG. 11A is a view illustrating the second state of the electronic device 100. FIG. 11B is a view illustrating the fourth state of the electronic device 100.

Referring to FIGS. 10A, 10B, 11A, and 11B, a sliding-in state may include the first state and the second state. In an embodiment, a sliding-out state may include the third state and the fourth state.

Figure 22:
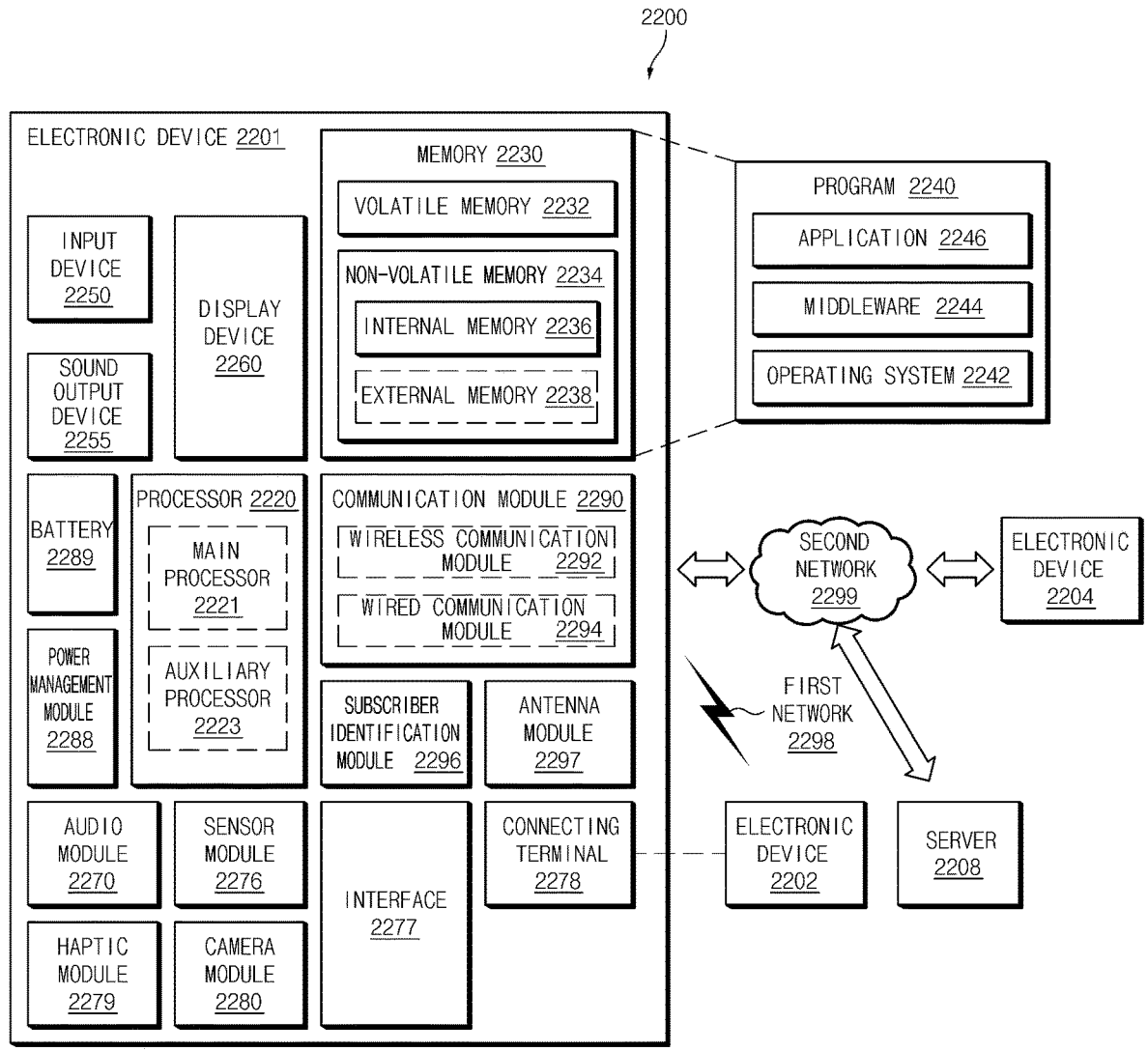
FIG. 22 is a block diagram of an electronic device in a network environment according to an embodiment of the disclosure.

In an embodiment, the electronic device 100 may include a processor (e.g., a processor 2220 of FIG. 22). The processor 2220 may detect and/or determine a state of the electronic device 100 using at least one of a first sensor 136, a second sensor 146, a third sensor 116, or a fourth sensor 198.

Referring to FIGS. 10A and 10B, the folding housing 140 of the electronic device 100 may further include an extension 144 disposed adjacent to a side surface of the base housing 110 in the first state. In the first state, the extension 144, together with the base housing 110, may form the rear surface of the electronic device 100. In various embodiments, a front camera module 108 may be disposed in the extension 144. In an embodiment, when the electronic device 100 performs a sliding-in operation from the third state to the second state, the folding housing 140 may move until the extension 144 makes contact with the base housing 110.

Referring to FIGS. 10A, 10B, 11A, and 11B, the electronic device 100 may include the first sensor 136, the second sensor 146, and the third sensor 116 that are related to a sliding operation. For example, based on a signal sensed by at least one of the first sensor 136, the second sensor 146, or the third sensor 116, the electronic device may determine whether the electronic device 100 is in a sliding-in state or a sliding-out state.

In an embodiment, the third sensor 116 may be disposed on the base housing 110, and the first sensor 136 and the second sensor 146 may be disposed on a structure that moves during a sliding operation. For example, the first sensor 136 and the second sensor 146 may be disposed on the sliding housing 130 and/or the folding housing 140. For example, referring to the drawings, the first sensor 136 may be disposed on the sliding housing 130, and the second sensor 146 may be disposed on the folding housing 140.

In an embodiment, the third sensor 116 may be configured to interact with the first sensor 136 and/or the second sensor 146. For example, referring to FIGS. 10A and 11A, the third sensor 116 may be disposed to face the first sensor 136 in a sliding-in state (e.g., the first state of FIG. 1 or the second state of FIG. 2). For example, in the sliding-in state, the third sensor 116 may at least partially overlap the first sensor 136 when viewed in the z-axis direction. In an embodiment, as the electronic device 100 performs a sliding-in operation, the third sensor 116 may make contact with the first sensor 136 or may be close to the first sensor 136 within a specified range, and the processor 2220 may detect whether the electronic device 100 is in a sliding-in state, based on a signal sensed by the third sensor 116.

For example, referring to FIGS. 10B and 11B, the third sensor 116 may be disposed to face the second sensor 146 in a sliding-out state (e.g., the third state of FIG. 3 or the fourth state of FIG. 4). For example, in the sliding-in state, the third sensor 116 may at least partially overlap the second sensor 146 when viewed in the z-axis direction. In an embodiment, as the electronic device 100 performs a sliding-out operation, the third sensor 116 may make contact with the second sensor 146 or may be close to the second sensor 146 within a specified range, and the processor 2220 may detect whether the electronic device 100 is in a sliding-out state, based on a signal sensed by the third sensor 116.

In an embodiment, the third sensor 116 may be configured to detect the distance between the third sensor 116 and each of the first sensor 136 and the second sensor 146 or to detect whether the third sensor 116 makes contact with each of the first sensor 136 and the second sensor 146. For example, the third sensor 116 may include a Hall sensor capable of sensing a magnetic field. For example, the first sensor 136 and the second sensor 146 may each include a coil and/or a magnet.

In various embodiments, the processor 2220 may determine whether a sliding operation is performed at present, in addition to whether the electronic device 100 is in a sliding-in/out state. For example, the first sensor 136 may include a first Hall sensor, the second sensor 146 may include a second Hall sensor, and the third sensor 116 may include a magnet and/or a coil. In this case, the processor 2220 may detect whether a sliding-in operation is performed and whether a sliding-out operation is performed, based on a first signal sensed by the first Hall sensor and a second signal sensed by the second Hall sensor. For example, when the first signal sensed by the first Hall sensor decreases and the second signal sensed by the second Hall sensor increases, the processor 2220 may determine that the sliding-out operation is performed. For example, when the first signal sensed by the first Hall sensor increases and the second signal sensed by the second Hall sensor decreases, the processor 2220 may determine that the sliding-in operation is performed. Furthermore, when a signal sensed by the second Hall sensor is measured in a specified range, the processor 2220 may determine that the electronic device 100 is in a sliding-out state, and when a signal sensed by the first Hall sensor is measured in a specified range, the processor 2220 may determine that the electronic device 100 is in a sliding-in state.

In various embodiments, the electronic device 100 may be configured such that each of the first sensor 136 and the second sensor 146 includes a magnet and/or a coil and the third sensor 116 includes a Hall sensor.

In an embodiment, the first sensor 136 may be electrically connected to a second circuit board (e.g., a second circuit board 172 of FIG. 15) that is disposed inside the sliding housing 130. The second sensor 146 may be electrically connected to a third circuit board (e.g., a third circuit board 173 of FIG. 16) that is disposed inside the folding housing 140. The third sensor 116 may be electrically connected to a first circuit board (e.g., a first circuit board 171 of FIG. 14) that is disposed inside the base housing 110.

Referring to FIGS. 11A and 11B, the electronic device 100 may include the fourth sensor 198 related to a folding operation. For example, based on a signal sensed by the fourth sensor 198, the electronic device 100 may determine whether the electronic device 100 is in a folded state or a flat state.

In an embodiment, the fourth sensor 198 may be disposed on the display. For example, the fourth sensor 198 may be at least partially located inside the display 190, or may be at least partially disposed on the rear surface of the display 190. In various embodiments, the fourth sensor 198 may be formed in a thin film form. For example, the fourth sensor 198 may include a thin film sensor for sensing pressure.

In various embodiments, the fourth sensor 198 may include a sensor 4a located on the first rotary member (e.g., the first rotary member 151 of FIGS. 8A and 8B) of the hinge module (e.g., the hinge module 150 of FIGS. 8A and 8B) and a sensor 4b located on the second rotary member (e.g., the second rotary member 152 of FIGS. 8A and 8B) of the hinge module (e.g., the hinge module 150 of FIGS. 8A and 8B). For example, the sensor 4*a* may include a magnet and/or a coil that forms a magnetic field, and the sensor 4*b* may include a Hall sensor that senses the magnetic field. For example, the sensor 4*b* may include a magnet and/or a coil that forms a magnetic field, and the sensor 4*a* may include a Hall sensor that senses the magnetic field.

Referring to FIGS. 10A, 10B, 11A, and 11B, the fourth sensor may be disposed to at least partially overlap the bending region 1902 of the display 190. For example, at least a portion of the fourth sensor 198 may be formed to be folded or unfolded together with the bending region 1902.

In various embodiments, the fourth sensor 198 may extend such that at least one portion thereof is formed on the sliding housing 130 and the other portion is formed on the folding housing 140. In this case, when a folding operation is performed, the length of the fourth sensor 198 may increase or decrease. For example, when the bending region 1902 is folded, the length of the fourth sensor 198 may increase, and the resistance value of a conductive pattern included in the fourth sensor 198 may increase. For example, the resistance value may increase as the display 190 is further folded. A current flowing through the conductive pattern may decrease due to the increased resistance. The processor 2220 may be configured to detect whether the electronic device 100 is in a folded state or a flat state, based on the current or a change in the current.

In various embodiments, the processor 2220 may be configured to detect whether the electronic device 100 is in a folded state or a flat state, based on at least one of the second sensor 146 or the third sensor 116. For example, referring to FIG. 11A, the electronic device 100 may be configured to detect whether the electronic device 100 is in the first state or the second state, based on a change in the distance d between the first sensor 136 disposed on the sliding housing 130 and the third sensor 116 disposed on the base housing 110. As the distance increases, the magnitude of a magnetic field measured by the third sensor 116 may decrease.

In various embodiments, the electronic device 100 may detect that the display 190 is in a flat state (e.g., the first state of FIG. 10A or the third state of FIG. 10B), based on the fourth sensor 198. The electronic device 100 may detect whether the electronic device 100 is in the first state or the third state, by comparing a first distance between the third sensor 116 and the first sensor 136 and a second distance between the third sensor 116 and the second sensor 146. For example, when the first distance is measured to be greater than the second distance, the electronic device 100 may determine that the electronic device 100 is in the first state. For example, when the first distance is measured to be smaller than the second distance, the electronic device 100 may determine that the electronic device 100 is in the third state. As the distance increases, the magnitude of a magnetic field measured by the third sensor 116 may decrease.

In various embodiments, the electronic device 100 may detect that the display 190 is in a folded state (e.g., the second state of FIG. 11A or the fourth state of FIG. 11B), based on the fourth sensor 198. The electronic device 100 may detect whether the electronic device 100 is in the second state or the fourth state, based on the first distance between the third sensor 116 and the first sensor 136 and the second distance between the third sensor 116 and the second sensor 146. For example, when the first distance is measured to be smaller than the second distance or when the first sensor 136 and the third sensor 116 make contact with each other, the electronic device 100 may determine that the electronic device 100 is in the fourth state. For example, when the third sensor 116 is spaced apart from the first sensor 136 and the second sensor 146 by more than a specified distance, the electronic device 100 may determine that the electronic device 100 is in the second state. As the distance increases, the magnitude of a magnetic field measured by the third sensor 116 may decrease.

In various embodiments, the electronic device 100 determined to be in a folded state may be determined to be in the fourth state, when the third sensor 116 and the first sensor 136 make contact with each other. Additionally, based on the distance d between the third sensor 116 and the second sensor 146, whether the electronic device 100 is in the second state or the fourth state may be determined.

Figure 12A:
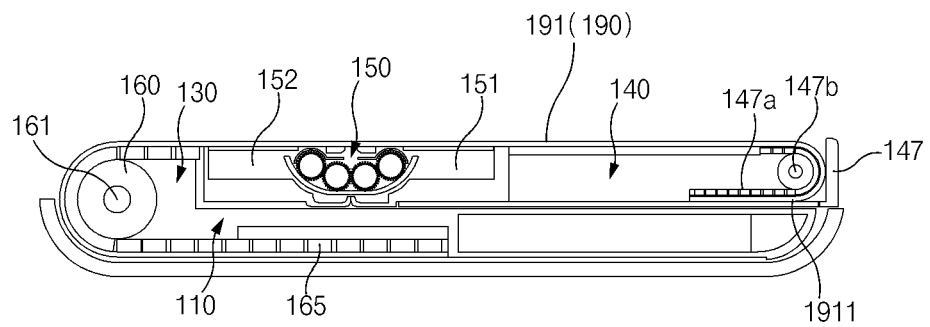
FIGS. 12A, 12B, and 12C are views illustrating a sliding operation and a folding operation of the electronic device according to various embodiments of the disclosure.
Figure 12B:
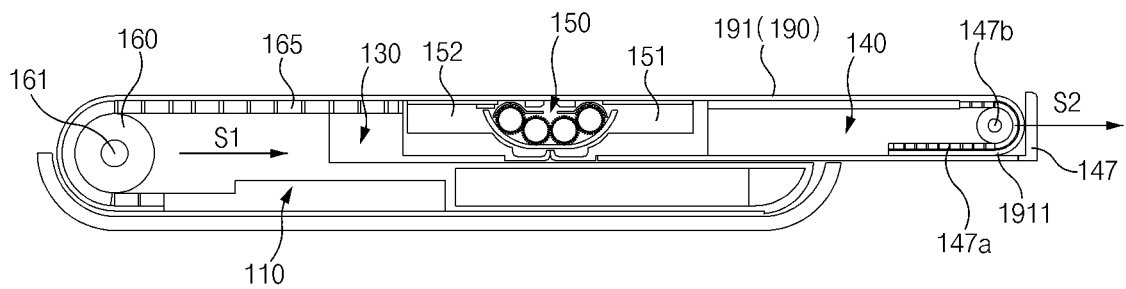
Figure 12C:
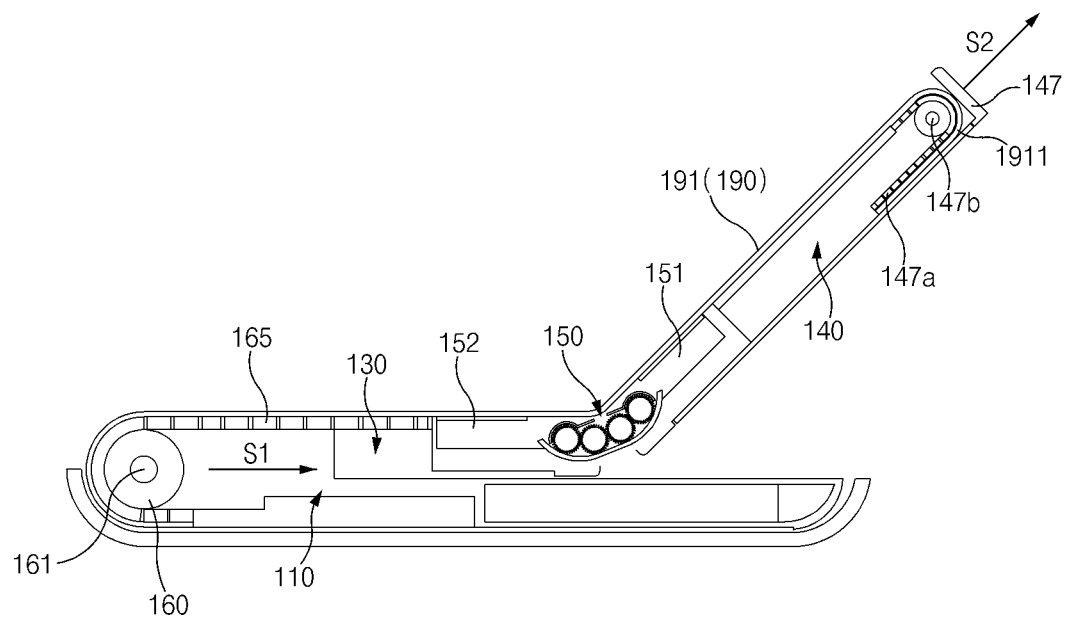

FIGS. 12A, 12B, and 12C are views illustrating a sliding operation and a folding operation of the electronic device according to various embodiments of the disclosure.

Referring to FIGS. 12A, 12B and 12C, the electronic device 100 may be configured to be capable of a first sliding operation S1, a second sliding operation S1, and a folding operation. The first sliding operation S1 and the folding operation are the same as those described with reference to FIGS. 1, 2, 3, 4, 5, 6A to 6D, 7A, 7B, 8A, 8B, 9A, 9B, 10A, 10B, 11A, and 11B. Therefore, descriptions thereabout will be omitted.

In an embodiment, the folding housing 140 may further include a second sliding housing 147. At least a portion of the second sliding housing 147 may be located inside the folding housing 140. The second sliding housing 147 may be coupled to the folding housing 140 so as to slide. For example, the second sliding housing 147 may move such that at least a portion thereof further extends outside the folding housing when the second sliding operation S2 is performed.

In an embodiment, the first region 191 of the display 190 may further include an additional extension region 1911. The additional extension region 1911 may be disposed inside the second sliding housing 147, or may be moved to the front side of the electronic device 100 by the rolling module 165 when the second sliding operation is performed.

In an embodiment, the second sliding housing 147 may include a second roller 147*b* and a second rolling module 147*a*. The second roller 147*b* may be coupled to the second sliding housing 147 so as to be rotatable. The second roller 147*b* may move together with the second sliding housing 147 when the second sliding operation is performed. The second roller 147*b* may be at least partially surrounded by the second rolling module 147*a*.

In an embodiment, the second rolling module 147*a* may support the rear surface of the first region 191 of the display 190. For example, the second rolling module 147*a* may be formed to surround the second roller 147*b*. At least a portion of the second rolling module 147*a* may be located inside the second sliding housing 147. When the second sliding operation is performed, a portion of the second rolling module 147*a* located inside the second sliding housing 147 may move to a surface of the second sliding housing 147 along the second roller 147*b*. At this time, the additional extension region 1911 of the display 190 coupled to the second rolling module 147*a* may move to the surface of the second sliding housing 147 together with the second rolling module 147*a*, and the additional extension region 1911 of the display 190 may form a portion of the front side of the electronic device 100.

In an embodiment, the second sliding operation S2 may be performed independently of the first sliding operation S1 and the folding operation.

Figure 13:
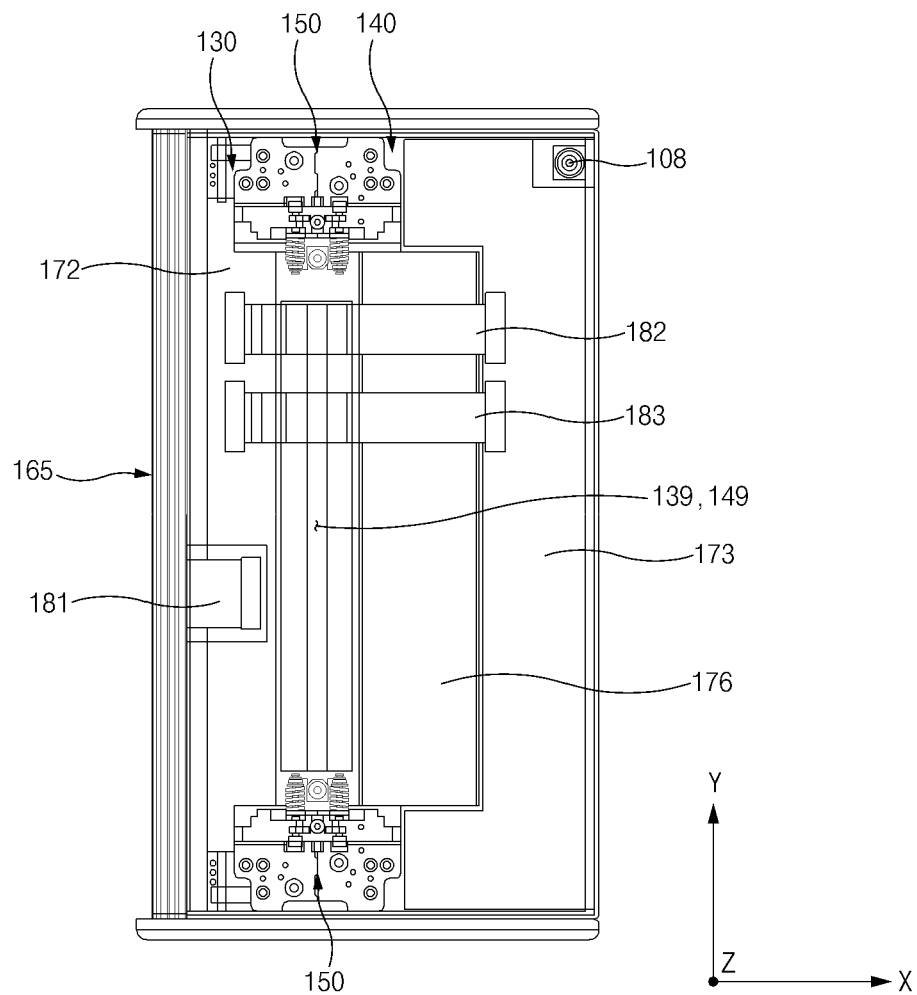
FIG. 13 is a view illustrating an arrangement of parts of the electronic device according to an embodiment of the disclosure.

FIG. 13 is a view illustrating an arrangement of parts of the electronic device according to an embodiment of the disclosure. For example, FIG. 13 is a view illustrating a front part of the electronic device.

Figure 14:
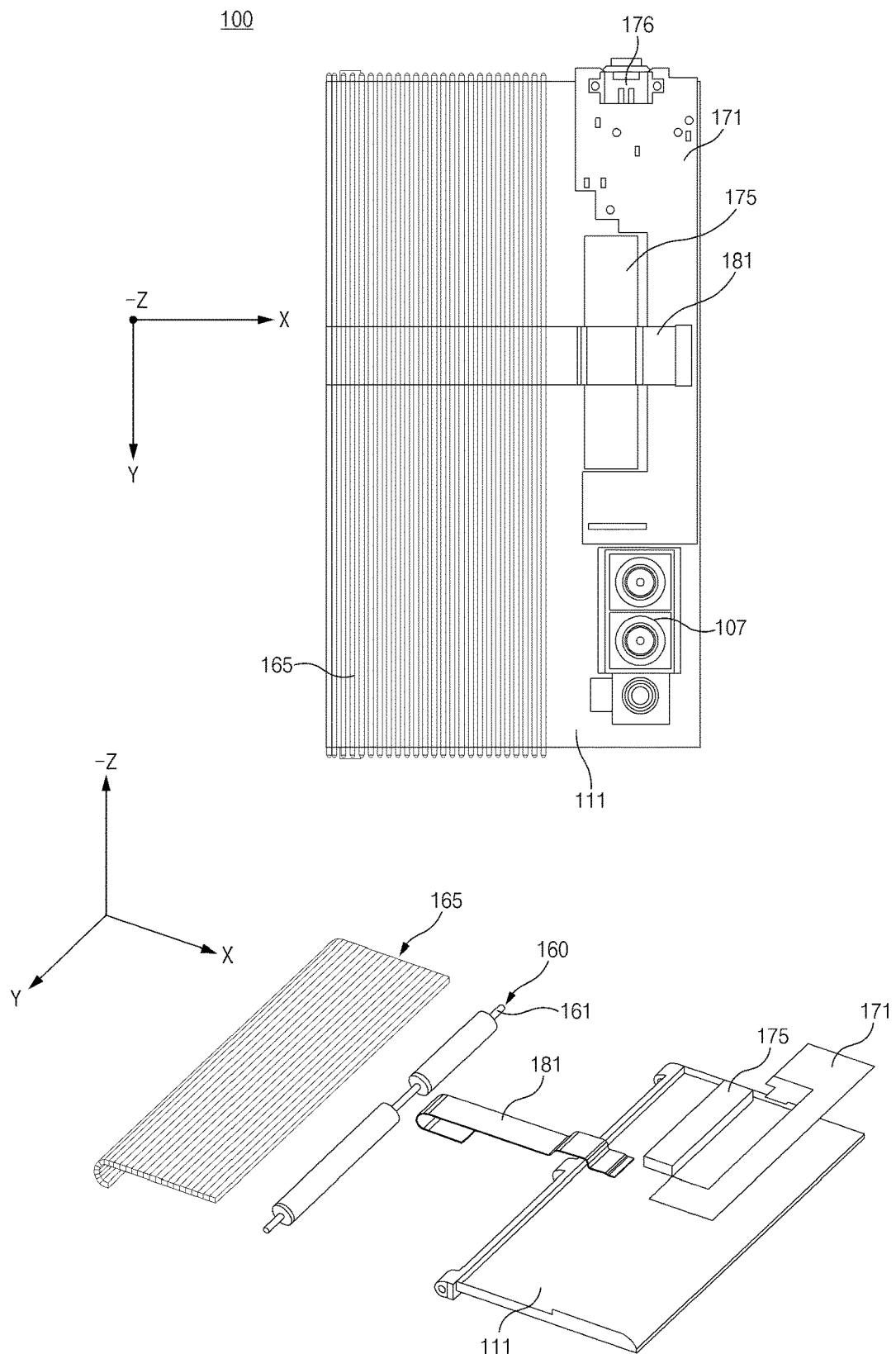
FIG. 14 is a view illustrating parts disposed on the base housing of the electronic device according to an embodiment of the disclosure.

FIG. 14 is a view illustrating an arrangement of parts of the electronic device according to an embodiment of the disclosure. For example, FIG. 14 is a view illustrating a rear part of the electronic device.

Figure 15:
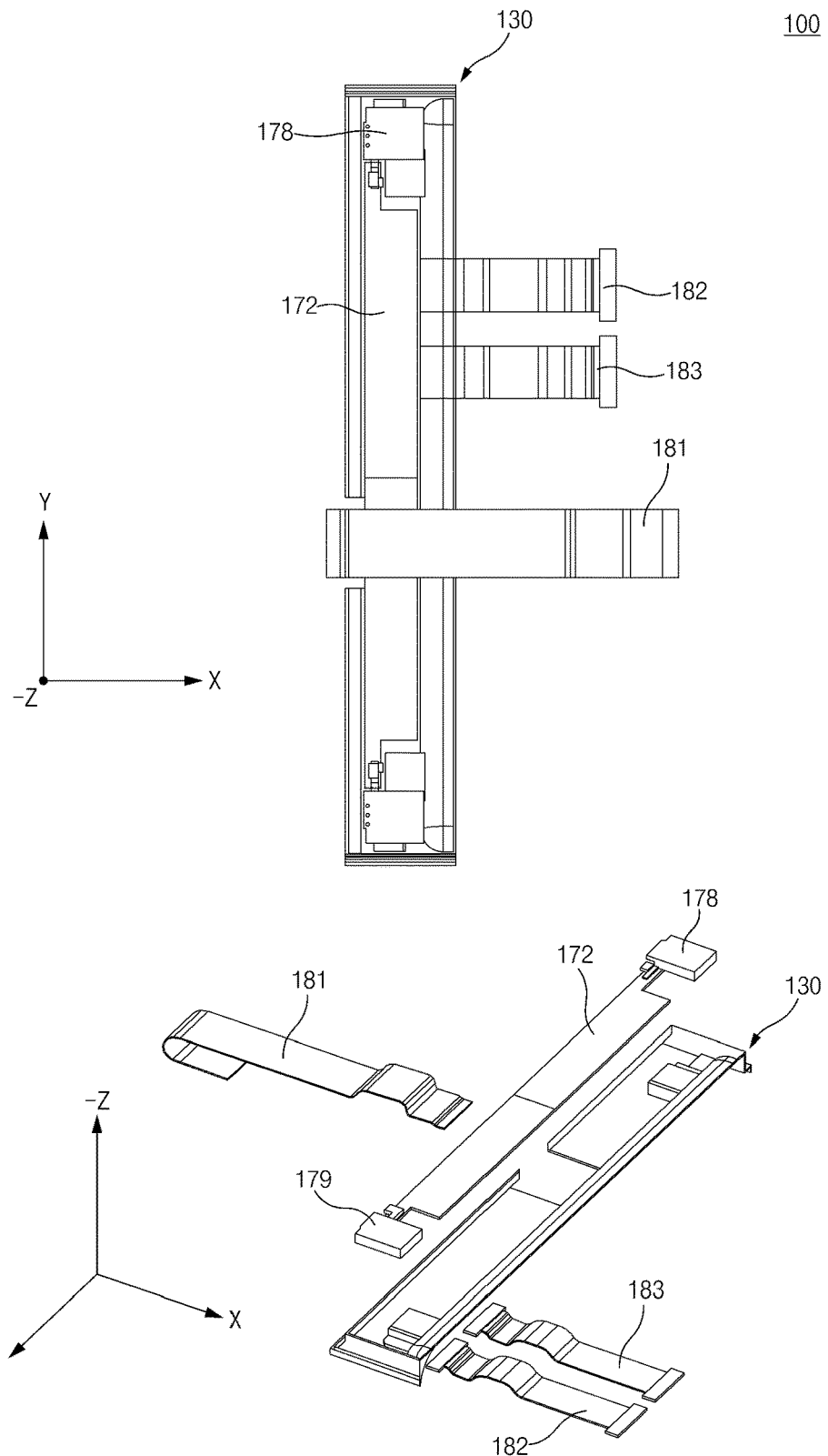
FIG. 15 is a view illustrating parts disposed on the sliding housing of the electronic device according to an embodiment of the disclosure.

FIG. 15 is a view illustrating parts disposed on the sliding housing of the electronic device according to an embodiment of the disclosure.

Figure 16:
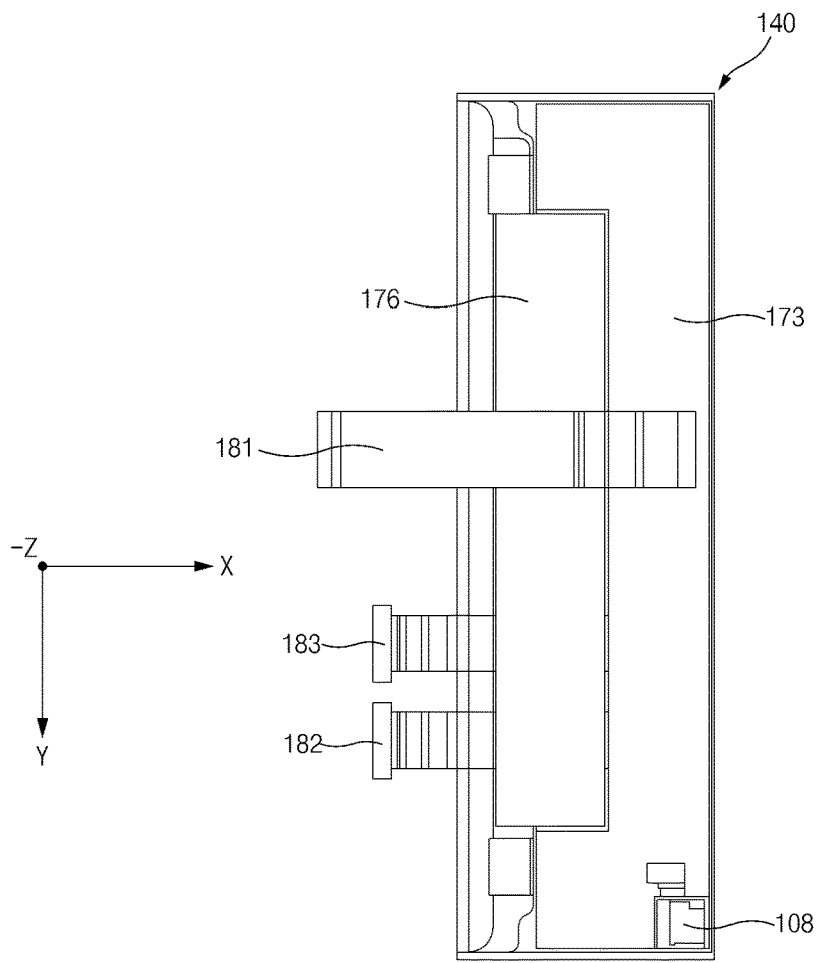
FIG. 16 is a view illustrating parts disposed on the folding housing of the electronic device according to an embodiment of the disclosure.
Figure 16:
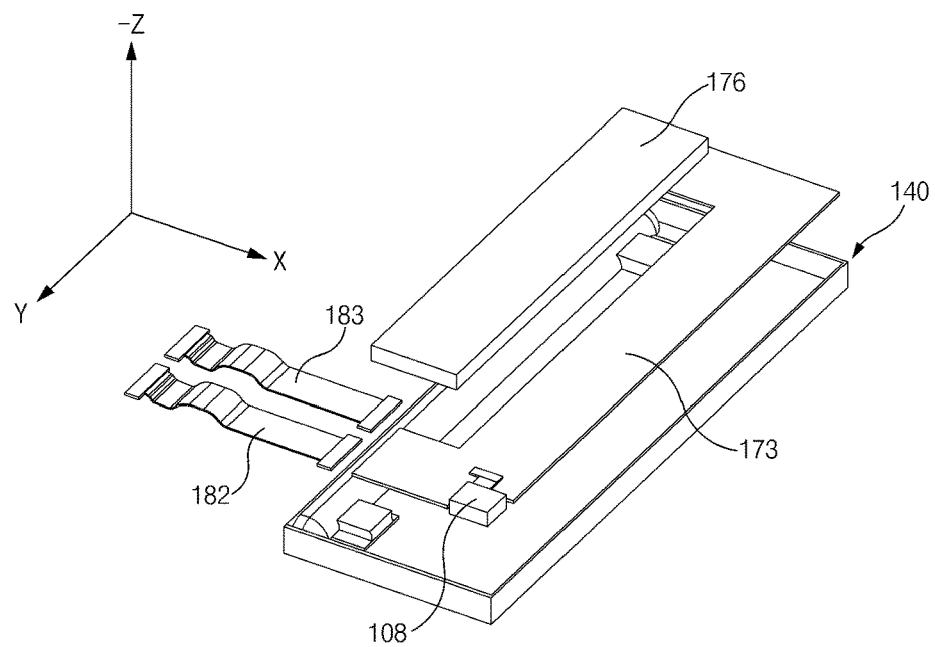

FIG. 16 is a view illustrating parts disposed on the folding housing of the electronic device according to an embodiment of the disclosure.

The electronic device 100 may include a plurality of parts. The plurality of components may be disposed on the base housing 110, the sliding housing 130, and the folding housing 140. The arrangements of the parts illustrated and described in FIGS. 13 to 16 are merely illustrative, and internal structures of the electronic device 100 according to embodiments of the disclosure are not limited to those illustrated in FIGS. 13 to 16.

Referring to FIGS. 13 and 14, the electronic device 100 may include the first circuit board 171, the second circuit board 172, the third circuit board 173, a first flexible substrate 181, a second flexible substrate 182, a third flexible substrate 183, a first battery 175, and a second battery 176. Referring to FIG. 13, the second circuit board 172, the third circuit board 173, the second flexible substrate 182, the third flexible substrate 183, and the second battery 176 may be located on the front part of the electronic device 100 (e.g., in the +z-axis direction). Referring to FIG. 14, the first circuit board 171 and the first battery 175 may be located on the rear part of the electronic device 100 (e.g., in the −z-axis direction). Referring to FIGS. 13 and 14, the first flexible substrate 181 may extend from the front part to the rear part.

Referring to FIG. 13, the sliding housing 130 and the folding housing 140 may be connected by the hinge module 150 so as to be folded or unfolded. For example, the first rotary member 151 of the hinge module 150 may be coupled to the folding housing 140, and the second rotary member 152 of the hinge module 150 may be coupled to the sliding housing 130. The sliding housing 130 may be connected to the rolling module 165, and the sliding housing 130 and the rolling module 165 may move together.

Referring to FIG. 14, the first circuit board 171 and the first battery 175 may be disposed inside the base housing 110. For example, the first circuit board 171 and the first battery 175 may be disposed on the base plate 111 of the base housing 110. A rear camera module 107 may be disposed on the base plate 111. The rear camera module 107 may be electrically connected to the first circuit board 171. The first circuit board 171 may be electrically connected with the second circuit board 172, which is disposed on the sliding housing 130, through the first flexible substrate 181. The first flexible substrate 181 may at least partially extend into the space between the rolling module 165 and the base plate 111. The first flexible substrate 181 may extend to surround the shaft 161 of the roller 160. The first circuit board 171 may include a connector 176 connected with the display 190. For example, the connector 176 may electrically connect a display driver IC and the first circuit board 171.

Referring to FIGS. 13 and 15, the second circuit board 172 may be disposed on the sliding housing 130. The second circuit board 172 may be electrically connected with the first circuit board 171 by the first flexible substrate 181. For example, the first flexible substrate 181 may have a sufficient length such that the electrical connection between the first circuit board 171 and the second circuit board 172 is maintained even in a state (e.g., the third state or the fourth state) in which the sliding housing 130 is slid in the x-axis direction. To this end, the first flexible substrate 181 may further extend by the distance that the sliding housing 130 moves in the x-axis direction.

Referring to FIG. 15, the first speaker module 178 and the second speaker module 179 may be disposed on the sliding housing 130. The first speaker module 178 and the second speaker module 179 may be electrically connected with the second circuit board 172. The first speaker module 178 and the second speaker module 179 may move together with the sliding housing 130 and may provide sound corresponding to deformation (extension/retraction) of a display region. In an embodiment, a speaker hole (e.g., the speaker hole 109 of FIG. 1) may be formed over a movement range of the sliding housing 130 to correspond to a change in the positions of the speaker modules 178 and 179.

Referring to FIGS. 13 and 16, the third circuit board 173, the second battery 176, and the front camera module 108 may be disposed on the folding housing 140.

Referring to FIGS. 13, 15, and 16, the second circuit board 172 and the third circuit board 173 may be electrically connected by the second flexible substrate 182 and the third flexible substrate 183. The second flexible substrate 182 and the third flexible substrate 183 may extend across the space in which in a folded state (e.g., the second state or the fourth state), the display 190 is accommodated. For example, referring to FIGS. 7A and 7B, the space in which the display 190 is accommodated may include the first recess 139 and the second recess 149. In an embodiment, the second flexible substrate 182 and the third flexible substrate 183 may have a sufficient length such that the electrical connection between the second circuit board 172 and the third circuit board 173 is maintained even in a folded state. For example, the second flexible substrate 182 and the third flexible substrate 183 may further extend by a length that is increased when the electronic device is in a folded state, as compared with when the electronic device is in a flat state.

Figure 17A:
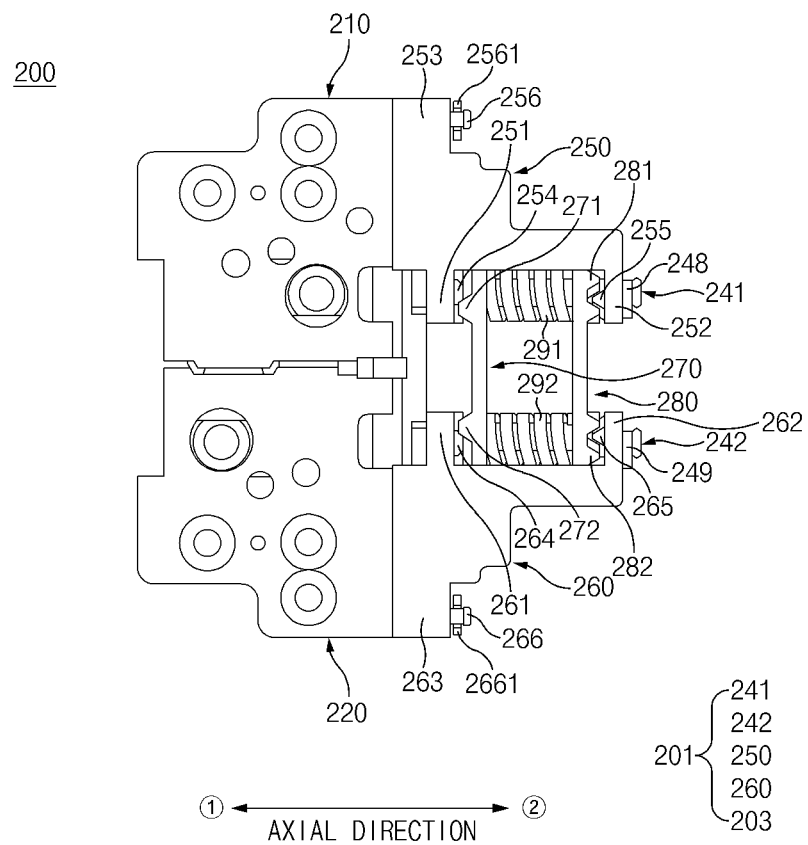
FIGS. 17A and 17B are views illustrating a hinge module of the electronic device according to various embodiments of the disclosure.
Figure 17B:
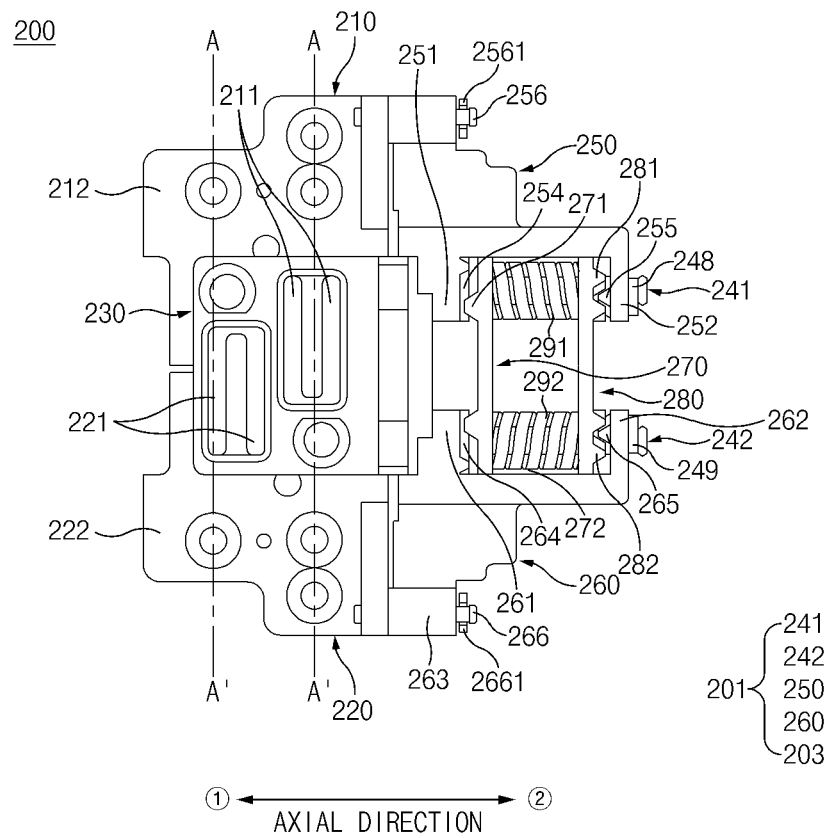

FIGS. 17A and 17B are views illustrating a hinge module of the electronic device according to various embodiments of the disclosure.

Figure 18:
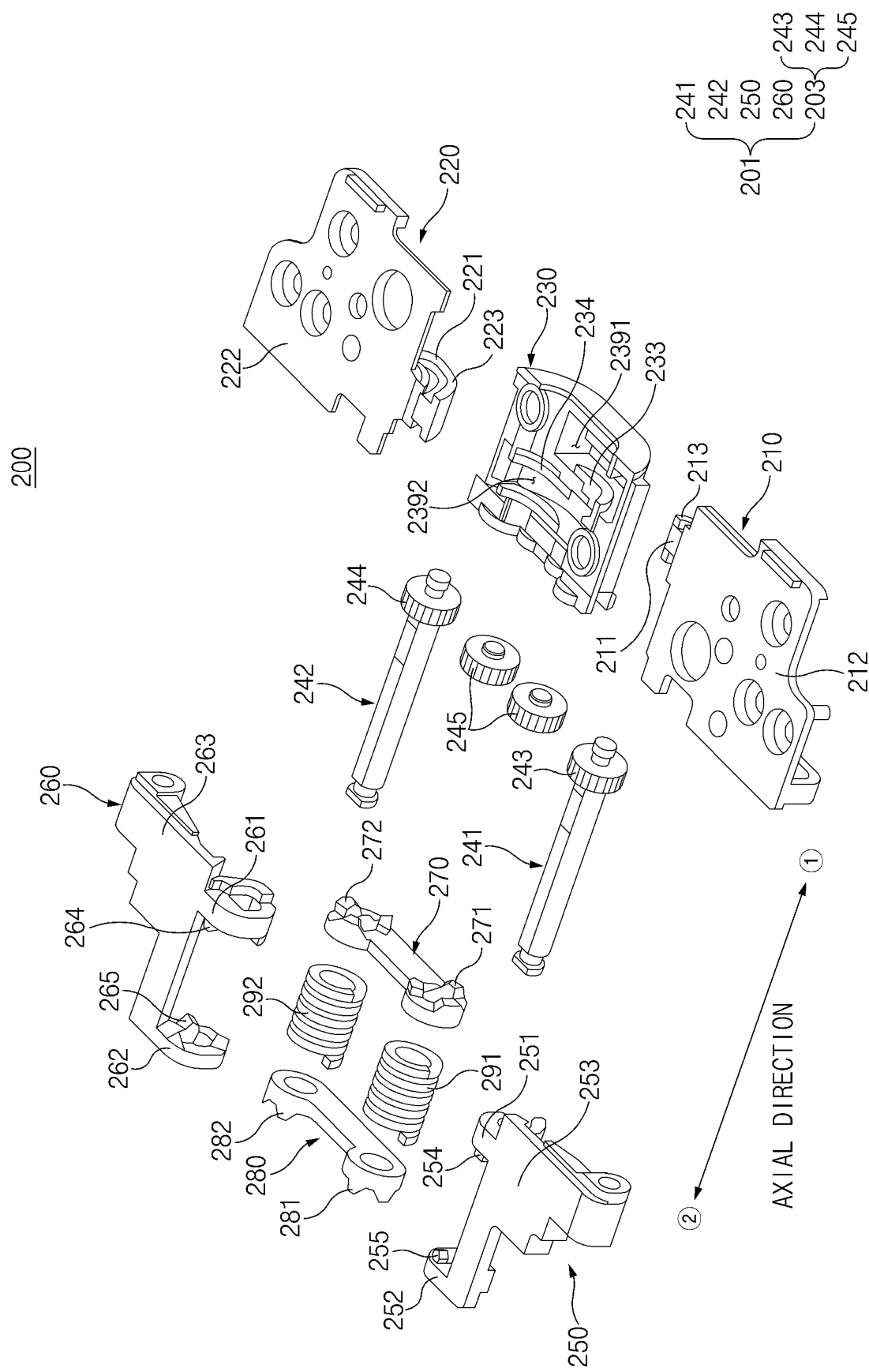
FIG. 18 is a view illustrating the hinge module of the electronic device according to an embodiment of the disclosure.

FIG. 18 is a view illustrating the hinge module of the electronic device according to an embodiment of the disclosure.

Figure 19A:
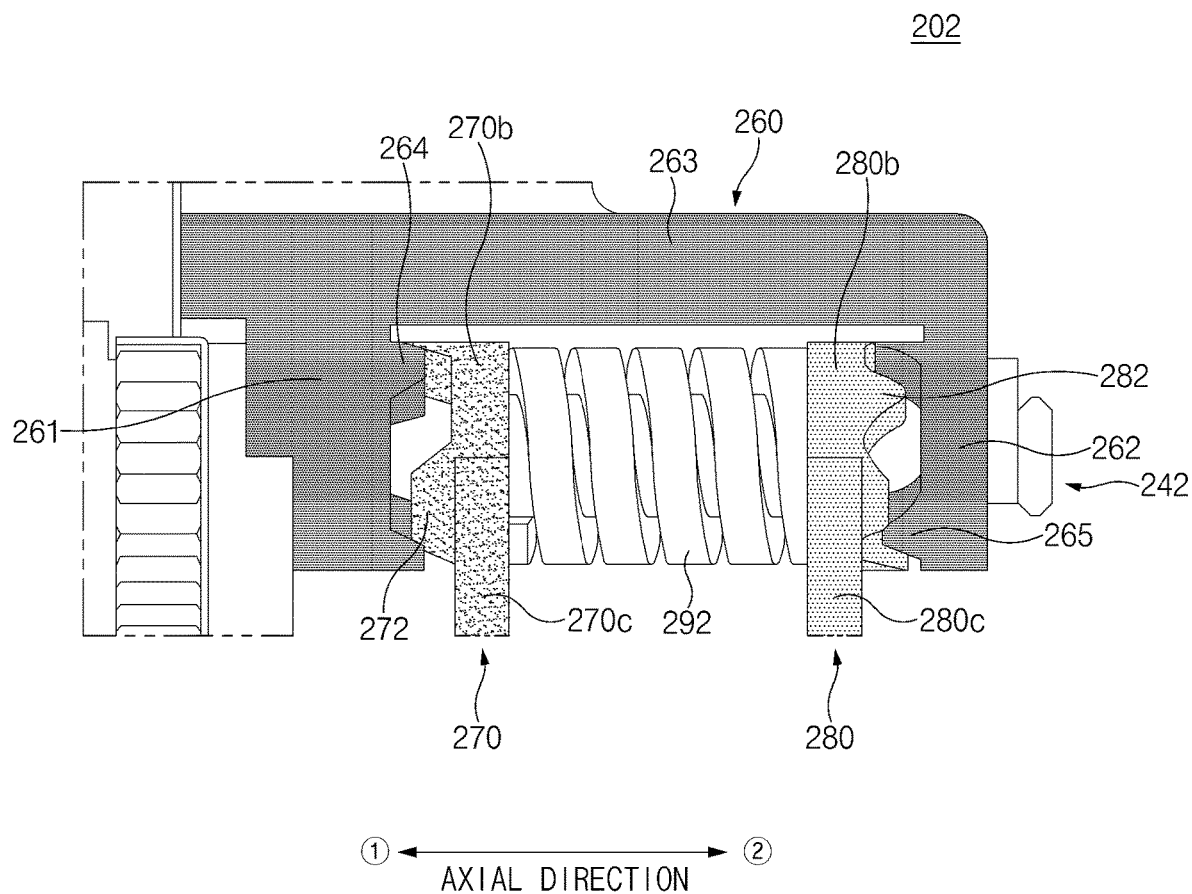
FIGS. 19A and 19B are views illustrating a torque structure of the hinge module of the electronic device according to various embodiments of the disclosure.
Figure 19B:
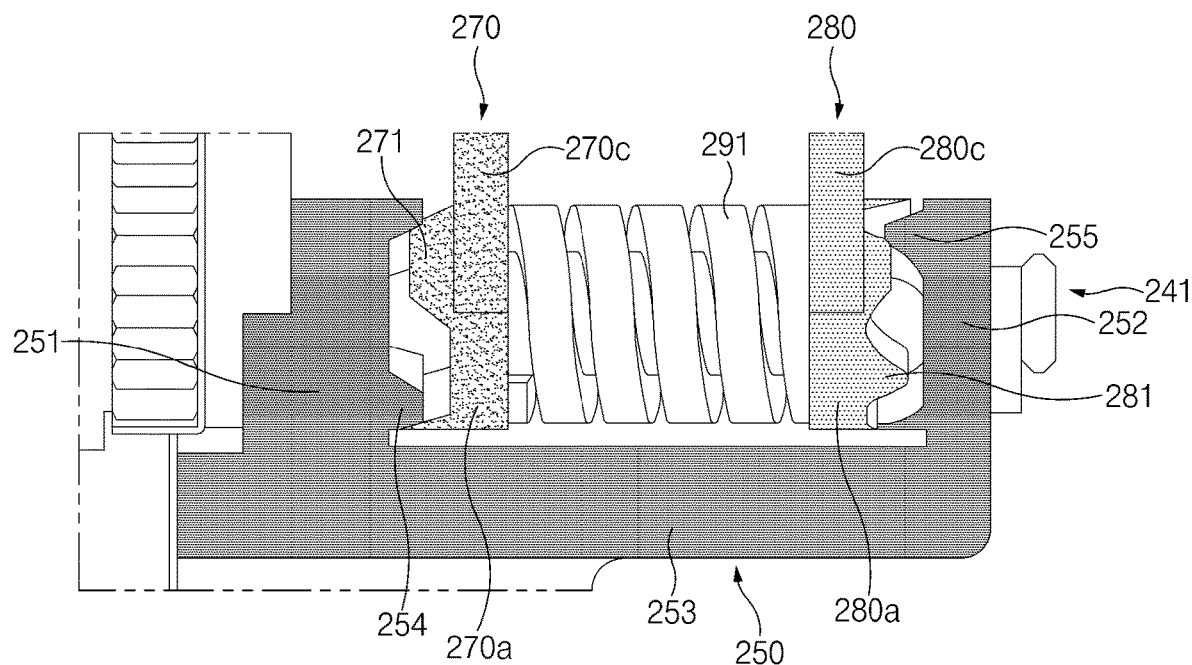

FIGS. 19A and 19B are views illustrating the hinge module of the electronic device according to various embodiments of the disclosure.

FIGS. 17A and 17B are views illustrating the hinge module according to an embodiment. FIG. 18 is an exploded perspective view of the hinge module according to an embodiment. FIG. 17A is a plan view of the hinge module as viewed in the +z-axis direction. FIG. 17B is a plan view of the hinge module as viewed in the −z-axis direction.

Referring to FIGS. 17A, 17B, and 18, an axial direction may be defined. The axial direction may be a direction (e.g., the y-axis direction of FIG. 5) perpendicular to the sliding direction. The axial direction may be a direction parallel to the shaft of the roller (e.g., the shaft 161 of the roller of FIG. 5). The axial direction may be a direction parallel to the extension direction of the first rotational axis R1 and the second rotational axis R2. For example, a first axial direction ① may be a direction toward a fixed member 230, and a second axial direction ② may be a direction toward a second cam member 280.

In an embodiment, the hinge module 200 (e.g., the hinge module 150 of FIGS. 7A and 7B) may include the fixed member 230, a first rotary member 210 (e.g., the first rotary member 151 of FIGS. 7A and 7B), a second rotary member 220 (e.g., the second rotary member 152 of FIGS. 7A and 7B), an arm structure 201, and a torque structure 202.

In an embodiment, at least a portion of the fixed member 230 may be disposed in a space (e.g., the first recess 139 and the second recess 149) between the sliding housing (e.g., the sliding housing 130 of FIGS. 7A and 7B) and the folding housing (e.g., the folding housing 140 of FIGS. 7A and 7B). The first rotary member 210 and the second rotary member 220 may be coupled to the fixed member 230 so as to be rotatable.

In an embodiment, the fixed member 230 may include a first opening region 2391 to which a first guide portion 211 of the first rotary member 210 is coupled. In an embodiment, the fixed member 230 may include a first guide rail 233 for guiding a rotational path of the first rotary member 210. For example, the first guide rail 233 may be formed on a sidewall of the first opening region 2391. For example, the first guide rail 233 may be formed on at least one of opposite sidewalls of the first opening region 2391 that face the axial direction. In an embodiment, a first protruding portion 213 of the first rotary member 210 may be accommodated in the first guide rail 233.

In an embodiment, the fixed member 230 may include a second opening region 2392 to which a second guide portion 221 of the second rotary member 220 is coupled. In an embodiment, the fixed member 230 may include a second guide rail 234 for guiding a rotational path of the second rotary member 220. For example, the second guide rail 234 may be formed on a sidewall of the second opening region 2392. For example, the second guide rail 234 may be formed on at least one of opposite sidewalls of the second opening region 2392 that face the axial direction. In an embodiment, a second protruding portion 223 of the second rotary member 220 may be accommodated in the second guide rail 234.

In an embodiment, the first rotary member 210 may be configured to rotate along a predetermined path relative to the fixed member 230 when the folding housing (e.g., the folding housing 140 of FIGS. 6A, 6B, 6C, 6D, 7A, and 7B) and the sliding housing (e.g., the sliding housing 130 of FIGS. 6A, 6B, 6C, 6D, 7A, and 7B) are folded or unfolded. In an embodiment, the first rotary member 210 may include the first guide portion 211 coupled to the fixed member 230 so as to be rotatable and a first connecting portion 212 connected to the folding housing 140. In an embodiment, the first rotary member 210 may include the first protruding portion 213 formed on the first guide portion 211. The first protruding portion 213, together with the first guide rail 233, may guide the rotational path of the first rotary member 210.

In an embodiment, the second rotary member 220 may be configured to rotate along a predetermined path relative to the fixed member 230 when the folding housing (e.g., the folding housing 140 of FIGS. 6A, 6B, 6C, 6D, 7A, and 7B) and the sliding housing (e.g., the sliding housing 130 of FIGS. 6A, 6B, 6C, 6D, 7A, and 7B) are folded or unfolded. In an embodiment, the second rotary member 220 may include the second guide portion 221 coupled to the fixed member 230 so as to be rotatable and a second connecting portion 222 connected to the sliding housing 130. In an embodiment, the second rotary member 220 may include the second protruding portion 223 formed on the second guide portion 221. The second protruding portion 223, together with the second guide rail 234, may guide the rotational path of the second rotary member 220.

In an embodiment, the arm structure 201 may include a first arm shaft 241, a second arm shaft 242, a first arm part 250, a second arm part 260, and a gear structure 203 (e.g., the gear structure 153 of FIGS. 6A to 6D).

In an embodiment, the gear structure 203 may cause the first rotary member 210 and the second rotary member 220 to operate in conjunction with each other such that the first rotary member 210 and the second rotary member 220 rotate in opposite directions by the same angle. In an embodiment, the gear structure 203 may include a first gear 243 formed on an outer circumferential surface of the first arm shaft 241, a second gear 244 formed on an outer circumferential surface of the second arm shaft 242, and connecting gears 245 connecting the first gear 243 and the second gear 244. For example, the first gear 243 of the first arm shaft 241 and the second gear 244 of the second arm shaft 242 may be engaged through an even number of connecting gears 245. Accordingly, the first arm shaft 241 and the second arm shaft 242 may be engaged with each other to rotate in opposite directions by the same angle. The first arm part 250 coupled to the first arm shaft 241 and the second arm part 260 coupled to the second arm shaft 242 may rotate in opposite directions by the same angle. Accordingly, the first rotary member 210 and the second rotary member 220 may rotate in opposite directions by the same angle.

In an embodiment, the first arm shaft 241 may be coupled to the fixed member 230 so as to be rotatable. For example, the first arm shaft 241 may extend from the fixed member 230 in the second axial direction ②. For example, an end portion of the first arm shaft 241 that faces the first axial direction ① may be rotatably inserted into a recess or opening formed in the fixed member 230. For example, a first fixing ring 248 may be coupled to an end portion of the first arm shaft 241 that faces the second axial direction ②. The first fixing ring 248 may prevent separation of the first arm shaft 241 from a second coupling portion 252 of the first arm part 250. In an embodiment, the first arm shaft 241, when viewed from the fixed member 230 in the second axial direction ②, may pass through a first coupling portion 251 of the first arm part 250, a first cam member 270, a first elastic member 291, the second cam member 280, and the second coupling portion 252 of the first arm part 250. For example, the first coupling portion 251 and the second coupling portion 252 of the first arm part 250 may be coupled to the first arm shaft 241 to rotate together with the first arm shaft 241. For example, the first coupling portion 251 and the second coupling portion 252 may be press-fit onto the first arm shaft 241. For example, the first arm shaft 241 may pass through the first cam member 270 and the second cam member 280. The first cam member 270 and the second cam member 280 may linearly move in the axial direction along the first arm shaft 241 without rotating together with the first arm shaft 241. For example, the first elastic member 291 may include a coil spring surrounding the first arm shaft 241. The first elastic member 291 may be compressed or uncompressed in the axial direction without rotating together with the first arm shaft 241.

In an embodiment, when the first rotary member 210 rotates, the first arm part 250 may rotate together with the first arm shaft 241 and may slide relative to the first rotary member 210. In an embodiment, the first arm part 250 may include the first coupling portion 251 and the second coupling portion 252 that are coupled to the first arm shaft 241, and a first extending portion 253 including a first sliding pin 256. The first coupling portion 251 and the second coupling portion 252 may extend from the first extending portion 253 in a direction perpendicular to the axial direction.

In an embodiment, a first arm cam 254 may be formed on the first coupling portion 251, and a second arm cam 255 may be formed on the second coupling portion. For example, the first arm cam 254 may be engaged with a first moving cam 271 of the first cam member 270. For example, the second arm cam 255 may be engaged with a third moving cam 281 of the second cam member 280. In an embodiment, the first arm cam 254 and the second arm cam 255 may be formed to face each other. For example, the first arm cam 254 may include a protrusion protruding in the second axial direction ②, and the second arm cam 255 may include a protrusion protruding in the first axial direction ①.

In an embodiment, in relation to rotation of the first arm part 250, the first coupling portion 251 and the second coupling portion 252 may be press-fit onto the first arm shaft 241. Accordingly, the first coupling portion 251 and the second coupling portion 252 may rotate together with the first arm shaft 241, and the first extending portion 253 may rotate about the first arm shaft 241. In an embodiment, the first coupling portion 251 and the second coupling portion 252 may be spaced apart from each other in the axial direction. For example, the first coupling portion 251 may be located in the first axial direction ①, compared to the second coupling portion 252. For example, the first elastic member 291, one portion of the first cam member 270, and one portion of the second cam member 280 may be disposed between the first coupling portion 251 and the second coupling portion 252.

In an embodiment, in relation to sliding of the first arm part 250, the first sliding pin 256 of the first extending portion 253 may be fastened to the first rotary member 210. For example, at least a portion of the first sliding pin 256 may be accommodated in a first sliding groove of the first rotary member 210 (e.g., a first sliding groove 215 of FIGS. 21A, 21B, and 21C). For example, the first sliding pin 256 may move along the first sliding groove 215 when the first rotary member 210 rotates. A fixing ring 2561 may be coupled to an end portion of the first sliding pin 256. In an embodiment, when the first rotary member 210 rotates about the first rotational axis R1, the first arm part 250 may rotate about the first arm shaft 241 while sliding relative to the first rotary member 210. For example, the first arm part 250 may slide in the state in which the first sliding pin 256 is fastened to the first rotary member 210.

In an embodiment, the second arm shaft 242 may be coupled to the fixed member 230 so as to be rotatable. For example, the second arm shaft 242 may extend from the fixed member 230 in the second axial direction ②. For example, an end portion of the second arm shaft 242 that faces the first axial direction ① may be rotatably inserted into a recess or opening formed in the fixed member 230. For example, a second fixing ring 249 may be coupled to an end portion of the second arm shaft 242 that faces the second axial direction ②. The second fixing ring 249 may prevent separation of the second arm shaft 242 from a fourth coupling portion 262 of the second arm part 260. In an embodiment, the second arm shaft 242, when viewed from the fixed member 230 in the second axial direction ②, may pass through a third coupling portion 261 of the second arm part 260, the first cam member 270, a second elastic member 292, the second cam member 280, and the fourth coupling portion 262 of the second arm part 260. For example, the third coupling portion 261 and the fourth coupling portion 262 of the second arm part 260 may be coupled to the second arm shaft 242 to rotate together with the second arm shaft 242. For example, the third coupling portion 261 and the fourth coupling portion 262 may be press-fit onto the second arm shaft 242. For example, the second arm shaft 242 may pass through the first cam member 270 and the second cam member 280. The first cam member 270 and the second cam member 280 may linearly move in the axial direction along the second arm shaft 242 without rotating together with the second arm shaft 242. For example, the second elastic member 292 may include a coil spring surrounding the second arm shaft 242. The second elastic member 292 may be compressed or uncompressed in the axial direction without rotating together with the second arm shaft 242.

In an embodiment, when the second rotary member 220 rotates, the second arm part 260 may rotate together with the second arm shaft 242 and may slide relative to the second rotary member 220. In an embodiment, the second arm part 260 may include the third coupling portion 261 and the fourth coupling portion 262 that are coupled to the second arm shaft 242, and a second extending portion 263 including a second sliding pin 266. The third coupling portion 261 and the fourth coupling portion 262 may extend from the second extending portion 263 in a direction perpendicular to the axial direction.

In an embodiment, a third arm cam 264 may be formed on the third coupling portion 261, and a fourth arm cam 265 may be formed on the fourth coupling portion 262. For example, the third arm cam 264 may be engaged with a second moving cam 272 of the first cam member 270. For example, the fourth arm cam 265 may be engaged with a fourth moving cam 282 of the second cam member 280. In an embodiment, the third arm cam 264 and the fourth arm cam 265 may be formed to face each other. For example, the third arm cam 264 may include a protrusion protruding in the second axial direction ②, and the fourth arm cam 265 may include a protrusion protruding in the first axial direction ①.

In an embodiment, in relation to rotation of the second arm part 260, the third coupling portion 261 and the fourth coupling portion 262 may be press-fit onto the second arm shaft 242. Accordingly, the third coupling portion 261 and the fourth coupling portion 262 may rotate together with the second arm shaft 242, and the second extending portion 263 may rotate about the second arm shaft 242. In an embodiment, the third coupling portion 261 and the fourth coupling portion 262 may be spaced apart from each other in the axial direction. For example, the third coupling portion 261 may be located in the first axial direction ①, compared to the fourth coupling portion 262. For example, the second elastic member 292, another portion of the first cam member 270, and another portion of the second cam member 280 may be disposed between the third coupling portion 261 and the fourth coupling portion 262.

In an embodiment, in relation to sliding of the second arm part 260, the second sliding pin 266 of the second extending portion 263 may be fastened to the second rotary member 220. For example, at least a portion of the second sliding pin 266 may be accommodated in a second sliding groove of the second rotary member 220 (e.g., a second sliding groove 225 of FIGS. 21A to 21C). For example, the second sliding pin 266 may move along the second sliding groove when the second rotary member 220 rotates. A fixing ring 2661 may be coupled to an end portion of the second sliding pin 266. In an embodiment, when the second rotary member 220 rotates about the second rotational axis R2, the second arm part 260 may rotate about the second arm shaft 242 while sliding relative to the second rotary member 220. For example, the second arm part 260 may slide in the state in which the second sliding pin 266 is fastened to the second rotary member 220.

FIGS. 19A and 19B are views illustrating the torque structure of the hinge module according to various embodiments of the disclosure.

In an embodiment, the torque structure 202 may provide friction torque corresponding to restoring torque of the display 190. For example, in a folded state (e.g., FIGS. 2 and 4) in which a partial region of the display 190 is curved, a restoring force of the display 190 may act on the first rotary member 210 and the second rotary member 220. For example, the restoring force of the display 190 may be a force by which the display 190 returns to a flat state. Restoring torque may be applied to the first arm shaft 241 and the second arm shaft 242 by the restoring force. For example, referring to FIGS. 7A and 7B, the restoring torque may act on the first arm shaft 241 in the counterclockwise direction that is an unfolding direction and may act on the second arm shaft 242 in the clockwise direction that is an unfolding direction. Accordingly, the torque structure 202 may provide predetermined friction torque that cancels out the restoring torque such that the hinge module 200 and/or the display 190 is maintained in the folded state. For example, the friction torque may be proportional to a surface friction force between cam structures and the distance between the point where the friction force is generated and the arm shaft 241 or 242 (e.g., the radius of the arm shaft 241 or 242). The surface friction force may be increased by the elastic member 291 or 292 in a compressed state.

In an embodiment, the torque structure 202 may include the first arm cam 254, the second arm cam 255, the third arm cam 264, the fourth arm cam 265, the first cam member 270, the second cam member 280, the first elastic member 291, and the second elastic member 292.

FIG. 19B is a view illustrating torque structures coupled to the first arm shaft 241. Referring to FIG. 19B, when viewed from the first gear 243 in the second axial direction ②, the first arm cam 254, the first moving cam 271 of the first cam member 270, the first elastic member 291, the third moving cam 281 of the second cam member 280, and the second arm cam 255 may be coupled to the first arm shaft 241.

FIG. 19A is a view illustrating torque structures coupled to the second arm shaft 242. Referring to FIG. 19A, when viewed from the second gear 244 in the second axial direction ②, the third arm cam 264, the second moving cam 272 of the first cam member 270, the second elastic member 292, the fourth moving cam 282 of the second cam member 280, and the fourth arm cam 265 may be coupled to the second arm shaft 242.

In an embodiment, the first arm cam 254 may be formed on the first coupling portion 251 of the first arm part 250. The first arm cam 254 may rotate together with the first arm shaft 241. For example, the first arm cam 254 may be formed to surround the first arm shaft 241. The first arm cam 254 may include the protrusion protruding in the first axial direction ①. The first arm cam 254 may be engaged with the first moving cam 271 of the first cam member 270.

In an embodiment, the second arm cam 255 may be formed on the second coupling portion 252 of the first arm part 250. The second arm cam 255 may rotate together with the first arm shaft 241. For example, the second arm cam 255 may be formed to surround the first arm shaft 241. The second arm cam may include the protrusion protruding in the second axial direction ②. The second arm cam 255 may be engaged with the third moving cam 281 of the second cam member 280.

In an embodiment, the third arm cam 264 may be formed on the third coupling portion 261 of the second arm part 260. The third arm cam 264 may rotate together with the second arm shaft 242. For example, the third arm cam 264 may be formed to surround the second arm shaft 242. The third arm cam 264 may include the protrusion protruding in the first axial direction ①. The third arm cam 264 may be engaged with the second moving cam 272 of the first cam member 270.

In an embodiment, the fourth arm cam 265 may be formed on the fourth coupling portion 262 of the second arm part 260. The fourth arm cam 265 may rotate together with the second arm shaft 242. For example, the fourth arm cam 265 may be formed to surround the second arm shaft 242. The fourth arm cam 265 may include the protrusion protruding in the second axial direction ②. The fourth arm cam 265 may be engaged with the fourth moving cam 282 of the second cam member 280.

In an embodiment, the first cam member 270 may include a first portion 270a through which the first arm shaft 241 passes, a second portion 270b through which the second arm shaft 242 passes, and a first bridge portion 270c connecting the first portion 270a and the second portion 270b. In an embodiment, the first moving cam 271 may be formed on the first portion 270a. The first moving cam 271 may be engaged with the first arm cam 254. For example, the first moving cam 271 may include a protrusion protruding in the first axial direction. In an embodiment, the second moving cam 272 may be formed on the second portion 270b. The second moving cam 272 may be engaged with the third arm cam 264. For example, the second moving cam 272 may include a protrusion protruding in the first axial direction ①. In an embodiment, when the first arm shaft 241 and the second arm shaft 242 rotate, the first cam member 270 may move in the axial direction without rotating. For example, the first arm shaft 241 may include a portion having a polygonal cross-section perpendicular to the axial direction. The first portion 270a of the first cam member 270 may have a circular through-hole when viewed in a cross-section perpendicular to the axial direction. The portion of the first arm shaft 241 that has a polygonal cross-section may extend through the circular through-hole of the first portion 270a. Accordingly, the first cam member 270 may not rotate even though the first arm shaft 241 rotates.

In an embodiment, the second cam member 280 may include a third portion 280a through which the first arm shaft 241 passes, a fourth portion 280b through which the second arm shaft 242 passes, and a second bridge portion 280c connecting the third portion 280a and the fourth portion 280b. In an embodiment, the third moving cam 281 may be formed on the third portion. The third moving cam 281 may be engaged with the second arm cam 255. For example, the third moving cam 281 may include a protrusion protruding in the second axial direction ②. In an embodiment, the fourth moving cam 282 may be formed on the fourth portion 280b. The fourth moving cam 282 may be engaged with the fourth arm cam 265. For example, the fourth moving cam 282 may include a protrusion protruding in the second axial direction ②. In an embodiment, when the first arm shaft 241 and the second arm shaft 242 rotate, the second cam member 280 may move in the axial direction without rotating. For example, the second arm shaft 242 may include a portion having a polygonal cross-section perpendicular to the axial direction. The second portion 270b of the first cam member 270 may have a circular through-hole when viewed in a cross-section perpendicular to the axial direction. The portion of the second arm shaft 242 that has a polygonal cross-section may extend through the circular through-hole of the second portion 270b. Accordingly, the first cam member 270 may not rotate even though the second arm shaft 242 rotates.

In an embodiment, the first elastic member 291 may be disposed between the first cam member 270 and the second cam member 280. For example, the first elastic member 291 may be disposed between the first coupling portion 251 of the first arm part 250 and the second coupling portion 252 of the first arm part 250. For example, the first elastic member 291 may be disposed between the first portion 270a of the first cam member 270 and the third portion 280a of the second cam member 280. For example, the first elastic member 291 may be located in the first axial direction ① from the first cam member 270 and may be located in the second axial direction ② from the second cam member 280. In an embodiment, the first elastic member 291 may be compressed or uncompressed in response to linear movement of the first cam member 270 and the second cam member 280 in the axial direction. For example, the first elastic member 291 in a compressed state may increase a friction force between the first moving cam 271 and the first arm cam 254 and/or a friction force between the third moving cam 281 and the second arm cam 255. The increased friction force may provide increased friction torque acting in a direction opposite to a rotational direction of the first arm shaft 241.

In an embodiment, the second elastic member 292 may be disposed between the first cam member 270 and the second cam member 280. For example, the second elastic member 292 may be disposed between the third coupling portion 261 of the second arm part 260 and the fourth coupling portion 262 of the second arm part 260. For example, the second elastic member 292 may be disposed between the second portion 270b of the first cam member 270 and the fourth portion 280b of the second cam member 280. For example, the second elastic member 292 may be located in the first axial direction ① from the first cam member 270 and may be located in the second axial direction ② from the second cam member 280. In an embodiment, the second elastic member 292 may be compressed or uncompressed in response to linear movement of the first cam member 270 and the second cam member 280 in the axial direction. For example, the second elastic member 292 in a compressed state may increase a friction force between the second moving cam 272 and the third arm cam 264 and/or a friction force between the fourth moving cam 282 and the fourth arm cam 265. The increased friction force may provide increased friction torque acting in a direction opposite to a rotational direction of the second arm shaft 242.

In an embodiment, when the first arm shaft 241 and the second arm shaft 242 rotate, the structures included in the torque structure 202 may rotate in place, or may linearly move along the first arm shaft 241 and the second arm shaft 242.

For example, the first arm cam 254 and the second arm cam 255 may rotate together with the first arm shaft 241 and may not linearly move in the extension direction of the first arm shaft 241. For example, the first arm shaft 241 may include the portion having a polygonal cross-section perpendicular to the axial direction. Each of the first arm cam 254 and the second arm cam 255 may have a through-hole through which the first arm shaft 241 passes. The through-hole, when viewed in a cross-section perpendicular to the axial direction, may have a polygonal cross-section corresponding to the cross-section of the first arm shaft 241. Accordingly, when the first arm shaft 241 rotates, the first arm cam 254 and the second arm cam 255 may rotate together with the first arm shaft 241. In various embodiments, the first arm cam 254 and the second arm cam 255 may be at least partially press-fit onto the first arm shaft 241. Accordingly, linear movement of the first arm cam 254 and the second arm cam 255 along the first arm shaft 241 may be limited.

For example, the third arm cam 264 and the fourth arm cam 265 may rotate together with the second arm shaft 242 and may not linearly move in the extension direction of the second arm shaft 242. For example, the second arm shaft 242 may include the portion having a polygonal cross-section perpendicular to the axial direction. Each of the third arm cam 264 and the fourth arm cam 265 may have a through-hole through which the second arm shaft 242 passes. The through-hole, when viewed in a cross-section perpendicular to the axial direction, may have a polygonal cross-section corresponding to the cross-section of the second arm shaft 242. Accordingly, when the second arm shaft 242 rotates, the third arm cam 264 and the fourth arm cam 265 may rotate together with the second arm shaft 242. In various embodiments, the third arm cam 264 and the fourth arm cam 265 may be at least partially press-fit onto the second arm shaft 242. Accordingly, linear movement of the third arm cam 264 and the fourth arm cam 265 along the second arm shaft 242 may be limited.

For example, when the arm shafts 241 and 242 rotate, the first moving cam 271 and the second moving cam 272 may linearly move together in the axial direction by the first bridge portion 270c without rotating. For example, when the arm shafts 241 and 242 rotate, the third moving cam 281 and the fourth moving cam 282 may linearly move together in the axial direction by the second bridge portion 280c without rotating. For example, when the arm shafts 241 and 242 rotate, the first elastic member 291 and the second elastic member 292 may be compressed or uncompressed depending on the distance between the first cam member 270 and the second cam member 280 without rotating. For example, the first elastic member 291 may be compressed when the first cam member 270 moves in the second axial direction ② and the second cam member 280 moves in the first axial direction ①.

Figure 20A:
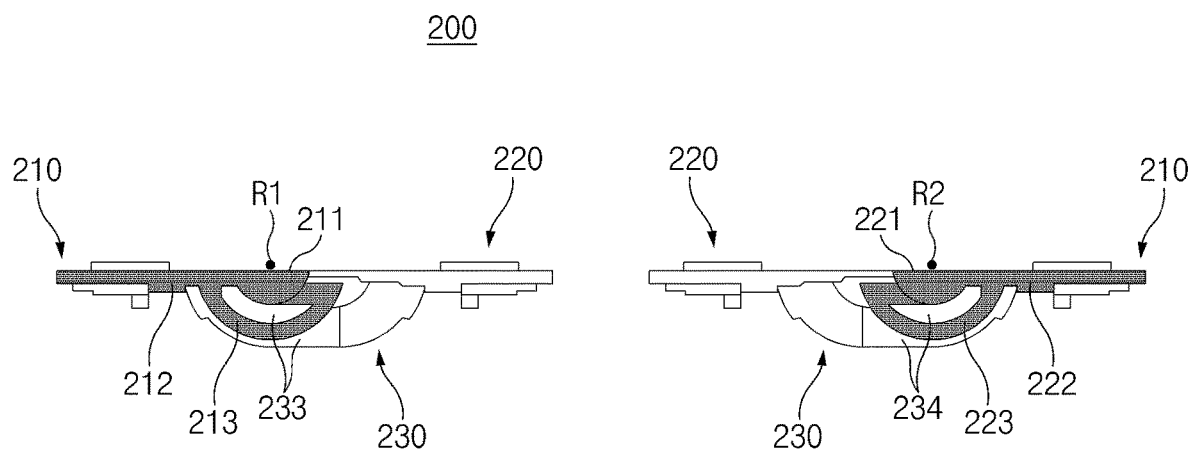
FIGS. 20A, 20B, and 20C are views illustrating operations of a first rotary member and a second rotary member of the hinge module of the electronic device according to various embodiments of the disclosure.
Figure 20B:
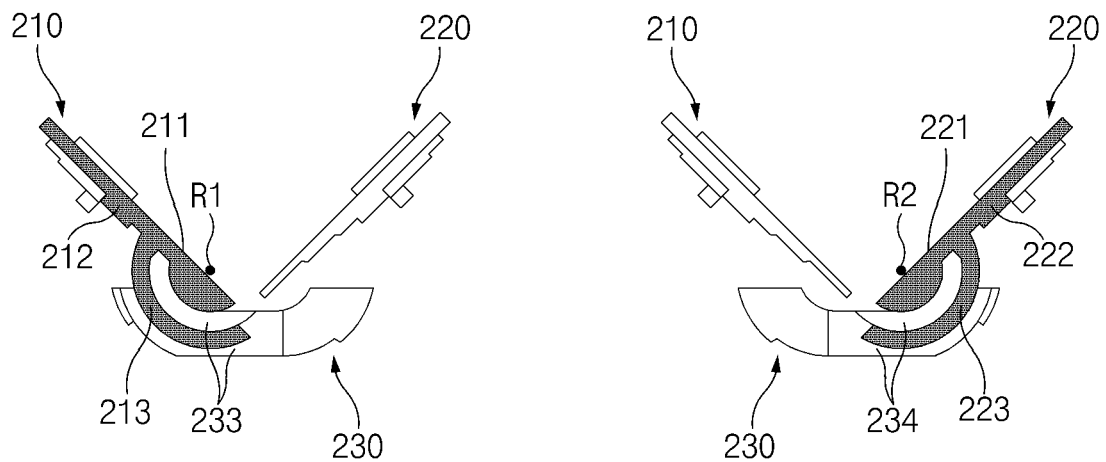
Figure 20C:
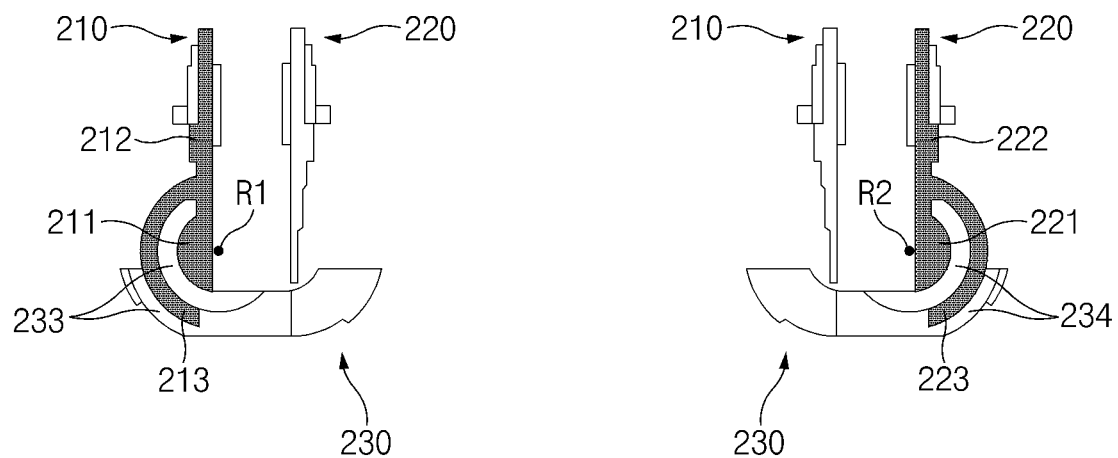

FIGS. 20A, 20B, and 20C are views illustrating rotary operations of the rotary members of the hinge module according to various embodiments of the disclosure. FIGS. 20A to 20C are sectional views taken along line A-A' of FIGS. 17A and 17B.

FIG. 20A is a view illustrating the hinge module 200 in a flat state. FIG. 20B is a view illustrating the hinge module 200 in a folded state. FIG. 20C is a view illustrating the hinge module 200 in a fully folded state.

In an embodiment, the first guide rail 233 and the second guide rail 234 may be formed on the fixed member 230. In an embodiment, the first guide rail 233 may have a substantially arc shape. For example, the center of the arc of the first guide rail 233 may coincide with the first rotational axis R1. That is, the first guide rail 233 may guide the first rotary member 210 such that the first rotary member 210 rotates along a rotational path having the first rotational axis R1 as a center. In an embodiment, the second guide rail 234 may have a substantially arc shape. For example, the center of the arc of the second guide rail 234 may coincide with the second rotational axis R2. That is, the second guide rail 234 may guide the second rotary member 220 such that the second rotary member 220 rotates along a rotational path having the second rotational axis R2 as a center.

In an embodiment, the first rotary member 210 may include the first connecting portion 212 and the first guide portion 211. The first guide portion 211 may have a substantially cylindrical shape. For example, the cross-section of the first guide portion 211 may have a substantially arc shape. In an embodiment, the first rotary member 210 may rotate about the first rotational axis R1 in the state in which the first protruding portion 213 of the first guide portion 211 is accommodated in the first guide rail 233 of the fixed member 230. For example, the first rotary member 210 may rotate along the circular arc-shaped rotational path having the first rotational axis R1 as a center.

In an embodiment, the second rotary member 220 may include the second connecting portion 222 and the second guide portion 221. The second guide portion 221 may have a substantially cylindrical shape. For example, the cross-section of the second guide portion 221 may have a substantially arc shape. In an embodiment, the second rotary member 220 may rotate about the second rotational axis R2 in the state in which the second protruding portion 223 is accommodated in the second guide rail 234. For example, the second rotary member 220 may rotate along the circular arc-shaped rotational path having the second rotational axis R2 as a center.

In an embodiment, the first rotational axis R1 and the second rotational axis R2 may be parallel to the axial direction of the hinge module 200. In an embodiment, the first rotational axis R1 and the second rotational axis R2 may be formed at positions spaced apart from the first connecting portion 212 of the first rotary member 210 and the second connecting portion 222 of the second rotary member 220 in the z-axis direction.

Referring to FIG. 20A, in the flat state, the first connecting portion 212 may limit, to one direction, a direction in which the first rotary member 210 is rotatable. For example, a first end portion of the first guide rail 233 may be open, and a second end portion of the first guide rail 233 may be covered by the first connecting portion 212. Accordingly, in the flat state, the first rotary member 210 is rotatable about the first rotational axis R1 in the clockwise direction and is not rotatable in the counterclockwise direction based on the drawing.

Referring to FIG. 20A, in the flat state, the second connecting portion 222 may limit, to one direction, a direction in which the second rotary member 220 is rotatable. For example, a third end portion of the second guide rail 234 may be open, and a fourth end portion of the second guide rail 234 may be covered by the second connecting portion 222. Accordingly, in the flat state, the second rotary member 220 is rotatable about the second rotational axis R2 in the counterclockwise direction and is not rotatable in the clockwise direction based on the drawing.

Figure 21A:
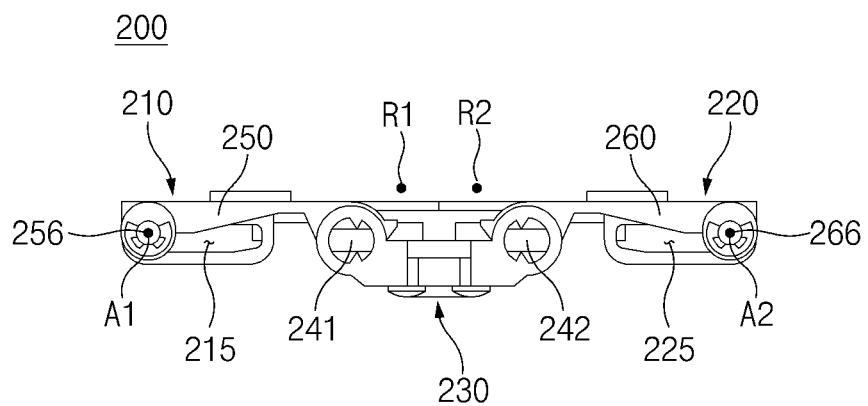
FIGS. 21A, 21B, and 21C are views illustrating a first arm part, a second arm part, the first rotary member, and the second rotary member of the hinge module of the electronic device according to various embodiments of the disclosure.
Figure 21B:
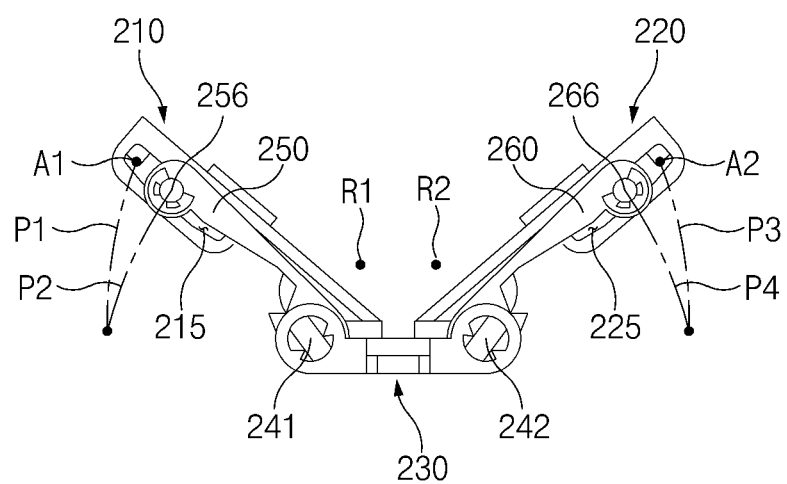
Figure 21C:
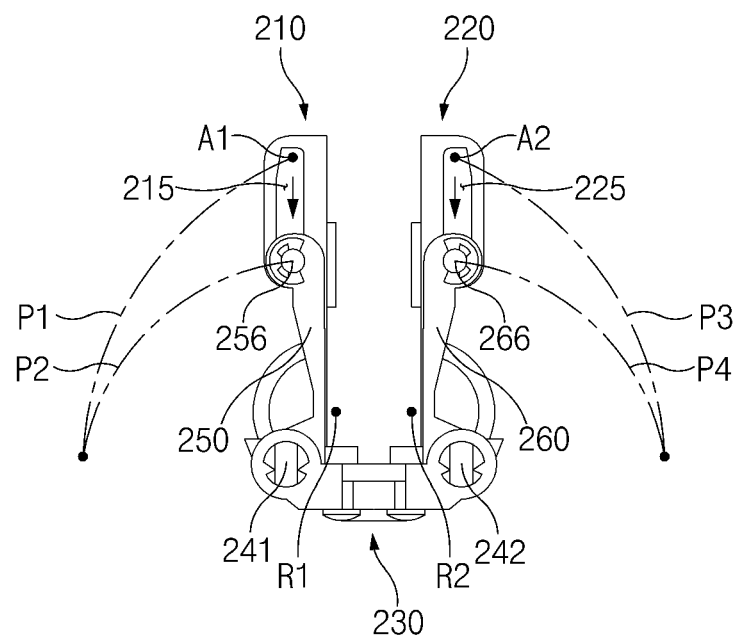

FIGS. 21A, 21B, and 21C are views illustrating rotary operations and sliding operations of the arm parts and the rotary members of the hinge module according to various embodiments of the disclosure.

FIG. 21A is a view illustrating the hinge module 200 in a flat state. FIG. 21B is a view illustrating the hinge module 200 in a folded state. FIG. 21C is a view illustrating the hinge module 200 in a fully folded state.

Referring to FIGS. 21A, 21B, and 21C, when the hinge module 200 is folded or unfolded, the rotary members 210 and 220 and the arm parts 250 and 260 may rotate about different axes. For example, the rotary members 210 and 220 and the arm parts 250 and 260 may rotate along different rotational paths. Due to the difference in rotational path between the rotary members 210 and 220 and the arm parts 250 and 260, the arm parts 250 and 260 may slide when the hinge module 200 is folded or unfolded.

In an embodiment, the first rotary member 210 may rotate about the first rotational axis R1 in a first rotational direction. For example, in a folding operation, the first rotary member 210 may rotate in the clockwise direction. For example, based on the flat state, a point where the first sliding pin 256 is located in the first rotary member 210 may be defined as a first point A1. In folding and unfolding operations, the first point A1 of the first rotary member 210 may move along a first rotational path P1.

Referring to FIGS. 21A, 21B, and 21C, the first arm part 250 and the first sliding pin 256 may rotate about the first arm shaft 241. For example, in a folding operation, the first arm part 250 and the first sliding pin 256 may rotate in the clockwise direction. For example, in the flat state, the first sliding pin 256 may be located at the first point A1, and in the folded state, the first sliding pin 256 may be located at a position spaced apart from the first point A1 in a direction perpendicular to the axial direction. The first sliding pin 256 may move along a second rotational path P2 in folding and unfolding operations.

In various embodiments, the first rotational path P1 and the second rotational path P2 may differ from each other. For example, the first rotational axis R1 and the first arm shaft 241 may be parallel to each other, but may not coincide with each other, and the radii of rotation of the first rotary member 210 and the first arm part 250 may not coincide with each other.

Accordingly, in folding and unfolding operations, the first arm part 250 and the first sliding pin 256 may slide relative to the first rotary member 210. The sliding operation of the first sliding pin 256 and the first arm part 250 may be guided as the first sliding pin 256 is accommodated in the first sliding groove 215 of the first rotary member 210. In an embodiment, when a folding operation is performed in the flat state, the distance between the first sliding pin 256 and the first point A1 may increase. When an unfolding operation is performed in the fully folded state, the distance between the first sliding pin 256 and the first point A1 may decrease.

In an embodiment, the second rotary member 220 may rotate about the second rotational axis R2 in a second rotational direction. For example, in a folding operation, the second rotary member 220 may rotate in the counterclockwise direction. For example, based on the flat state, a point where the second sliding pin 266 is located in the second rotary member 220 may be defined as a second point A2. In folding and unfolding operations, the second point A2 may move along a third rotational path P3.

In an embodiment, the second arm part 260 and the second sliding pin 266 may rotate about the second arm shaft 242. For example, in a folding operation, the second arm part 260 and the second sliding pin 266 may rotate in the counterclockwise direction. For example, in the flat state, the second sliding pin 266 may be located at the second point, and in the folded state, the second sliding pin 266 may be located at a position spaced apart from the second point A2 in a direction perpendicular to the axial direction. The second sliding pin 266 may move along a fourth rotational path P4 in folding and unfolding operations.

In various embodiments, the third rotational path P3 and the fourth rotational path P4 may differ from each other. For example, the second rotational axis R2 and the second arm shaft 242 may be parallel to each other, but may not coincide with each other, and the radii of rotation of the second rotary member 220 and the second arm part 260 may not coincide with each other.

Accordingly, in folding and unfolding operations, the second arm part 260 and the second sliding pin 266 may slide relative to the second rotary member 220. The sliding operation of the second sliding pin 266 and the second arm part 260 may be guided as the second sliding pin 266 is accommodated in the second sliding groove 225 of the second rotary member 220. In an embodiment, when a folding operation is performed in the flat state, the distance between the second sliding pin 266 and the second point A2 may increase. When an unfolding operation is performed in the fully folded state, the distance between the second sliding pin 266 and the second point A2 may decrease.

FIG. 22 is a block diagram illustrating an electronic device in a network environment according to an embodiment of the disclosure.

Referring to FIG. 22, an electronic device 2201 in a network environment 2200 may communicate with at least one of an electronic device 2202 via a first network 2298 (e.g., a short-range wireless communication network), or an electronic device 2204 or a server 2208 via a second network 2299 (e.g., a long-range wireless communication network). According to an embodiment, the electronic device 2201 may communicate with the electronic device 2204 via the server 2208. According to an embodiment, the electronic device 2201 may include the processor 2220, a memory 2230, an input module 2250, a sound output module 2255, a display module 2260, an audio module 2270, a sensor module 2276, an interface 2277, a connecting terminal 2278, a haptic module 2279, a camera module 2280, a power management module 2288, a battery 2289, a communication module 2290, a subscriber identification module (SIM) 2296, or an antenna module 2297. In some embodiments, at least one (e.g., the connecting terminal 2278) of the components may be omitted from the electronic device 2201, or one or more other components may be added in the electronic device 2201. In some embodiments, some of the components (e.g., the sensor module 2276, the camera module 2280, or the antenna module 2297) may be implemented as single component (e.g., the display module 2260).

The processor 2220 may execute, for example, software (e.g., a program 2240) to control at least one other component (e.g., a hardware or software component) of the electronic device 2201 coupled with the processor 2220, and may perform various data processing or computation. According to one embodiment, as at least part of the data processing or computation, the processor 2220 may load a command or data received from another component (e.g., the sensor module 2276 or the communication module 2290) in a volatile memory 2232, process the command or the data stored in the volatile memory 2232, and store resulting data in a non-volatile memory 2234. According to an embodiment, the processor 2220 may include a main processor 2221 (e.g., a central processing unit (CPU) or an application processor (AP)), and an auxiliary processor 2223 (e.g., a graphics processing unit (GPU), a neural processing unit (NPU), an image signal processor (ISP), a sensor hub processor, or a communication processor (CP)) that is operable independently from, or in conjunction with, the main processor 2221. For example, when the electronic device 2201 includes the main processor 2221 and the auxiliary processor 2223, the auxiliary processor 2223 may be adapted to consume less power than the main processor 2221, or to be specific to a specified function. The auxiliary processor 2223 may be implemented as separate from, or as part of the main processor 2221.

The auxiliary processor 2223 may control at least some of functions or states related to at least one component (e.g., the display module 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). According to an embodiment, the auxiliary processor 2223 (e.g., an image signal processor or a communication processor) may be implemented as part of another component (e.g., the camera module 2280 or the communication module 2290) functionally related to the auxiliary processor 2223. According to an embodiment, the auxiliary processor 2223 (e.g., the neural processing unit) may include a hardware structure specified for artificial intelligence model processing. An artificial intelligence model may be generated by machine learning. Such learning, for example, may be performed in the electronic device 2201 itself in which the artificial intelligence model is performed, or may be performed through a separate server (e.g., the server 2208). Learning algorithms may include, but are not limited to, supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. Additionally or alternatively, the artificial intelligence model may include a software structure other than the hardware structure.

The memory 2230 may store various data used by at least one component (e.g., the processor 2220 or the sensor module 2276) of the electronic device 2201. The various data may include, for example, software (e.g., the program 2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input module 2250 may receive a command or data to be used by other component (e.g., the processor 2220) of the electronic device 2201, from the outside (e.g., a user) of the electronic device 2201. The input module 2250 may include, for example, a microphone, a mouse, a keyboard, a key (e.g., a button), or a digital pen (e.g., a stylus pen).

The sound output module 2255 may output sound signals to the outside of the electronic device 2201. The sound output module 2255 may include, for example, a speaker or a receiver. The speaker may be used for general purposes, such as playing multimedia or playing record. The receiver may be used for an incoming call. According to an embodiment, the receiver may be implemented as separate from, or as part of the speaker.

The display module 2260 may visually provide information to the outside (e.g., a user) of the electronic device 2201. The display module 2260 may include, for example, a display, a hologram device, or a projector and control circuitry to control a corresponding one of the displays, hologram device, and projector. According to an embodiment, the display module 2260 may include a touch sensor adapted to detect a touch, or a pressure sensor adapted to measure the intensity of force incurred by the touch.

The audio module 2270 may convert a sound into an electrical signal and vice versa. According to an embodiment, the audio module 2270 may obtain the sound via the input module 2250, or output the sound via the sound output module 2255 or an external electronic device (e.g., an electronic device 2202) (e.g., speaker of headphone) directly (e.g., wiredly) or wirelessly coupled with the electronic device 2201.

The sensor module 2276 may detect an operational state (e.g., power or temperature) of the electronic device 2201 or an environmental state (e.g., a state of a user) external to the electronic device 2201, and then generate an electrical signal or data value corresponding to the detected state. According to an embodiment, the sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device (e.g., the electronic device 2202) directly (e.g., wiredly) or wirelessly. According to an embodiment, the interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device (e.g., the electronic device 2202). According to an embodiment, the connecting terminal 2278 may include, for example, a HDMI connector, a USB connector, an SD card connector, or an audio connector (e.g., a headphone connector).

The haptic module 2279 may convert an electrical signal into a mechanical stimulus (e.g., a vibration or a movement) or electrical stimulus which may be recognized by a user via his tactile sensation or kinesthetic sensation. According to an embodiment, the haptic module 2279 may include, for example, a motor, a piezoelectric element, or an electric stimulator.

The camera module 2280 may capture a still image or moving images. According to an embodiment, the camera module 2280 may include one or more lenses, image sensors, image signal processors, or flashes.

The power management module 2288 may manage power supplied to the electronic device 2201. According to one embodiment, the power management module 2288 may be implemented as at least part of, for example, a power management integrated circuit (PMIC).

The battery 2289 may supply power to at least one component of the electronic device 2201. According to an embodiment, the battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the application processor (AP)) and supports a direct (e.g., wired) communication or a wireless communication. According to an embodiment, the communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device 2204 via the first network 2298 (e.g., a short-range communication network, such as Bluetooth™, wireless-fidelity (Wi-Fi) direct, or infrared data association (IrDA)) or the second network 2299 (e.g., a long-range communication network, such as a legacy cellular network, a fifth generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2292 may identify or authenticate the electronic device 2201 in a communication network, such as the first network 2298 or the second network 2299, using subscriber information (e.g., international mobile subscriber identity (IMSI)) stored in the subscriber identification module 2296.

The wireless communication module 2292 may support a 5G network after a fourth generation (4G) network and next-generation communication technology, for example, new radio (NR) access technology. The NR access technology may support enhanced mobile broadband (eMBB), massive machine type communications (mMTC), or ultra-reliable and low-latency communications (URLLC). To achieve a high data transmission rate, the wireless communication module 2292 may support, for example, a high-frequency band (e.g., the millimeter wave (mmWave) band). The wireless communication module 2292 may support various technologies for securing performance on a high-frequency band. For example, the wireless communication module 2292 may support technologies such as beam-forming, massive multiple-input and multiple-output (massive MIMO), full dimensional MINO (FD-MIMO), array antenna, analog beam-forming, and large-scale antenna. The wireless communication module 2292 may support various requirements specified in the electronic device 2201, an external electronic device (e.g., the electronic device 2204), or a network system (e.g., the second network 2299). According to an embodiment, the wireless communication module 2292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2297 may transmit or receive a signal or power to or from the outside (e.g., the external electronic device) of the electronic device 2201. According to an embodiment, the antenna module 2297 may include an antenna including a radiating element composed of a conductive material or a conductive pattern formed in or on a substrate (e.g., printed circuit board (PCB)). According to an embodiment, the antenna module 2297 may include a plurality of antennas (e.g., an array antenna). In such a case, at least one antenna appropriate for a communication scheme used in the communication network, such as the first network 2298 or the second network 2299, may be selected, for example, by the communication module 2290 from the plurality of antennas. The signal or the power may then be transmitted or received between the communication module 2290 and the external electronic device via the selected at least one antenna. According to an embodiment, another component (e.g., a radio frequency integrated circuit (RFIC)) other than the radiating element may be additionally formed as part of the antenna module 2297.

According to various embodiments, the antenna module 2297 may form a mmWave antenna module. According to an embodiment, the mmWave antenna module may include a printed circuit board, an RFIC that is disposed on a first surface (e.g., the bottom surface) of the printed circuit board or is disposed adjacent to the first surface and that is capable of supporting a specified high-frequency band (e.g., the mmWave band), and a plurality of antennas (e.g., array antennas) that are disposed on a second surface (e.g., the top surface or a side surface) of the printed circuit board or are disposed adjacent to the second surface and that are capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2201 and the external electronic device 2204 via the server 2208 coupled with the second network 2299. Each of the external electronic devices 2202 or 2204 may be a device of a same type as, or a different type, from the electronic device 2201. According to an embodiment, all or some of operations to be executed at the electronic device 2201 may be executed at one or more of the external electronic devices 2202, 2204, or 2208. For example, when the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201. The electronic device 2201 may provide the outcome, with or without further processing of the outcome, as at least part of a reply to the request. To that end, a cloud computing, distributed computing, mobile edge computing (MEC), or client-server computing technology may be used, for example. The electronic device 2201 may provide, for example, ultra low-latency services using distributed computing or mobile edge computing. In another embodiment, the external electronic device 2204 may include an internet-of-things (IoT) device. The server 2208 may be an intelligent server using machine learning and/or a neural network. According to an embodiment, the external electronic device 2204 or the server 2208 may be included in the second network 2299. The electronic device 2201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smallphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2240) including one or more instructions that are stored in a storage medium (e.g., internal memory 2236 or external memory 2238) that is readable by a machine (e.g., the electronic device 2201). For example, a processor (e.g., the processor 2220) of the machine (e.g., the electronic device 2201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities are separated and disposed in another component. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 23:
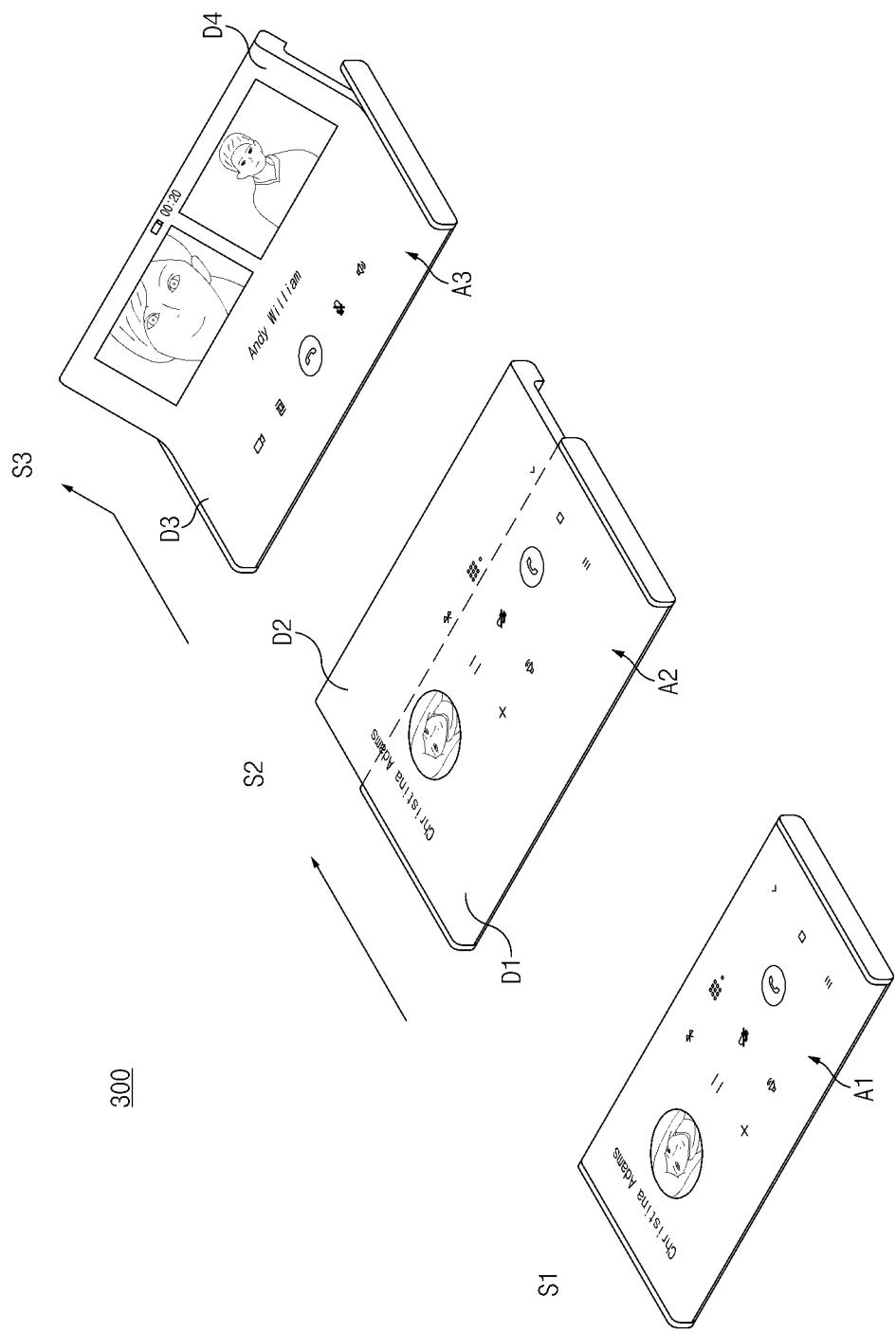
FIG. 23 is a view illustrating an example of the use of an electronic device according to an embodiment of the disclosure.

FIG. 23 is a view illustrating an example of the use of an electronic device according to an embodiment of the disclosure.

Referring to FIG. 23, the electronic device 300 may include a default state S1, an extended state S2, and a folded state S3. The extended state S2 may include a state in which a folding structure and a sliding structure are moved in a first direction in the default state S1. The extended state S2 may provide a wider display region than the default state. The folded state S3 may include a state in which the folding structure is folded with a predetermined angle with respect to the sliding structure in the extended state S2.

In an embodiment, an extending operation of the electronic device 300 may refer to an operation in which the electronic device 300 is changed from the default state S1 to the extended state S2, and a folding operation of the electronic device may refer to an operation in which the electronic device is changed from the extended state S2 to the folded state S3. The extending operation and the folding operation may be performed by a user.

In an embodiment, in the extended state S2, the display region may include a first region D1 and a second region D2. The second region D2 may be defined as a region that is additionally increased by the extending operation of the electronic device 300 based on the default state S1.

In an embodiment, in the folded state S3, the display region may include a third regions D3 and a fourth region D4. The third region D3 may be defined as a region that faces the same direction as the display region of the default state S1 and the extended state S2, and the fourth region may be defined as a region that is folded with the predetermined angle with respect to the third region D3.

In an embodiment, the third region D3 may include at least a portion of the first region D1, and the fourth region D4 may include at least a portion of the second region D2. In some embodiments, the fourth region D4 may include all of the second region D2, and part of the first region D1.

In an embodiment, the electronic device 300 may be configured to provide a first user interface A1 in the default state S1, provide a second user interface A2 in the extended state S2, and provide a third user interface A3 in the folded state S3. In an embodiment, the first user interface A1, the second user interface A2, and the third user interface A3 may include related content.

Referring to FIG. 23, in the default state S1, the electronic device 300 may display the first user interface A1 related to a voice call. The first user interface A1 may include at least one first object for controlling the voice call. For example, the first object may include a dial button, an end call button, and/or a speaker phone button.

In the extended state S2, the electronic device 300 may display the second user interface A2 on the first region D1 and the second region D2. The second user interface A2 may include a user interface related to the voice call and a user interface related to a video call. For example, the second user interface A2 may include at least one object related to switching from the voice call to the video call. For example, the electronic device 300 may be configured to detect whether the electronic device 300 is in the extended state S2 and display content related to the video call when it is determined that the electronic device 300 is in the extended state S2.

In the folded state S3, the electronic device 300 may display the third user interface A3. For example, the third user interface A3 may include at least one second object for controlling the video call displayed on the third region D3, and a camera screen displayed on the fourth region D4. The camera screen may include a screen received by a front camera module and a screen of a counterpart. For example, the electronic device 300 may be configured to detect whether the electronic device 300 is in the folded state S3 and display content related to the video call on the third region D3 and the camera screen on the fourth region D4 when it is determined that the electronic device 300 is in the folded state S3.

Figure 24:
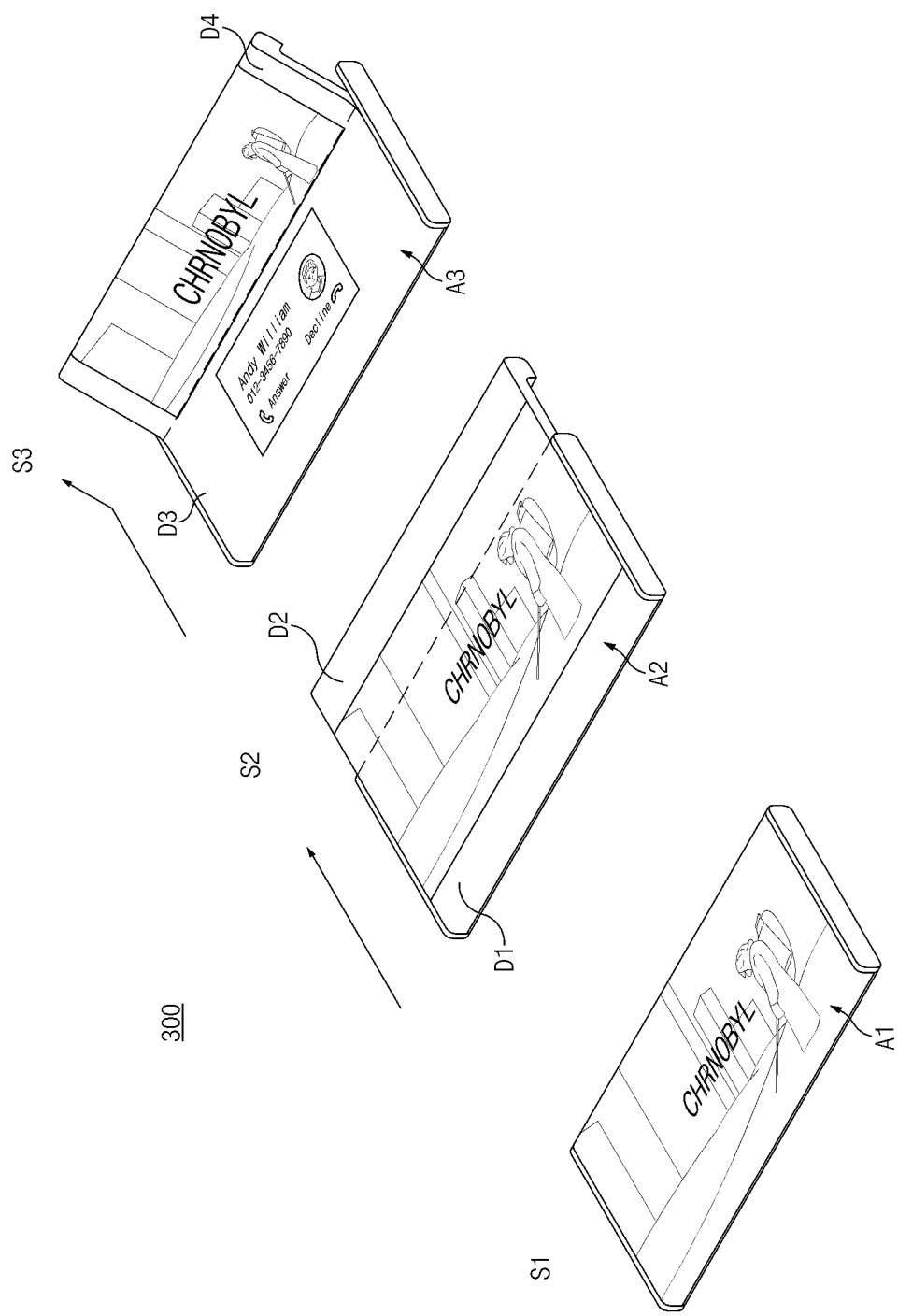
FIG. 24 is a view illustrating an example of the use of the electronic device according to an embodiment of the disclosure.

FIG. 24 is a view illustrating an example of the use of the electronic device according to an embodiment of the disclosure.

In an embodiment, the electronic device 300 may be configured to provide a first user interface A1 in the default state S1, provide a second user interface A2 in the extended state S2, and provide a third user interface A3 in the folded state. In an embodiment, the first user interface A1, the second user interface A2, and the third user interface A3 may include related content. In an embodiment, the electronic device 300 may be configured to detect whether the electronic device 300 is in the extended state S2 and/or the folded state S3, display the second user interface A2 when it is determined that the electronic device 300 is in the extended state S2, and display the third user interface A3 when it is determined that the electronic device 300 is in the folded state S3.

Referring to FIG. 24, in the default state S1, the electronic device 300 may display the first user interface A1 related to a video. The first user interface A1 may include a video playback screen. In various embodiments, the first user interface A1 may further include additional content related to video playback.

In the extended state S2, the electronic device 300 may display the second user interface A2 on the first region D1 and the second region D2. The second user interface A2 may include the video playback screen. In this case, the electronic device 300 may enlarge the video being played to a full screen corresponding to the extended display region, or may maintain the resolution of the video and may display the remaining region as a blank region. In various embodiments, the second user interface A2 may further include additional content related to video playback. The additional content may be displayed to overlap the video playback screen, or may be displayed on the blank region in which the video is not displayed.

In the folded state S3, the electronic device 300 may display the third user interface A3 on the third region D3 and the fourth region D4. The third user interface A3 may include the video playback screen displayed on the third region D3 and a system screen displayed on the fourth region D4. For example, a call notification and/or a system notification including a message notification may be displayed on the system screen.

Figure 25:
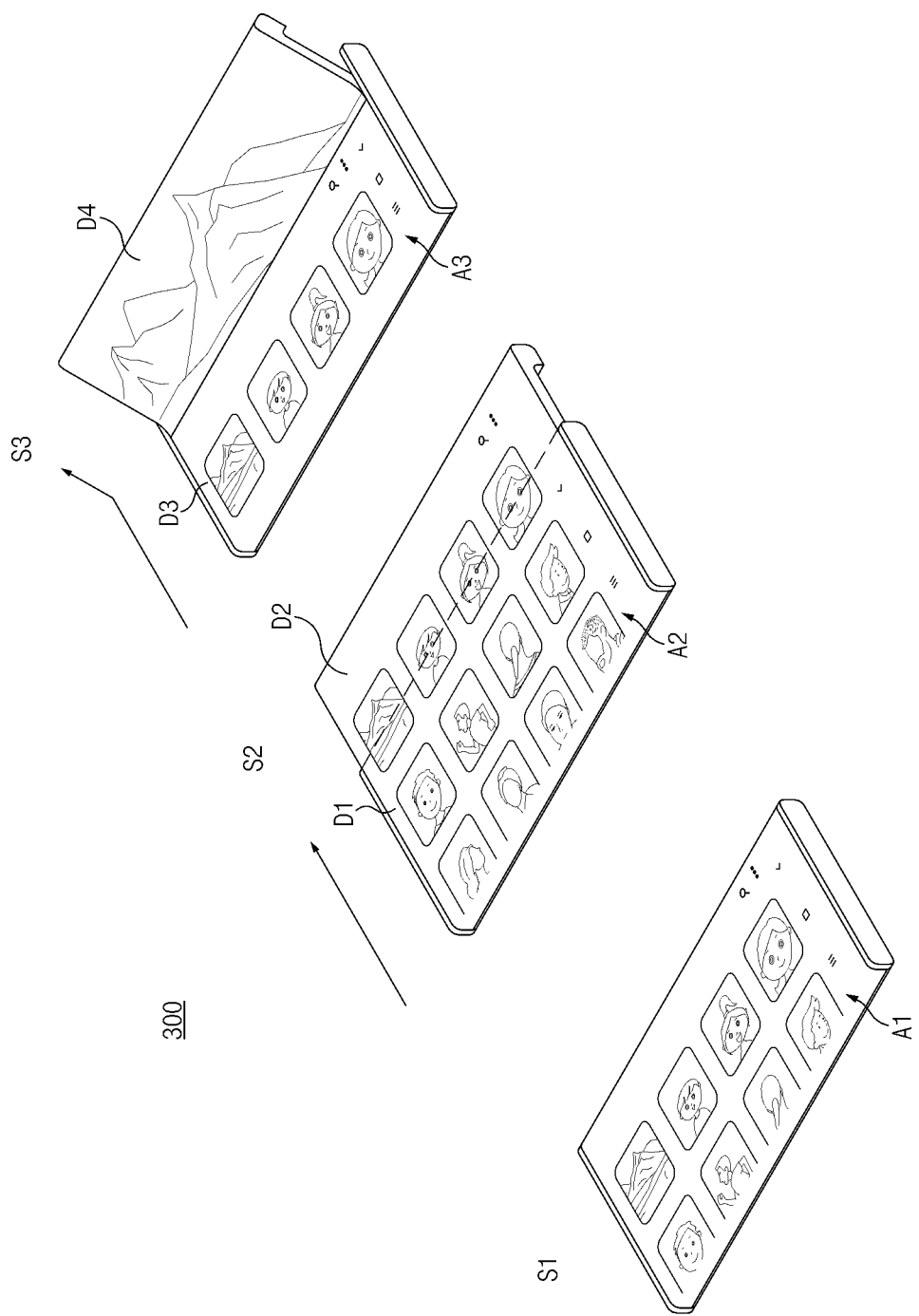
FIG. 25 is a view illustrating an example of the use of the electronic device according to an embodiment of the disclosure.

FIG. 25 is a view illustrating an example of the use of the electronic device according to an embodiment of the disclosure.

In an embodiment, in the default state S1, the electronic device 300 may display a first user interface A1. Furthermore, the electronic device 300 may be configured to detect whether the electronic device 300 is in the extended state S2 and/or the folded state S3, display a second user interface A2 when it is determined that the electronic device 300 is in the extended state S2, and display a third user interface A3 when it is determined that the electronic device 300 is in the folded state S3.

Referring to FIG. 25, in the default state S1, the electronic device 300 may display the first user interface A1 that includes an execution screen of an application. For example, the first user interface A1 may include an execution screen of a gallery application. For example, the first user interface A1 may include one or more first objects for selecting categorized albums.

In the extended state S2, the electronic device 300 may display, on the first region D1 and the second region D2, the second user interface A2 that includes the execution screen of the application. The second user interface A2 may be configured to display more content in response to the extended display region. For example, in the case of the gallery application, more album categories may be displayed over the first region D1 and the second region D2, compared to that in the default state S1. For example, the second user interface A2 may include one or more first objects for selecting categorized albums. In this case, the number of first objects included in the second user interface A2 may be greater than the number of first objects included in the first user interface A1.

In the folded state S3, the electronic device 300 may include the third user interface A3 displayed on the third region D3 and the fourth region D4. The third user interface A3 may include the execution screen of the application displayed on the third region D3 and an application-related screen displayed on the fourth region D4. For example, a categorized album list may be displayed on the third region D3, and photos included in a selected album may be displayed on the fourth region D4.

In various embodiments, basic content of the application may be displayed on the third region D3, and additional content related to the basic content of the application may be displayed on the fourth region D4. The additional content may vary depending on a user's selection. The additional content may include detailed content of the basic content.

In various embodiments, the application illustrated in FIG. 25 may include a file explorer (e.g., My files). For example, a folder and a file may be displayed on the third region D3, and files included in the folder or specific information about the file may be displayed on the fourth region D4.

In various embodiments, the application illustrated in FIG. 25 may include a music playback application. For example, a music playlist may be displayed on the third region D3, and specific information including lyrics of music being played may be displayed on the fourth region D4.

In various embodiments, the application illustrated in FIG. 25 may include a video playback application. For example, a video playlist may be displayed on the third region D3, and a video playback screen may be displayed on the fourth region D4. Alternatively, the video playback screen may be displayed on the fourth region D4, and a caption may be displayed on the third region D3. In another case, specific information about the video being played on the fourth region D4 may be displayed on the third region D3.

Figure 26:
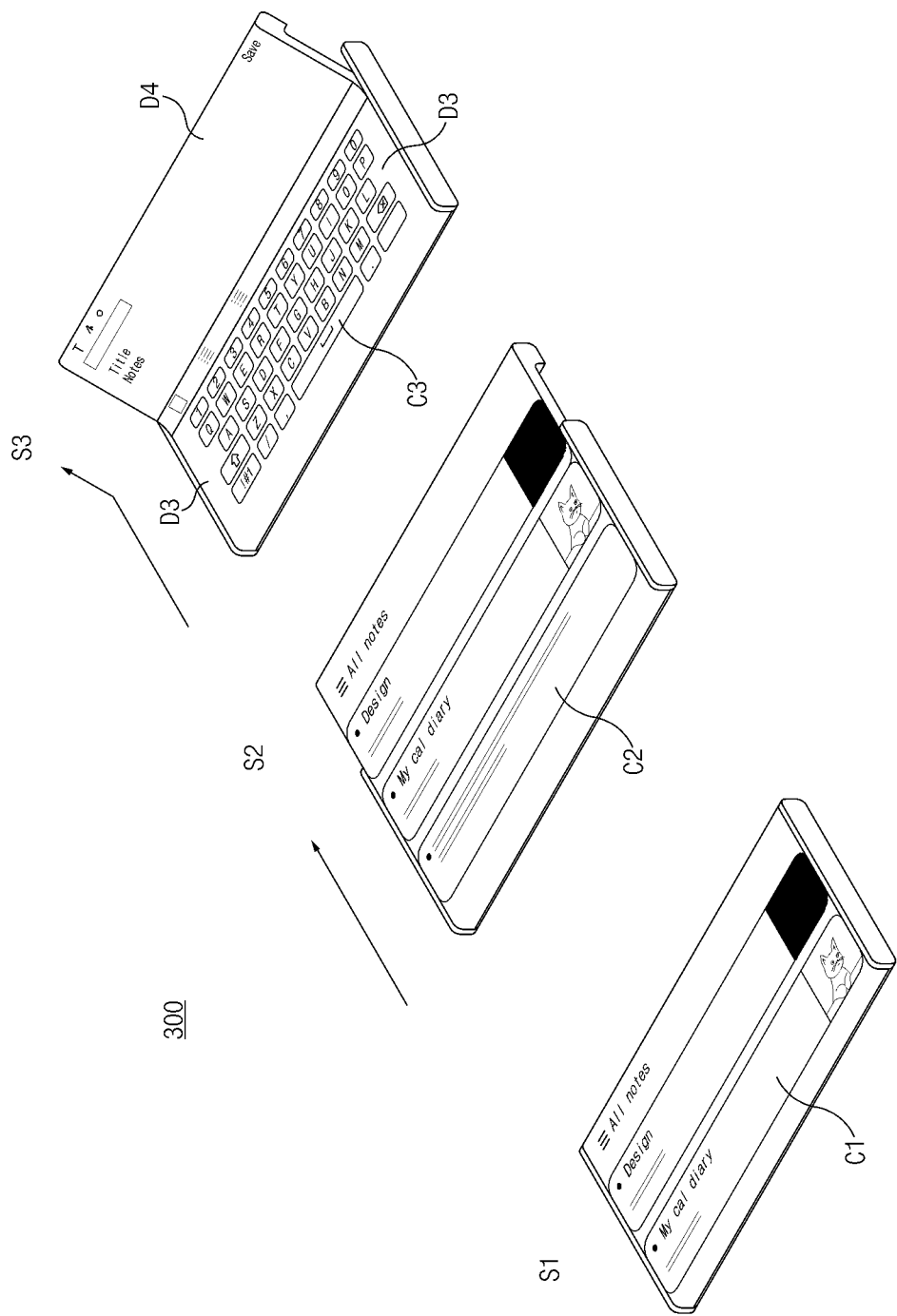
FIG. 26 is a view illustrating an example of the use of the electronic device according to an embodiment of the disclosure.

FIG. 26 is a view illustrating an example of the use of the electronic device according to an embodiment of the disclosure.

Referring to FIG. 26, in the default state S1 and the extended state S2, the electronic device 300 may display an execution screen of an application. The electronic device 300 may display more content in the extended state than in the default state S1. For example, in the extended state, the electronic device 300 may display an additional memo list C2 connected to a memo list C1 displayed in the default state.

Referring to FIG. 26, in the folded state S3, the electronic device 300 may display the execution screen of the application on the fourth region D4 and may display a user input screen (e.g., a keyboard) on the third region D3. For example, the user input screen may be related to the application displayed on the fourth region D4. For example, an input screen C3 of a memo application may be displayed on the fourth region D4, and a keyboard may be displayed such that text is able to be input to the input screen. In various embodiments, the user input screen C3 may include a keyboard and/or a pen input screen for text input.

Figure 27:
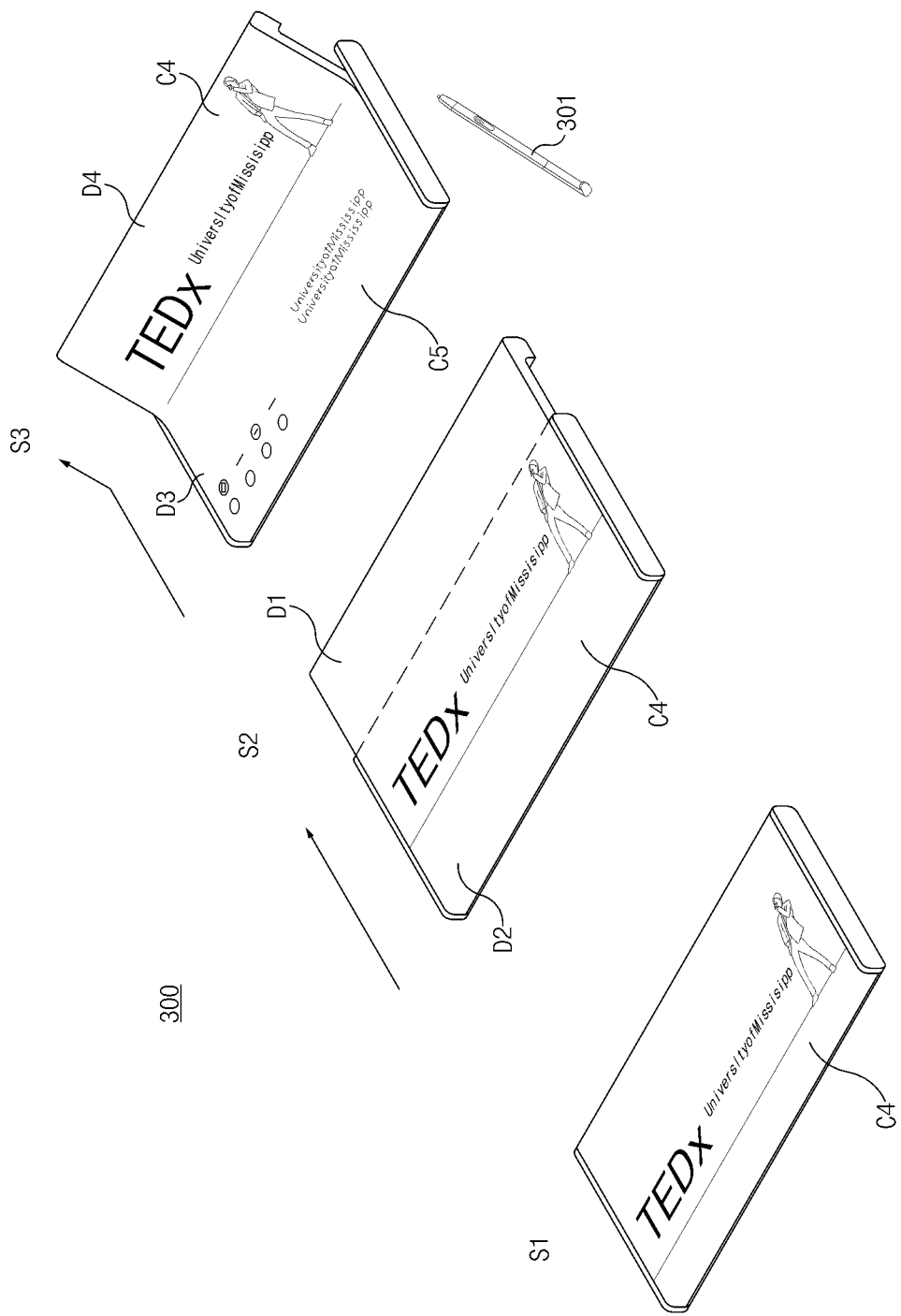
FIG. 27 is a view illustrating an example of the use of the electronic device according to an embodiment of the disclosure.

FIG. 27 is a view illustrating an example of the use of the electronic device according to an embodiment of the disclosure.

Referring to FIG. 27, the electronic device 300 may display a video playback screen C4 in the default state S1 and the extended state S2 and may additionally display a pen input screen C5 in the folded state S3. For example, in the extended state S2, the electronic device 300 may enlarge the video playback screen C4 to a full screen, or may maintain the resolution and ratio of the video and may display the remaining region as a blank region. For example, another piece of information (e.g., a caption) related to the video being played may be displayed on the blank region.

The electronic device 300 may detect whether a pen is used and whether the electronic device 300 is in the folded state, and when it is determined that the pen 301 is used in the folded state S3, the electronic device 300 may display the video playback screen C4 on the fourth region D4 and may display the pen input screen C5 on the third region D3. Accordingly, a user may take a note on the third region D3 while watching the video through the fourth region D4. An application capable of supporting pen input may be executed on the third region D3.

Figure 28:
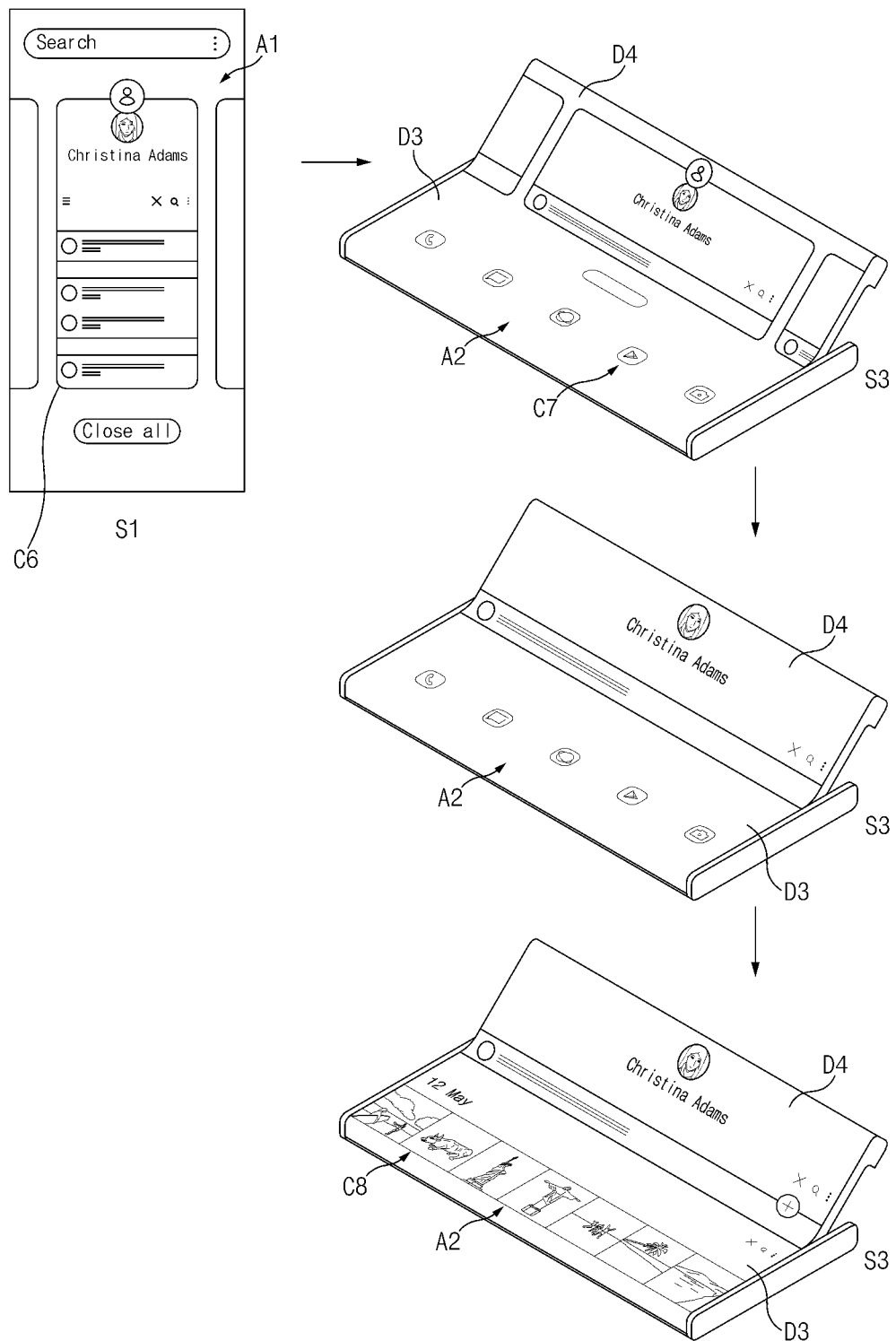
FIG. 28 is a view illustrating an example of the use of the electronic device according to an embodiment of the disclosure.

FIG. 28 is a view illustrating an example of the use of the electronic device according to an embodiment of the disclosure.

In an embodiment, in the default state S1, the electronic device 300 may display a first user interface A1 on which a first application is executed, and in the folded state S3, the electronic device 300 may display a second user interface A2 on which a second application related to the first application is executed.

Referring to FIG. 28, for example, the first application may include a "recent app" application C6 showing a list of applications recently used by a user. For example, in the default state S1, the recent app application C6 may be displayed in a portrait mode, and when the electronic device 300 is changed to the folded state S3, the recent app application C6 may be displayed in a landscape mode on the fourth region D4. At this time, a list of basic applications (e.g., call, message, phone book, Internet, camera, and the like) C7 may be displayed on the third region D3.

Referring to FIG. 28, when the user selects one application from the list of recently used applications, an execution screen of the selected application may be displayed on the fourth region D4, and an application list C8 recommended in relation to the selected application may be displayed on the third region D3. For example, when the user selects a messenger application from the recent app application list C8, the messenger application may be executed on the fourth region D4, and an application list related to the messenger application may be displayed on the third region D3. The recommended application list displayed on the third region D3 may be provided based on user personal data including a history used by the user. For example, data shared with a counterpart displayed on the messenger application, a photo on which the counterpart is tagged, or a photo taken together with the counterpart may be displayed on the fourth region D4.

In various embodiments, the recommended application list may be displayed on an edge portion of the fourth region D4 without being necessarily limited to being displayed on the third region. For example, an application list related to the first application displayed on the fourth region D4 may be displayed in a "pair-app" form on the fourth region D4. The "pair-app" may be displayed to at least partially overlap the first application displayed on the fourth region D4. Alternatively, the application list displayed in the pair-app form may include the basic applications (e.g., call, message, phone book, Internet, camera, and the like).

In various embodiments, content related to the fourth region D4 may be displayed on the third region D3. For example, the first application displayed on the fourth region D4 may include a memo application, an application list related to the memo application may be displayed on the pair-app displayed on the edge portion of the fourth region D4, and a keyboard for memo input may be displayed on the third region D3.

Figure 29:
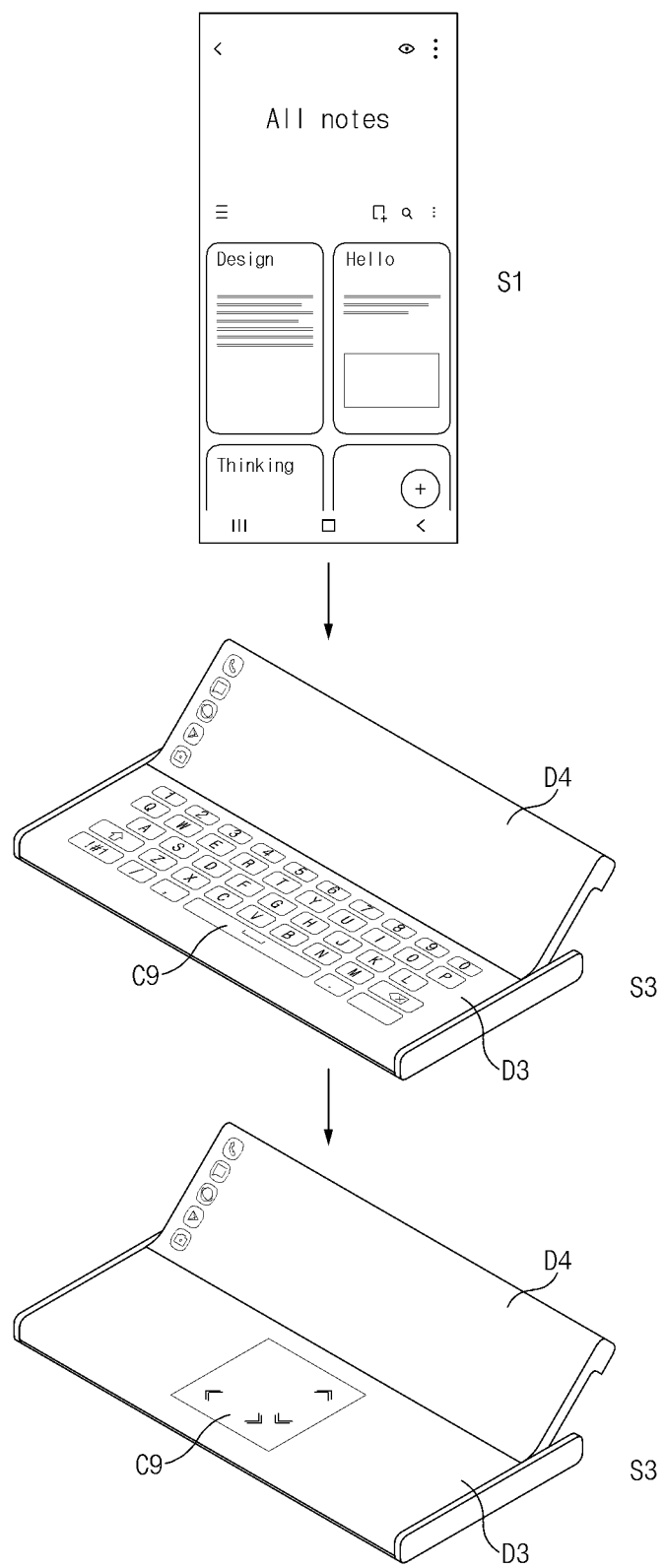
FIG. 29 is a view illustrating an example of the use of the electronic device according to an embodiment of the disclosure.

FIG. 29 is a view illustrating an example of the use of the electronic device according to an embodiment of the disclosure.

In an embodiment, the electronic device 300 may be configured to detect whether the electronic device 300 is in the folded state S3 and to execute the Samsung DeX when it is determined that the electronic device 300 is in the folded state S3. In this case, an execution screen of the Samsung DeX may be displayed on the fourth region D4, and a user input screen C9 for controlling the Samsung DeX may be displayed on the third region D3. For example, the user input screen C9 may include a keyboard, and/or a panel for manipulating a mouse cursor.

Figure 30:
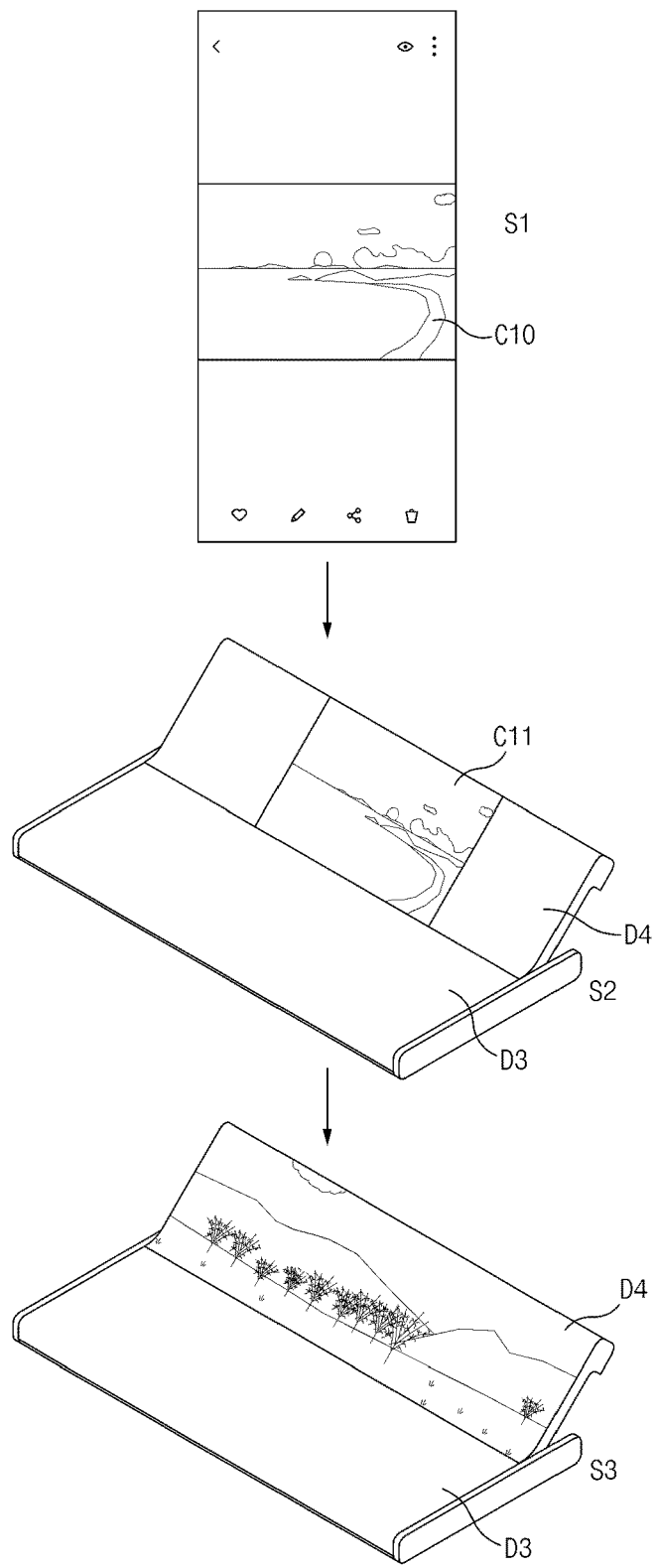
FIG. 30 is a view illustrating an example of the use of the electronic device according to an embodiment of the disclosure.

FIG. 30 is a view illustrating an example of the use of the electronic device according to an embodiment of the disclosure.

Referring to FIG. 30, when a gallery application is executed on the electronic device 300 in the default state S1 and the electronic device 300 is changed to the folded state S3, the electronic device 300 may provide a slideshow mode for sliding and displaying a photo C10 stored in the gallery application. The slideshow C11 may be displayed on the fourth region D4. In various embodiments, a target photo of the slideshow C11 may be a photo included in an album selected by a user among categorized albums provided by the gallery application.

Figure 31:
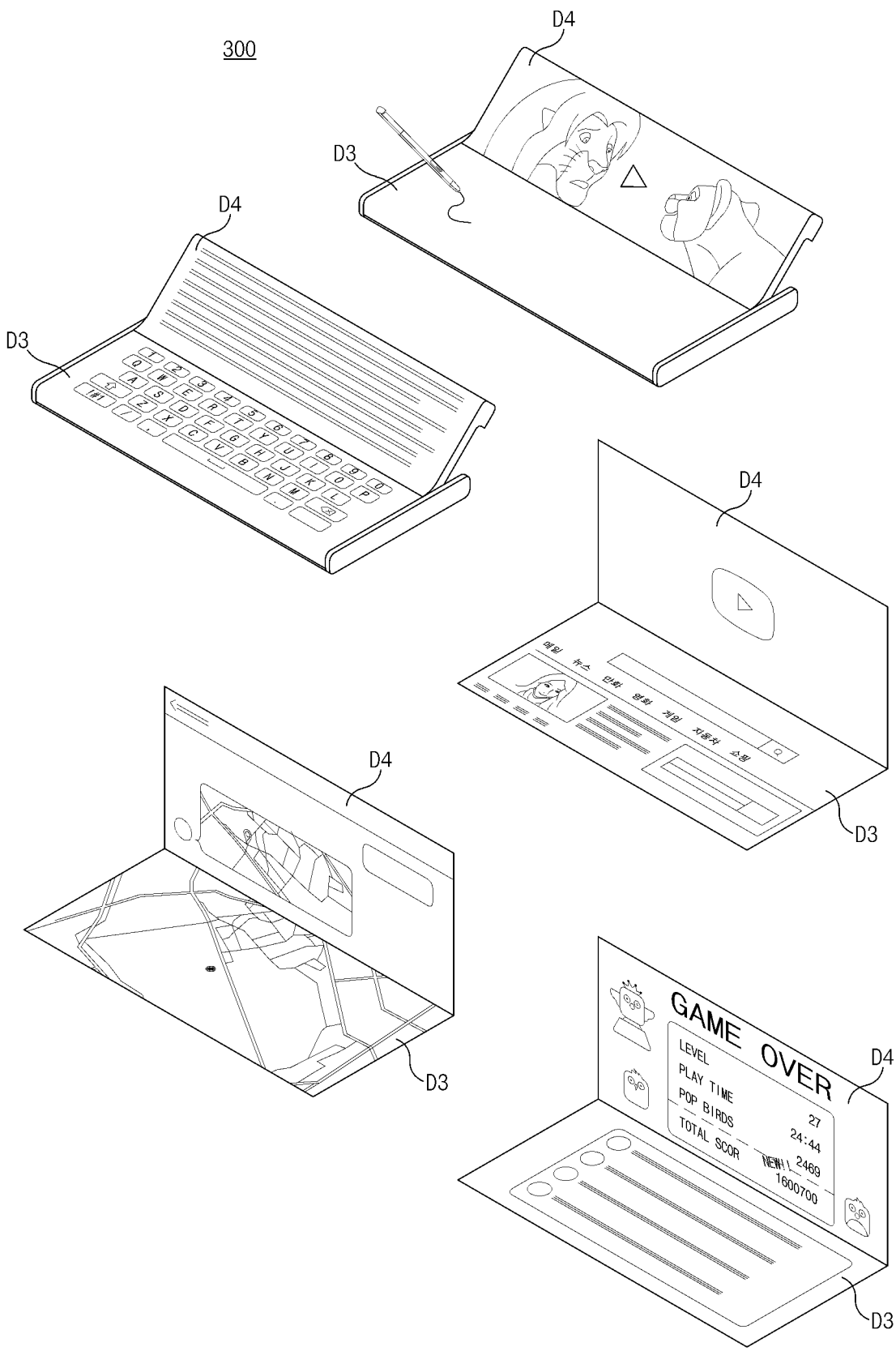
FIG. 31 is a view illustrating an example of the use of the electronic device according to an embodiment of the disclosure.

FIG. 31 is a view illustrating an example of the use of the electronic device according to an embodiment of the disclosure.

In an embodiment, the electronic device 300 may be configured to support multi-tasking in the folded state. For example, the electronic device 300 may be configured to display different content on the third region D3 and the fourth region D4 or to display execution screens of different applications.

For example, a video playback screen may be displayed on the fourth region D4, and a pen input screen may be displayed on the third region D3. For example, an execution screen of a text editing application may be displayed on the fourth region D4, and a keyboard screen may be displayed on the third region D3. For example, a video playback screen may be displayed on the fourth region D4, and an execution screen of an Internet application may be displayed on the third region D3. For example, a chatting screen of a messenger application may be displayed on the fourth region D4, and an execution screen of a map application may be displayed on the third region D3. For example, an execution screen of a game application may be displayed on the fourth region D4, and a chatting screen for chatting with other users participating in the game may be displayed on the third region D3.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a base structure;
   a sliding structure configured to at least partially overlap the base structure and coupled to the base structure so as to be slidable in a first direction;
   a folding structure coupled to the sliding structure so as to be at least one of slidable in the first direction or rotatable about a rotational axis, the rotational axis being parallel to a second direction that is perpendicular to the first direction;
   a hinge connected to the sliding structure and the folding structure, wherein the folding structure is configured to rotate about the rotational axis by the hinge;
   a display disposed on the sliding structure and the folding structure, at least a portion of the display being disposed inside the base structure;
   at least one sensor;
   memory storing instructions; and
   at least one processor,
   wherein the electronic device includes:
      a default state,
      an extended state in which a display region on which content is displayed is extended by sliding of the hinge, the sliding structures, and the folding structure in the first direction with respect to the base structure in which the rotational axis is slid across the base structure, and a folded state in which a first region, disposed on the folding structure, of the display region and a second region, disposed on the sliding structure, of the display region are folded or bent with respect to each other by the hinge, and
wherein the instructions, when executed by the at least one processor, cause the at least one processor to:
determine a state of the electronic device, based on a value obtained from the at least one sensor,
display first content on the display region in the extended state, and
display second content on the first region and third content different from the second content on the second region in the folded state.

2. The electronic device of claim 1, wherein at least one of the second content or the third content are substantially the same as the first content.

3. The electronic device of claim 1,
wherein the instructions, when executed by the at least one processor, further cause the at least one processor to:
determine recommended content related to the first content, and
wherein the third content includes the recommended content.

4. The electronic device of claim 3, wherein the recommended content is determined based on user data.

5. The electronic device of claim 1,
wherein the second content includes an application execution screen capable of being created or edited by a user, and
wherein the third content includes an object configured to receive a user input.

6. The electronic device of claim 5, wherein the third content includes at least one of a keypad input screen for text input or a pen input screen for pen input.

7. The electronic device of claim 1,
wherein the first content includes content related to a voice call,
wherein the second content and the third content include content related to a video call, and
wherein the second content includes a photographing screen of a camera module.

8. The electronic device of claim 7, wherein the second content includes a photographing screen of a counterpart of the video call.

9. The electronic device of claim 7, wherein the instructions, when executed by the at least one processor, further cause the at least one processor to:
display guide content related to the video call on the display region when the electronic device is changed to the extended state during the voice call.

10. The electronic device of claim 1,
wherein the first content and the second content include a video playback screen, and
wherein the third content includes a system user interface (UI).

11. The electronic device of claim 1,
wherein the first content and the second content include a video playback screen, and
wherein the third content includes at least one of a keypad input screen for text input or a pen input screen for pen input.

12. The electronic device of claim 1,
wherein the third content includes a portion of information included in the first content, and
wherein the second content includes specific information about a portion of information included in the third content.

13. The electronic device of claim 12,
wherein the third content includes a plurality of albums that are categorized, and
wherein the second content includes one of images included in the plurality of albums.

14. The electronic device of claim 12,
wherein the third content includes a plurality of images, and
wherein the second content includes an enlarged image of at least one of the plurality of images.

15. The electronic device of claim 1,
wherein the instructions, when executed by the at least one processor, further cause the at least one processor to:
display fourth content on the display region in the default state, and
wherein the fourth content is different from the first content in terms of at least one of ratio or direction.

16. The electronic device of claim 15,
wherein the fourth content includes a first plurality of objects configured to slide in the first direction, and
wherein the first content includes a second plurality of objects configured to slide in the second direction, the second plurality of objects being substantially the same as the first plurality of objects.

17. The electronic device of claim 16,
wherein the second content includes one object selected by a user among the second plurality of objects included in the first content, and
wherein the third content includes at least one of a basic application list or an application list related to the selected object.

18. The electronic device of claim 16, wherein each of the second plurality of objects represents a recently used application.

19. The electronic device of claim 15,
wherein the fourth content includes a first image, and
wherein the second content includes a slideshow configured to sequentially display at least two of a plurality of images including the first image.

20. The electronic device of claim 1, wherein the hinge includes a plurality of gears.

* * * * *